(12) United States Patent
Huynh Van et al.

(10) Patent No.: US 9,319,300 B2
(45) Date of Patent: Apr. 19, 2016

(54) SYSTEMS AND METHODS FOR DETERMINING ENDPOINT CONFIGURATIONS FOR ENDPOINTS OF A VIRTUAL PRIVATE NETWORK (VPN) AND DEPLOYING THE CONFIGURATIONS TO THE ENDPOINTS

(75) Inventors: Olivier Huynh Van, Aire sur l'Adour (FR); Jeff Gray, Sacramento, CA (US)

(73) Assignee: GLUE NETWORKS, INC., Sacramento, CA (US)

( * ) Notice: Subject to any disclaimer, the term of this patent is extended or adjusted under 35 U.S.C. 154(b) by 1524 days.

(21) Appl. No.: 12/634,536

(22) Filed: Dec. 9, 2009

(65) Prior Publication Data

US 2010/0142410 A1    Jun. 10, 2010

Related U.S. Application Data

(60) Provisional application No. 61/121,127, filed on Dec. 9, 2008.

(51) Int. Cl.

| | |
|---|---|
| *H04L 12/26* | (2006.01) |
| *G06F 15/177* | (2006.01) |
| *H04L 12/701* | (2013.01) |
| *H04L 12/46* | (2006.01) |
| *H04L 29/06* | (2006.01) |

(52) U.S. Cl.
CPC ............ *H04L 45/00* (2013.01); *H04L 12/4633* (2013.01); *H04L 12/4641* (2013.01); *H04L 63/0823* (2013.01); *H04L 63/164* (2013.01)

(58) Field of Classification Search
None
See application file for complete search history.

(56) References Cited

U.S. PATENT DOCUMENTS

| | | | |
|---|---|---|---|
| 6,105,131 A | 8/2000 | Carroll | |
| 6,175,917 B1* | 1/2001 | Arrow et al. | ...................... 713/1 |
| 6,335,926 B1* | 1/2002 | Silton et al. | ................... 370/351 |
| 6,438,690 B1 | 8/2002 | Patel et al. | |
| 6,513,159 B1* | 1/2003 | Dodson | ................ G06F 9/4411 |
| | | | 713/100 |
| 6,640,251 B1* | 10/2003 | Wiget | ................... H04L 12/185 |
| | | | 709/228 |
| 6,715,073 B1 | 3/2004 | An et al. | |
| 6,879,679 B1 | 4/2005 | Ong | |
| 6,892,300 B2 | 5/2005 | Carroll et al. | |
| 6,931,526 B1 | 8/2005 | Bacha et al. | |

(Continued)

OTHER PUBLICATIONS

File History of U.S. Appl. No. 12/471,179.

(Continued)

*Primary Examiner* — Marsha D Banks Harold
*Assistant Examiner* — Christopher Wyllie
(74) *Attorney, Agent, or Firm* — DLA Piper LLP (US)

(57) ABSTRACT

Systems and Methods for determining endpoint configurations for endpoints of a virtual private network (VPN) and deploying the configurations to the endpoints. Parameters required for building the configurations are accepted from a user, the configurations enabling the endpoints to process a mixture of time sensitive and non-time sensitive data, and the parameters comprising: endpoint IP addressing scheme information, network design information, and templates used to define profiles of the endpoints. The configurations for the parameters are generated, wherein the parameters comprise endpoint authentication information, and the configurations are set based on endpoint hardware-specific information with no further input required from the user. Each endpoint is queried to verify that the endpoint hardware-specific information is consistent with the configurations for the endpoint. The configurations are deployed to the endpoints of the VPN.

102 Claims, 54 Drawing Sheets

(56) References Cited

U.S. PATENT DOCUMENTS

| | | | |
|---|---|---|---|
| 6,966,060 B1 | 11/2005 | Young et al. | |
| 7,054,924 B1* | 5/2006 | Harvey | H04L 67/303 709/203 |
| 7,075,933 B2 | 7/2006 | Aysan | |
| 7,352,853 B1 | 4/2008 | Shen et al. | |
| 7,376,653 B2 | 5/2008 | Hart | |
| 7,397,911 B2 | 7/2008 | Shen et al. | |
| 7,411,955 B2* | 8/2008 | Li | H04L 45/50 370/392 |
| 7,420,933 B2 | 9/2008 | Booth, III et al. | |
| 7,447,901 B1* | 11/2008 | Sullenberger et al. | 713/153 |
| 7,535,856 B2 | 5/2009 | Booth, III et al. | |
| 7,593,352 B2 | 9/2009 | Verma | |
| 7,600,011 B1 | 10/2009 | Urbanek | |
| 7,602,737 B2 | 10/2009 | Asati et al. | |
| 7,643,434 B2 | 1/2010 | Mandavilli et al. | |
| 7,660,265 B2 | 2/2010 | Kreuk | |
| 7,801,030 B1* | 9/2010 | Aggarwal | H04L 12/44 370/227 |
| 7,869,436 B1* | 1/2011 | Adler | H04L 12/4641 370/351 |
| 8,055,891 B2 | 11/2011 | Haustein et al. | |
| 8,140,642 B1 | 3/2012 | Kadam et al. | |
| 8,346,961 B2* | 1/2013 | Asati et al. | 709/238 |
| 8,370,933 B1 | 2/2013 | Buckler | |
| 2002/0112048 A1 | 8/2002 | Gruyer et al. | |
| 2002/0184388 A1* | 12/2002 | Yaseen | H04L 12/4641 709/242 |
| 2002/0186664 A1* | 12/2002 | Gibson et al. | 370/254 |
| 2002/0191548 A1* | 12/2002 | Ylonen et al. | 370/254 |
| 2003/0076837 A1 | 4/2003 | Whitehill et al. | |
| 2003/0135508 A1 | 7/2003 | Chorafakis | |
| 2004/0059831 A1* | 3/2004 | Chu | H04L 41/0893 709/242 |
| 2004/0136394 A1* | 7/2004 | Onno | H04L 12/24 370/438 |
| 2004/0261116 A1* | 12/2004 | Mckeown | H04L 12/24 725/109 |
| 2006/0050862 A1 | 3/2006 | Shen et al. | |
| 2006/0112182 A1* | 5/2006 | Chen | H04L 67/20 709/229 |
| 2006/0180709 A1* | 8/2006 | Breton | B61L 15/0036 246/1 C |
| 2006/0184998 A1* | 8/2006 | Smith et al. | 726/3 |
| 2006/0187854 A1* | 8/2006 | Booth, III | H04L 12/4641 370/254 |
| 2006/0187855 A1* | 8/2006 | Booth, III | H04L 41/0253 370/254 |
| 2006/0187856 A1* | 8/2006 | Booth, III | H04L 12/4641 370/254 |
| 2006/0187937 A1 | 8/2006 | Townsley et al. | |
| 2006/0190570 A1* | 8/2006 | Booth, III | H04L 12/4641 709/220 |
| 2006/0206702 A1 | 9/2006 | Fausak | |
| 2006/0248139 A1* | 11/2006 | Sundar | H04L 41/048 709/202 |
| 2006/0259963 A1* | 11/2006 | Maxwell et al. | 726/15 |
| 2006/0268829 A1* | 11/2006 | Nedeltchev | 370/352 |
| 2007/0115990 A1 | 5/2007 | Asati et al. | |
| 2007/0165540 A1* | 7/2007 | Elias | H04L 12/24 370/254 |
| 2007/0206597 A1* | 9/2007 | Asati | H04L 12/4633 370/392 |
| 2007/0253384 A1* | 11/2007 | Kanagala | H04L 49/351 370/338 |
| 2007/0271451 A1* | 11/2007 | Fluhrer | H04L 63/0442 713/150 |
| 2008/0052758 A1* | 2/2008 | Byrnes | H04L 63/0263 726/1 |
| 2008/0062997 A1* | 3/2008 | Nix | H04L 29/12066 370/395.2 |
| 2008/0075090 A1* | 3/2008 | Farricker et al. | 370/395.53 |
| 2008/0117902 A1* | 5/2008 | Vinneras | H04L 12/4641 370/389 |
| 2008/0177868 A1* | 7/2008 | Zilbershtein | H04L 29/12273 709/220 |
| 2008/0232379 A1* | 9/2008 | Mohamed | H04L 12/4679 370/395.53 |
| 2008/0298367 A1* | 12/2008 | Furukawa | H04L 12/4641 370/392 |
| 2009/0044253 A1* | 2/2009 | Interlandi | G06F 21/10 726/4 |
| 2009/0046729 A1* | 2/2009 | Nagata | H04L 12/4641 370/401 |
| 2009/0073995 A1 | 3/2009 | Pandey et al. | |
| 2009/0097417 A1* | 4/2009 | Asati | H04L 45/00 370/255 |
| 2009/0161679 A1* | 6/2009 | Yang et al. | 370/395.53 |
| 2009/0254639 A1* | 10/2009 | Manchester | H04L 29/06 709/220 |
| 2009/0304003 A1* | 12/2009 | Huynh Van | H04L 12/4641 370/395.31 |
| 2009/0304004 A1* | 12/2009 | Huynh Van | H04L 9/30 370/395.31 |
| 2010/0054245 A1* | 3/2010 | Asati | H04L 12/18 370/390 |
| 2010/0107156 A1* | 4/2010 | Andersen et al. | 717/178 |
| 2010/0142410 A1* | 6/2010 | Huynh Van | H04L 12/4633 370/255 |
| 2010/0180016 A1 | 7/2010 | Bugwadia | |
| 2010/0226372 A1 | 9/2010 | Watanabe | |
| 2011/0013641 A1* | 1/2011 | Kolhi | H04L 12/4633 370/401 |
| 2011/0176531 A1 | 7/2011 | Rune et al. | |
| 2011/0286384 A1 | 11/2011 | Sugimoto et al. | |
| 2012/0046058 A1 | 2/2012 | Vesterinen et al. | |
| 2012/0057463 A1 | 3/2012 | Hurtta | |
| 2012/0084423 A1 | 4/2012 | McGleenon | |
| 2012/0250516 A1* | 10/2012 | Aggarwal | H04L 45/24 370/238 |
| 2013/0085914 A1* | 4/2013 | McPherson | H04L 61/1511 705/34 |
| 2013/0117427 A1 | 5/2013 | Amano et al. | |
| 2013/0279336 A1 | 10/2013 | Woelker | |

OTHER PUBLICATIONS

File History of U.S. Appl. No. 12/471,199.
File History of U.S. Appl. No. 13/830,801.
File History of U.S. Appl. No. 13/830,737.
File History of U.S. Appl. No. 14/017,696.
"OSGI Alliance", printed from http://www.osgi.org, on Sep. 26, 2014 (2 pages).
"Equinox Framework QuickStart Guide" printed from http://www.eclipse.org/equinox/documents/quickstart-framework.php, on Sep. 26, 2014 (5 pages).
"Human Machine Interface (HMI)" http://en.wikipedia.org/wiki/Human-machine_interface, on Sep. 26, 2014, Last updated Sep. 20, 2014 (2 pages).
File History of U.S. Appl. No. 14/219,685.
File History of U.S. Appl. No. 14/219,654.
File History of U.S. Appl. No. 14/325,757.
File History of U.S. Appl. No. 14/490,424.
U.S. Appl. No. 13/830,801, filed Mar. 14, 2013, Pending.
U.S. Appl. No. 13/830,737, filed Mar. 14, 2013, Pending.
U.S. Appl. No. 14/017,696, filed Sep. 9, 2013, Pending.
U.S. Appl. No. 14/219,685, filed Mar. 19, 2014, Pending.
U.S. Appl. No. 14/219,654, filed Mar. 19, 2014, Pending.
U.S. Appl. No. 14/325,757, filed Jul. 8, 2014, Pending.
U.S. Appl. No. 14/490,424, filed Sep. 18, 2014, Pending.
Cisco, "Cisco IOS IP Routing: BFD Configuration Guide", Release 15.1, 2010, Cisco System, Inc. retrieved from http://www.cisco.com/c/en/us/td/docs/ios/iproute_bfd/configuration/guide/15_1/irb_15_1_book.pdf, 110 pages.
International Search Report issued in International Application No. PCT/US2009/067384, mailed Jul. 20, 2010.
Written Opinion issued in International Application No. PCT/US2009/067384, mailed Jul. 20, 2010.

(56) References Cited

OTHER PUBLICATIONS

International Search Report issued in International Application No. PCT/US2009/045155, mailed Jul. 6, 2009.
Written Opinion issued in International Application No. PCT/US2009/045155, mailed Jul. 6, 2009.
International Search Report issued in International Application No. PCT/US2009/045159, mailed Aug. 24, 2009.
Written Opinion issued in International Application No. PCT/US2009/045159, mailed Aug. 24, 2009.
International Search Report issued in International Application No. PCT/US2009/045159, mailed Sep. 24, 2009.
Written Opinion issued in International Application No. PCT/US2009/045159, mailed Sep. 24, 2009.
B. Weis, "Group Domain of Interpretation (GDOI) Support for RSVP", MSEC Working Group, Internet-Draft, Jun. 21, 2007 [retrieved Aug. 15, 2009], http://www.watersprings.com/pub/id/draft-weis-gdoi-for-rsvp-00.txt.
U.S. Appl. No. 14/017,696.

* cited by examiner

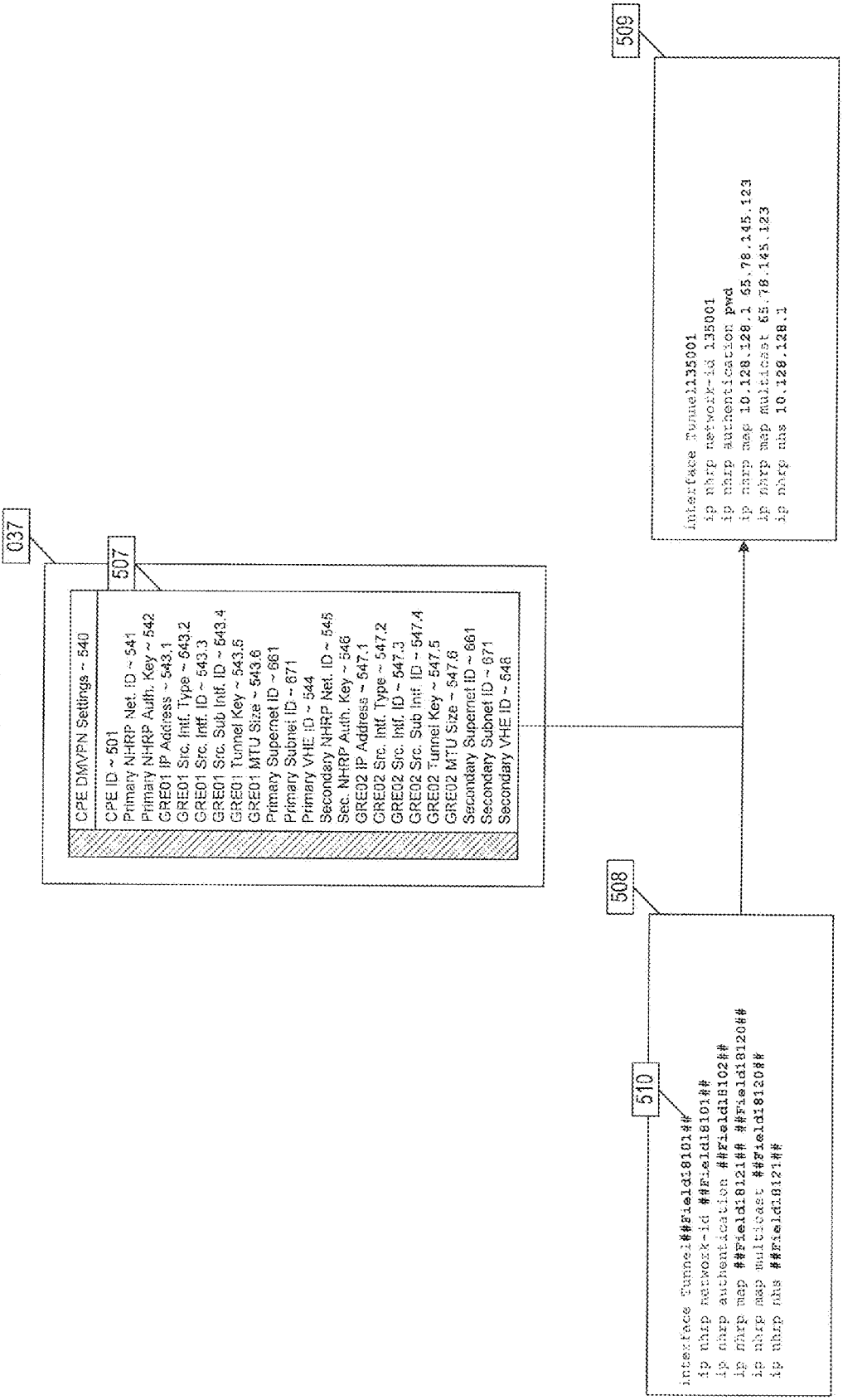

Figure 30a

| Tab | Field | Description | DB Field |
|---|---|---|---|
| General | The General Tab defines all the general fields in the VHE template. | | |
| General | VHE Template Name | Name of the VHE Template. Each VHE template has a unique name. | 201 |
| General | VHE Code Name | All the VHEs that share this template have the VHE code name part of their hostname. | 203.1 |
| General | Domain Name | IP domain name. | 203.2 |
| General | Platform | Target hardware platform. This ensures the template is aimed at configuring a specific platform. This avoids configuring an interface on a platform that does not exist. | 206 |
| General | Outside Interface | Interface ID connected on the Internet. | 203.4 203.5 203.6 |
| General | WAN Bandwidth | Amount of available bandwidth on the outside interface. The amount of bandwidth required for all the voice streams (including video when relevant) has to be above 75% of the available bandwidth provided for the outside interface. | 208.6 |
| General | HA Support | If disabled, this VHE template is assigned to a given GVO Network ID. If enabled, this VHE template is assigned to a given HA group. | 204 |
| General | Network ID | Network ID assigned to the interface when no HA is required. | 601 |
| General | HA Group ID | A daisy-chaining HA group assigned to the VHE template when HA group is required. | 611 |
| General | VHE Template Enabled | If disabled, this VHE template cannot be used. | 202 |
| LAN x | The LAN x defines all the interface-related fields in the VHE template. | | |
| LAN x | Interface Ignored/Enabled | If disabled, the *orchestrator* will not process this interface when generating/configuring the target VHE. This is useful on target VHEs where an interface is already configured. | 222 |
| LAN x | Inside Interface | Interface ID connected on the LAN network. | 223.1 223.2 223.3 |
| LAN x | *HA Support (future)* | *If disabled, this interface is assigned to a given GVO Network ID. If enabled, this interface is assigned to a given HA group.* | |
| LAN x | *Network ID (future)* | *Network ID assigned to the interface when no HA is required.* | |
| LAN x | *HA Group ID (future)* | *A daisy-chaining HA group assigned to the interface when HA group is required.* | |
| LAN x | *VRF Name (future)* | *Virtual Routing & Forwarding (VRF) Name* | |
| LAN x | *VRF RD (future)* | *Virtual Routing & Forwarding (VRF) Route Distinguisher* | |
| LAN x | *VRF Next Hop (future)* | *Virtual Routing & Forwarding (VRF) Next Hop* | |
| LAN x | IP Subnet Pool | VHE-type MIS from which the *configuration engine* will pool an address to configure a target VHE. | 661 |
| LAN x | LAN HA Support | If disabled, no redundancy is required on the LAN interface. If enabled, a redundancy protocol is required on the LAN interface. This redundancy protocol can be a layer-2 (GLBP, HSRP, VRRP) or layer-3 (EIGRP, OSPF, RIP, BGP) protocol. | 224 |

Figure 30b

| | Field | Description | # |
|---|---|---|---|
| | Master Node IP Offset | When a layer-2 redundancy protocol is defined in the LAN HA Support field, a unique virtual IP address is required between all the participating VHE LAN interfaces. This unique IP address is taken from MIS reserved addresses. These reserved addresses are, but are not limited to, subnet ID +1, subnet ID +2, subnet ID +3, broadcast address -1, broadcast address -2, and broadcast address -3. | 225.2 |
| | Redundancy Protocol | When a layer-2 redundancy protocol is defined in the LAN HA Support field, the supported redundancy protocols are, but are not limited to, GLBP, HSRP, VRRP. | 225.1 |
| | Routing Protocol | When a layer-3 redundancy protocol is defined in the LAN HA Support field, the supported routing protocols are, but are not limited to, EIGRP, OSPF, RIP, BGP. | 226.1 |
| | Process ID | When a layer-3 redundancy protocol is defined in the LAN HA Support field, a process ID is required to configure the routing protocol. This also ensures no overlapping values are used when configuring the target VHEs. | 226.2 |
| | ACL | When a layer-3 redundancy protocol is defined in the LAN HA Support field, ACLs can be defined to filter the routing updates sent or received. | 226.3 |
| Static Routes | The Static Routes Tab defines all the static IP routes to distribute to the target VHEs. | | |
| | Route Enabled/Disabled | If disabled, the IP route will not be sent to the target VHEs. If enabled, the IP route will be sent to the target VHEs. | 272.4 |
| | IP Subnet Prefix | IP Subnet Prefix of the static IP route. | 272.1 |
| | Prefix Length | Prefix Length of the static IP route. | 272.2 |
| | Next Hop | IP Address of the static IP route next hop. | 272.3 |
| V3PN | The V3PN Tab defines all the multimedia-related fields in the VHE templates such as voice, video, video conferencing, multicast support. | | |
| | VoIP Support | If enabled, the *orchestrator* configures the QoS engine of the target nodes accordingly. This comprises of the target VHEs and all other participating nodes of the same network ID. All voice payloads and related signaling traffic are protected by the QoS engine to ensure the best transport possible of these time-sensitive packets. | 208.1 |
| | VoIP Codec | When the voice support is enabled, the voice codec needs to be specified in order for the *orchestrator* to configure the QoS engine accordingly. The *orchestrator* is also aware of the voice traffic to be ciphered and the amount of traffic overhead brought by the encryption process. | 208.2 |
| | Concurrent Voice Streams | When the voice support is enabled, specifies the number of concurrent voice streams. Only the specified number of concurrent voice streams will be protected by the QoS engine. | 208.3 |
| | PBX Signaling | When the voice support is enabled, specifies the IP PBX signaling protocol. The supported IP PBX signaling protocols are, but not limited to, SCCP, SIP, H.323. | 208.4 |

FIGURE 30c

| | | | |
|---|---|---|---|
| | Video Support | When the voice support is enabled, enabled the support for video transport such as video conferencing. The GAE solution adds the related changes to the QoS engine to protect the video traffic. | 208.5 |
| | Call Admission Support | When the voice support is enabled, specifies if a call admission mechanism is added to the QoS engine. Only the specified number of concurrent voice streams will be permitted by the QoS engine. | 208.6 |
| | Call Reservation Support | When the voice support is enabled, specifies a reservation protocol to be added. The supported reservation protocols are, but are not limited to, RSVP. | 208.7 |
| | Multicast Support | Specifies if multicast support is added to the network. This includes the target VHEs and all other participating nodes of the same network ID. | 209.1 |
| | Rendez-Vous Point | When the multicast support is added, specifies the Rendez-Vous point of the network. | 209.2 |
| | Rendez-Vous Point Location | When the multicast support is added, the target VHEs will host the Rendez-Vous point is the location is Local. If the location is not local, the *orchestrator* adds the Rendez-Vous point location to all target VHEs. In both case, the Rendez-Vous point is added to all participating nodes of the network. | 209.3 |
| Management | The Management Tab defines all the online and offline management details to the target VHEs. | | |
| | SNMP Read Community | Specifies the SNMP Read Communities | 209.5 |
| | SNMP Write Community | Specifies SNMP Write Communities | 209.6 |
| | SNMP ACL | When specified, an ACL can be defined to filter the source of the SNMP Messages. | 209.7 |
| | SNMP Traps & Informs | Specifies the SNMP Traps and Informs Destination | 209.9 |
| | SNMP Credentials | When SNMPv3 is required, specifies the SNMP credentials. | 209.8 |
| Hidden | VHE Template Version | The version is used to detect changes to the template after a VHE has already been deployed using a previous version. | 205 |

FIGURE 30d

| Tab | Field | Description | | | DB Field |
|---|---|---|---|---|---|
| General | The General Tab defines all the general fields in the VHE template. | | | | |
| | VHE Template Name | EU VHEs | | | 201 |
| | VHE Code Name | euv | | | 203.1 |
| | Domain Name | gluenetworks.com | | | 203.2 |
| | Platform | 3845 | | | 206 |
| | Outside Interface | | | | 203.4 |
| | | | | | 203.5 |
| | | | | | 203.6 |
| | WAN Bandwidth | 10240 | | | 208.6 |
| | HA Support | no | | | 204 |
| | Network ID | 128001 | | | 601 |
| | HA Group ID | | | | 611 |
| | VHE Template Enabled | yes | | | 202 |
| LAN x | The LAN x defines all the interface-related fields in the VHE template. | | | | |
| | Interface Ignored/Enabled | ignored | | | 222 |
| | Inside Interface | | | | 223.1 |
| | | | | | 223.2 |
| | | | | | 223.3 |
| | HA Support (future) | | | | |
| | Network ID (future) | | | | |
| | HA Group ID (future) | | | | |
| | VRF Name (future) | | | | |
| | VRF RD (future) | | | | |
| | VRF Next Hop (future) | | | | |
| | IP Subnet Pool | Corporate DC MIS | | | 661 |
| | LAN HA Support | no | | | 224 |
| | Master Node IP Offset | | | | 225.2 |
| | Redundancy Protocol | | | | 225.1 |
| | Routing Protocol | | | | 226.1 |
| | Process ID | | | | 226.2 |
| | ACL | | | | 226.3 |
| Static Routes | The Static Routes Tab defines all the static IP routes to distribute to the target VHEs. | | | | |
| | Route Enabled/Disabled | yes | | | 272.4 |
| | IP Subnet Prefix | 10.98.0.0 | | | 272.1 |
| | Prefix Length | 24 | | | 272.2 |
| | Next Hop | 10.99.0.254 | | | 272.3 |
| V3PN | The V3PN Tab defines all the multimedia-related fields in the VHE templates such as voice, video, video conferencing, multicast support. | | | | |
| | VoIP Support | yes | | | 208.1 |
| | VoIP Codec | G.711 | | | 208.2 |
| | Concurrent Voice Streams | 10 | | | 208.3 |
| | PBX Signaling | SCCP | | | 208.4 |
| | Video Support | yes | | | 208.5 |
| | Call Admission Support | no | | | 208.6 |
| | Call Reservation Support | no | | | 208.7 |
| | Multicast Support | no | | | 209.1 |
| | Rendez-Vous Point | | | | 209.2 |
| | Rendez-Vous Point Location | | | | 209.3 |

Figure 30e

| | The Management Tab defines all the online and offline management details to the target VHEs. | | |
|---|---|---|---|
| Management | SNMP Read Community | *myrocommunity* | 209.5 |
| | SNMP Write Community | *myrwcommunity* | 209.6 |
| | SNMP ACL | | 209.7 |
| | SNMP Traps & Informs | | 209.9 |
| | SNMP Credentials | | 209.8 |
| Hidden | VHE Template Version | *1* | 205 |

FIGURE 30f

| Tab | Field | Description | DB Field |
|---|---|---|---|
| General | The General Tab defines all the general fields in the VHE template. | | |
| | VHE Template Name | US VHEs | 201 |
| | VHE Code Name | usv | 203.1 |
| | Domain Name | gluenetworks.com | 203.2 |
| | Platform | 3845 | 206 |
| | Outside Interface | | 203.4 |
| | | | 203.5 |
| | | | 203.6 |
| | WAN Bandwidth | 10240 | 208.6 |
| | HA Support | no | 204 |
| | Network ID | | 601 |
| | HA Group ID | DS Group | 611 |
| | VHE Template Enabled | yes | 202 |
| LAN x | The LAN x defines all the interface-related fields in the VHE template. | | |
| | Interface Ignored/Enabled | enabled | 222 |
| | Inside Interface | | 223.1 |
| | | | 223.2 |
| | | | 223.3 |
| | HA Support (future) | | |
| | Network ID (future) | | |
| | HA Group ID (future) | | |
| | VRF Name (future) | | |
| | VRF RD (future) | | |
| | VRF Next Hop (future) | | |
| | IP Subnet Pool | Corporate DC2 MIS | 661 |
| | LAN HA Support | yes | 224 |
| | Master Node IP Offset | Subnet ID + 1 | 225.2 |
| | Redundancy Protocol | GLBP | 225.1 |
| | Routing Protocol | | 226.1 |
| | Process ID | | 226.2 |
| | ACL | | 226.3 |

Labels: 3050, 3055, 3060, 3065, 3070

FIGURE 30g

| | The Static Routes Tab defines all the static IP routes to distribute to the target VHEs. | | | |
|---|---|---|---|---|
| Static Routes | Route Enabled/Disabled | yes | | 272.4 |
| | IP Subnet Prefix | 10.98.0.0 | | 272.1 |
| | Prefix Length | 24 | | 272.2 |
| | Next Hop | 10.150.0.254 | | 272.3 |
| V3PN | The V3PN Tab defines all the multimedia-related fields in the VHE templates such as voice, video, video conferencing, multicast support. | | | |
| | VoIP Support | yes | | 208.1 |
| | VoIP Codec | G.711 | | 208.2 |
| | Concurrent Voice Streams | 10 | | 208.3 |
| | PBX Signaling | SCCP | | 208.4 |
| | Video Support | yes | | 208.5 |
| | Call Admission Support | no | | 208.6 |
| | Call Reservation Support | no | | 208.7 |
| | Multicast Support | no | | 209.1 |
| | Rendez-Vous Point | | | 209.2 |
| | Rendez-Vous Point Location | | | 209.3 |
| Management | The Management Tab defines all the online and offline management details to the target VHEs. | | | |
| | SNMP Read Community | myrocommunity | | 209.5 |
| | SNMP Write Community | myrwcommunity | | 209.6 |
| | SNMP ACL | | | 209.7 |
| | SNMP Traps & Informs | | | 209.9 |
| | SNMP Credentials | | | 209.8 |
| Hidden | VHE Template Version | 1 | | 205 |

Labels: 3075, 3080 (Static Routes); 3090, 3096, 3085, 3095 (V3PN)

FIGURE 31a

| Tab | Field | | Description | DB Field |
|---|---|---|---|---|
| General | CPE Template Name | | Name of the CPE Template. Each CPE template has a unique name. | 401 |
| | CPE Code Name | | All the CPEs that share this template have the CPE code name part of their hostname. | 412.1 |
| | Domain Name | | IP domain name. | 412.2 |
| | Platform | | Target hardware platform. This ensures the template is aimed at configuring a specific platform. This avoids configuring an interface on a platform that does not exist. | 406 |
| | LAN Interfaces | | Specified the amount of LAN interfaces for this CPE template. An unlimited number of LAN interfaces is supported. | 407 |
| | Outside Interface | | Interface ID connected on the Internet. | 413.1 413.2 413.3 |
| | VoIP Support | | If enabled, the *orchestrator* configures the QoS engine of the target nodes accordingly. This comprises of the target CPEs using this CPE template. All voice payloads and related signaling traffic are protected by the QoS engine to ensure the best transport possible of these time-sensitive packets. | 408.1 |
| | Spouse & Kid Support | | If enabled, one LAN interface is assigned to a personal use. The *configuration engine* configures one LAN interface accordingly: no routing allowed between this personal network and the other LAN interfaces, the LAN IP subnet bound to the MIS is used but never assigned (re-usable) | 409 |
| | HA Support | | If disabled, this CPE template is assigned to a given GVO Network ID. If enabled, this CPE template is assigned to a given HA group. | 404 |
| | Network ID | | Network ID assigned to the CPE template when no HA is required. | 601 |
| | HA Group | | A bundling HA group assigned to the CPE template when HA group is required. | 611 |
| | CPE Template Enabled | | If disabled, this CPE template cannot be used. | 402 |
| LAN x | Wired Network Enabled/Disabled | | If disabled, the wired network is created but disabled. If enabled, the wired network is created and enabled. | 422 |
| | | VLAN ID | Specifies the VLAN ID of the wired network. | 421 |
| | | VLAN Name | Specifies the VLAN name of the wired network. | 423.4 |
| | | IP Subnet Pool | Specifies the MIS from which the IP subnet is taken from. | 661 |
| | | IP Address Offset | One IP subnet is extracted from the MIS and assigned to a specific CPE. The IP address offset specifies which address the CPE interface uses. These addresses are, but are not limited to, subnet ID +1, subnet ID +2, subnet ID +3, broadcast address -1, broadcast address -2, and broadcast address 3. | 423.5 |

FIGURE 31b

| | | | |
|---|---|---|---|
| | Wireless Bridge Enabled/Disabled | If disabled, no wireless interface is bridged to the wired network. If enabled, a wireless interface is bridged to the wired network. | |
| | Wireless Interface | When the wireless bridge is enabled, specifies the physical wireless interface to use. | 472 |
| | SSID | When the wireless bridge is enabled, specifies the SSID used for the wireless bridge. | 474.3 |
| | SSID Broadcast | When the wireless bridge is enabled, specifies whether the SSID is broadcast or not. | 474.4 |
| | Security Scheme | When the wireless bridge is enabled, specifies the security scheme used. The security scheme can be, but is not limited to, WEP-based, WPA-based or EAP-based protocols. | 474.1 |
| | Key/Passphrase | When the wireless bridge is enabled and the security scheme chosen is either WEP-based or WPA-based, specifies the key or passphrase. | 474.2 |
| | User ID | When the wireless bridge is enabled and the security scheme chosen is either EAP-based, specifies the user id as part of the authentication scheme. | 474.2 |
| | Password | When the wireless bridge is enabled and the security scheme chosen is either EAP-based, specifies the password as part of the authentication scheme. | 474.2 |
| Local DHCP Server Enabled/Dis. | | If disabled, the CPE does not host a local DHCP server and is acting as a UDP helper. If enabled, the CPE hosts a local DHCP server serving local machines. | |
| | Primary IP Helper | When the local DHCP is disabled, specifies the primary UDP helper. | 425 |
| | Secondary IP Helper | When the local DHCP is disabled, specifies the secondary UDP helper. | 425 |
| | Address Pool Range | When the local DHCP is enabled, specifies the range of a DHCP pool. | 423.5 |
| | Primary DNS | When the local DHCP is enabled, specifies the primary entry for the DHCP Option 006. | 424.2 |
| | Secondary DNS | When the local DHCP is enabled, specifies the secondary entry for the DHCP Option 006. | 424.2 |
| | Primary IP PBX | When the local DHCP is enabled, specifies the primary entry for the DHCP Option 150. | 424.3 |
| | Secondary IP PBX | When the local DHCP is enabled, specifies the secondary entry for the DHCP Option 150. | 424.3 |

| | | | |
|---|---|---|---|
| Switch | Port ID | | 482.1 |
| | | | 482.2 |
| | | | 482.3 |
| | | | 482.4 |
| | VLAN ID | | 481 |
| Management | The Management Tab defines all the online and offline management details to the target VHEs. | | |
| | SNMP Read Community | Specifies the SNMP Read Communities | 409.5 |
| | SNMP Write Community | Specifies SNMP Write Communities | 409.6 |
| | SNMP ACL | When specified, an ACL can be defined to filter the source of the SNMP Messages. | 409.7 |
| | SNMP Traps & Informs | Specifies the SNMP Traps and Informs Destination | 409.9 |
| | SNMP Credentials | When SNMPv3 is required, specifies the SNMP credentials. | 409.8 |

Figure 31c

| Tab | | Field | Description | | | DB Field |
|---|---|---|---|---|---|---|
| 3105 | General | CPE Template Name | EU CPEs | | | 401 |
| | | CPE Code Name | cpe | | | 412.1 |
| | | Domain Name | mydomain.com | | | 412.2 |
| | | Platform | 881W | | | 406 |
| | | LAN Interfaces | 3 | | | 407 |
| | | Outside Interface | | | | 413.1 |
| | | | | | | 413.2 |
| | | | | | | 413.3 |
| | | VoIP Support | yes | | | 408.1 |
| | | Spouse & Kid Support | yes | | | 409 |
| | | HA Support | no | | | 404 |
| 3110 | | Network ID | 128001 | | | 601 |
| 3115 | | HA Group | null | | | 611 |
| | | CPE Template Enabled | yes | | | 402 |
| 3120 | LAN x | Wired Network Enabled/Disabled | | | | 422 |
| | | VLAN ID | 10 | 20 | 30 | 421 |
| | | VLAN Name | DATA | VOICE | GUEST | 423.4 |
| | | IP Subnet Pool (MIS) | Corp. Data | Corp. Voice | Spouse & Kid | 661 |
| | | IP Address Offset | Subnet ID + 1 | Subnet ID + 1 | Subnet ID + 1 | 423.5 |
| | | Wireless Bridge Enabled/Disabled | | | | |
| | | Wireless Interface | yes | yes | yes | 472 |
| | | SSID | data@gvo | voice@gvo | guest | 474.3 |
| | | SSID Broadcast | no | no | yes | 474.4 |
| | | Security Scheme | WPA2 | LEAP | WPA2 | 474.1 |
| | | Key/Passphrase | tryme | | welcome | 474.2 |
| | | User ID | | Ipphone | | 474.2 |
| | | Password | | myipphone | | 474.2 |
| | | Local DHCP Server Enabled/Dis. | | | | |
| | | Primary IP Helper | | | | 425 |
| | | Secondary IP Helper | | | | 425 |
| | | Address Pool Range | | | | 423.5 |
| | | Primary DNS | 10.99.0.1 | 10.99.0.1 | 194.98.65.65 | 424.2 |
| | | Secondary DNS | 10.99.0.2 | 10.99.0.2 | 194.98.65.165 | 424.2 |
| | | Primary IP PBX | | 10.99.0.250 | | 424.3 |
| | | Secondary IP PBX | | 10.99.0.251 | | 424.3 |
| 3125 | Switch | Port ID | Port 0 | Port 1 | Port 2 | Port 3 | 482.1 |
| | | | | | | | 482.2 |
| | | | | | | | 482.3 |
| | | | | | | | 482.4 |
| | | VLAN ID | 10 | 10 | 20 | 30 | 481 |

Figure 31d

| | | | |
|---|---|---|---|
| Management | The Management Tab defines all the online and offline management details to the target VHEs. | | |
| | SNMP Read Community | myrocommunity | 409.5 |
| | SNMP Write Community | myrwcommunity | 409.6 |
| | SNMP ACL | | 409.7 |
| | SNMP Traps & Informs | | 409.9 |
| | SNMP Credentials | | 409.8 |

Figure 31e

| Tab | Field | | Description | | | DB Field |
|---|---|---|---|---|---|---|
| General (3150) | CPE Template Name | | APAC CPEs | | | 401 |
| | CPE Code Name | | cpe | | | 412.1 |
| | Domain Name | | mydomain.com | | | 412.2 |
| | Platform | | 881W | | | 406 |
| | LAN Interfaces | | 3 | | | 407 |
| | Outside Interface | | | | | 413.1 |
| | | | | | | 413.2 |
| | | | | | | 413.3 |
| | VoIP Support | | yes | | | 408.1 |
| | Spouse & Kid Support | | yes | | | 409 |
| | HA Support | | no | | | 404 |
| | Network ID | | null | | | 601 |
| (3155) | HA Group | | Dual-Homing Group (128001, 255001) | | | 611 |
| | CPE Template Enabled | | yes | | | 402 |
| LAN x (3160) | Wired Network Enabled/Disabled | | | | | 422 |
| | | VLAN ID | 10 | 20 | | 421 |
| | | VLAN Name | DATA | VOICE | | 423.4 |
| | | IP Subnet Pool (MIS) | Corp. Data | Corp. Voice | | 661 |
| | | IP Address Offset | Subnet ID + 1 | Subnet ID + 1 | | 423.5 |
| | Wireless Bridge Enabled/Disabled | | | | | |
| | | Wireless Interface | yes | yes | | 472 |
| | | SSID | data@gvo | voice@gvo | | 474.3 |
| | | SSID Broadcast | no | no | | 474.4 |
| | | Security Scheme | WPA2 | LEAP | | 474.1 |
| | | Key/Passphrase | tryme | | | 474.2 |
| | | User ID | | ipphone | | 474.2 |
| | | Password | | myipphone | | 474.2 |
| | Local DHCP Server Enabled/Dis. | | | | | |
| | | Primary IP Helper | | | | 425 |
| | | Secondary IP Helper | | | | 425 |
| | | Address Pool Range | | | | 423.5 |
| | | Primary DNS | 10.99.0.1 | 10.99.0.1 | | 424.2 |
| | | Secondary DNS | 10.99.0.2 | 10.99.0.2 | | 424.2 |
| | | Primary IP PBX | | 10.99.0.250 | | 424.3 |
| | | Secondary IP PBX | | 10.99.0.251 | | 424.3 |
| Switch (3165) | Port ID | | Port 0 | Port 1 | Port 2 | Port 3 | 482.1 |
| | | | | | | | 482.2 |
| | | | | | | | 482.3 |
| | | | | | | | 482.4 |
| | VLAN ID | | 10 | 10 | 10 | 20 | 481 |
| Management | The Management Tab defines all the online and offline management details to the target VHEs. | | | | | |
| | SNMP Read Community | | myrocommunity | | | 409.5 |
| | SNMP Write Community | | myrwcommunity | | | 409.6 |
| | SNMP ACL | | | | | 409.7 |
| | SNMP Traps & Informs | | | | | 409.9 |
| | SNMP Credentials | | | | | 409.8 |

SYSTEMS AND METHODS FOR DETERMINING ENDPOINT CONFIGURATIONS FOR ENDPOINTS OF A VIRTUAL PRIVATE NETWORK (VPN) AND DEPLOYING THE CONFIGURATIONS TO THE ENDPOINTS

This application claims priority to provisional application 61/121,127, filed Dec. 9, 2008, entitled "Remote VPN Device Automation Engine", which is herein incorporated by reference.

FIELD OF INVENTION

The present disclosure relates in general to network communications and specifically to create improved virtual private networks over the Internet for general purposes, with unattended provisioning features for network service providers and virtualized physical platforms.

BACKGROUND

A Virtual Private Network (VPN) solution is a communication network that connects different private regions through another network. An Internet Protocol Secured (IPSec) VPN is a network that leverages a public infrastructure like the Internet as the transport mechanism. As it runs over a public network, the data is encrypted by the VPN devices as the data exits the regions using ciphering techniques like IPSec protocol to ensure privacy and avoid man-in-the-middle attacks. IPSec VPN technology can offer many improvements allowing the mass adoption of IPSec VPNs. IPSec VPNs can be Quality of Service (QoS)-aware so that they can transport multimedia-based traffic such as voice or video. However, building these QoS-aware IPSec VPNs can require cross domain expertise as these VPNs can include various technologies, such as, but not limited to: Voice over Internetwork Protocol (IP) and related signaling and QoS mechanisms, IP Security (IPSec and related security protocols), advanced IP dynamic routing understanding, wireless networking such as Wireless Fidelity (WiFi) or Worldwide interoperability for Microwave Access (WiMAX), advanced network bridging mechanisms, and so on.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 5-29 and 30-34 are diagrams illustrating building improved virtual private networks in accordance with embodiments of the invention.

FIGS. 30a-30e illustrate various tabs and fields in a VHE template form, according to one embodiment of the invention.

FIGS. 31a-31c illustrate various tabs and fields in a CPE template form, according to one embodiment of the invention.

Figure 1:
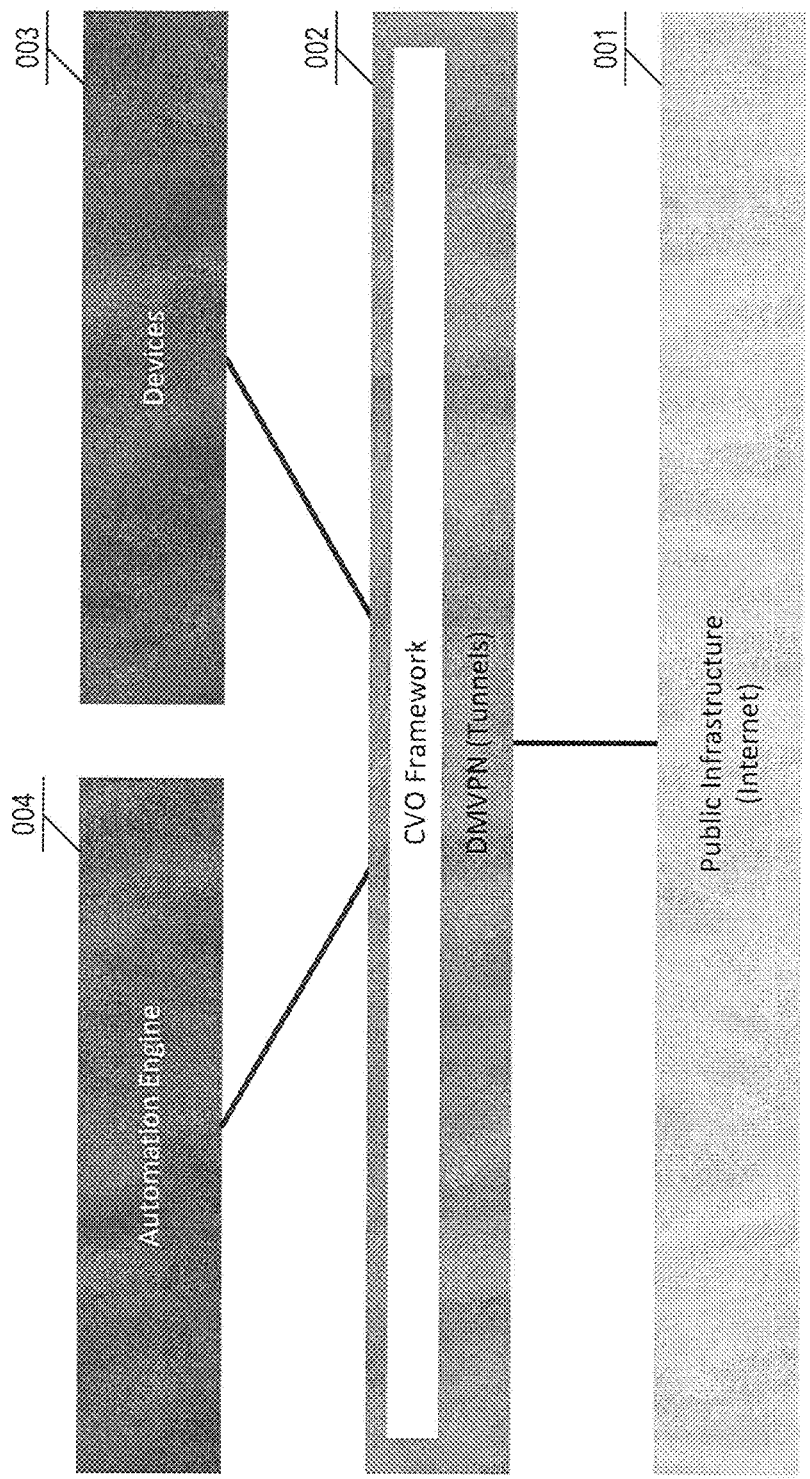
FIG. 1 is a block diagram illustrating a network communication network in accordance with some embodiments of the invention.

Skilled artisans will appreciate that elements in the figures are illustrated for simplifying and clarity and have not necessarily been drawn to scale. For example, the dimensions of some of the elements in the figures may be exaggerated relative to other elements to help improve understanding of embodiments of the present invention.

DETAILED DESCRIPTION OF THE FIGURES

Before describing in detail embodiments that are in accordance with the present invention, it should be observed that some embodiments are related to method steps and apparatus components related to providing faster Internet-based virtual private networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill In the art having the benefit of the description herein.

In this document, the terms "comprises", "comprising" or any other variation thereof, are intended to cover a non-exclusive inclusion, such that a process, method, article or apparatus that comprises a list of elements does not include only those elements but may include other elements not expressly listed or inherent in such process, method, article or apparatus. An element proceeded by "comprises . . . a" does not, without more constraints, preclude the existence of additional identical elements in the process, method, article or apparatus that comprises the element. In other words, "comprises . . . a" also means "comprises . . . at least one".

It will be appreciated that embodiments of the invention described herein may be comprised of one or more conventional network devices or endpoints and unique stored configurations that control the one or more network devices to implement, in conjunction with certain network circuits, some, most, or all of the functions of the method and apparatus for providing virtual private networks described herein. The network devices may include, but are not limited to, a central processing unit (CPU), volatile and non-volatile memory banks, network interface cards or ports, power source circuits and user input devices. As such, these functions may be interpreted as steps of a method that can deliver improved virtual private networks. Alternatively, some or all the functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will readily be capable of generating such software instructions and programs in minimal, and not undue, experimentation.

Description of Embodiments of the Invention

Embodiments of the present invention can be described in terms of methods for packet data telecommunications. Persons skilled in the art, however, will recognize that any computer system that includes suitable programming means for operating in accordance with the disclosed methods also falls well within the scope of embodiments of the present invention. Suitable programming means can include any means for directing a computer system to execute the steps of the method of embodiments of the invention, including for example, systems comprised of processing units and arithmetic-logic circuits coupled to computer memory, which systems have the capability of storing in-computer memory, which computer memory includes electronic circuits configured to store data and program instructions, and programmed steps of the method of the invention for execution by a processing unit.

Embodiments of the invention also may be embodied in a computer program product, such as a diskette or other recording medium for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of embodiments of the invention as embodied in a program product. Persons skilled in the art will recognize immediately that, although most of the example embodiments described in this specification are oriented to software installed and executing on computer hardware, nevertheless, alternative embodiments implemented as firmware or as hardware are well within the scope of the present invention.

Communication Network Architectures

Figure 3:
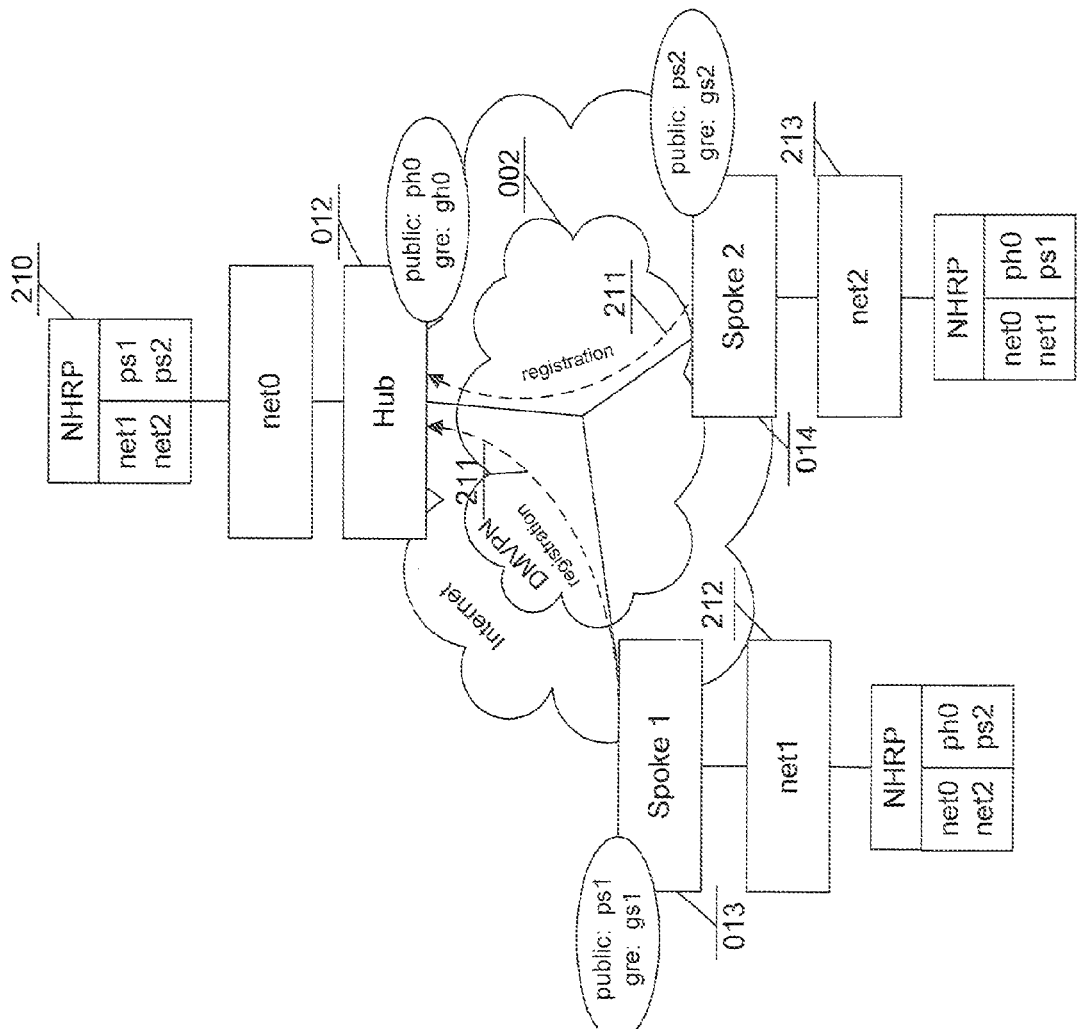
FIG. 3 is a prior art network diagram showing how some communications networks are set up today.
Figure 4:
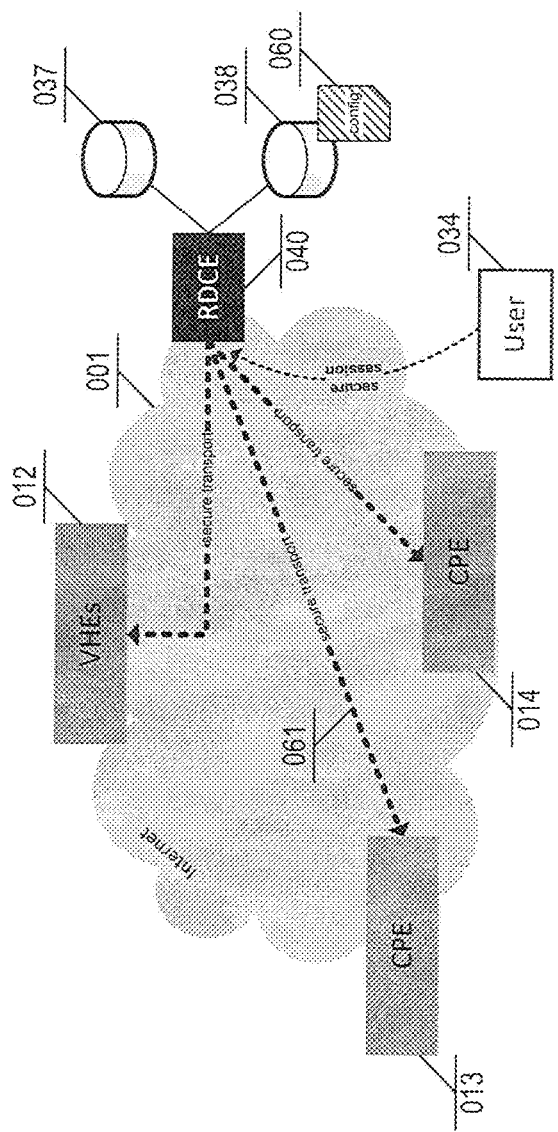
FIG. 4 is a network diagram illustrating further steps for building improved virtual private networks in accordance with the embodiments of the invention.

Methods, systems, and computer program products for routing telecommunications are explained with reference to the accompanying FIGS. 1-4. In particular, FIGS. 2-3 illustrate prior art communication networks, and FIGS. 1 and 4 illustrate communication networks in accordance with embodiments of the invention.

Figure 2:
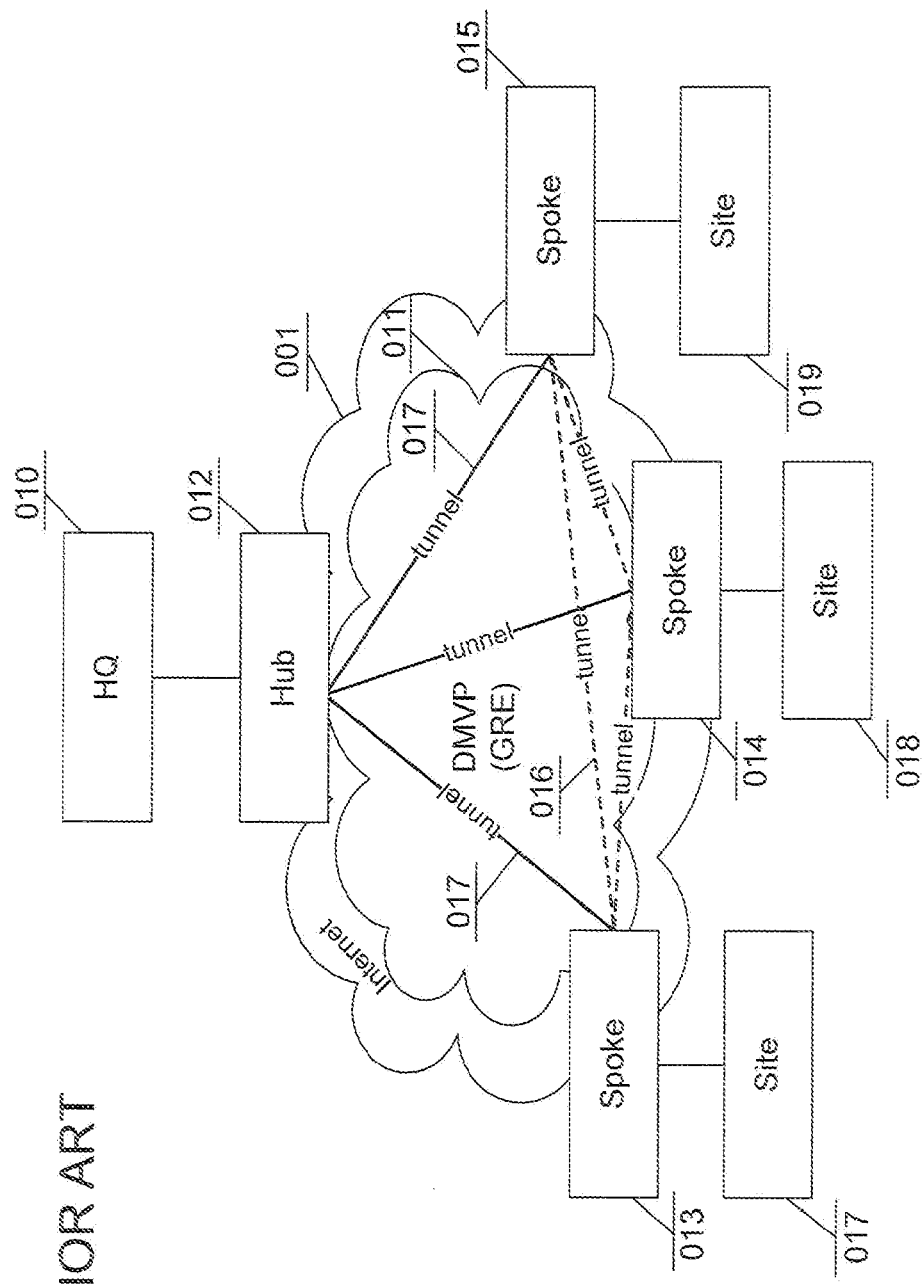
FIG. 2 is a prior art network diagram showing how some communications networks are set up today.

FIG. 2 sets forth a line drawing illustrating an example prior art system for routing computer networks. The term "network" in this specification can mean the art of communicating over a distance by a collection of computers connected by communication facilities for exchanging information or sharing resources. In this specification, 'data communications' can mean any form of data communications: wireless, 802.11 standards (Wireless Fidelity), 802.16 standards (WiMAX), Bluetooth, Infrared, radio, Internet protocols, HTTP protocols, email protocols, networks, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Connections can be permanent, via cable or wireless, or temporary, through telephone or other communications links designed to facilitate such communications between computers. In this specification, a computer can be any electronic device useful in the storage and processing of information. A computer can include personal computers, microcomputer, mainframe, laptop or any other digital device that stores and processes data that occurs to those of skill in the art. Connections can be achieved sending information in clear communication or in ciphered communication. Sending data in clear communication in this specification can mean a communication with data sent over the network without any ciphering, encrypting or hashing algorithm, hence the communication can be more exposed to data theft or manipulation. Sending data in ciphered communication in this specification can mean a communication with data sent over a network tunnel using security measures like the process of encoding electronic transaction information, to allow secure transmission of data over a network. The term "network tunnel" in this specification can mean a point-to-point connection over which packets are exchanged in a secure way. The term "VHE", unless explicitly stated to the contrary, can refer to the "VPN head-end", "VPN aggregator" or "hub". The term "CPE", unless explicitly stated to the contrary, can refer to "Customer Premises Equipment", "VPN device" or "spoke".

Virtual Private Networks (VPNs) can be a technology that uses a public network to deliver secure connectivity between sites by creating ciphered virtual circuits (or tunnels). VPNs can be a cheaper alternative to private circuits that can be rented from service providers. Although private circuits offer much better service with higher service level agreements (SLAs), they are available at a much higher expense. The gap between the level of service for a private or for a virtual circuit is obvious enough so that any decision around choosing one from the other is an easy choice. But as the technology around virtual circuits and the VPN technology in general is constantly improving, a new set of applications based on VPN networks can appear. Teleworking or backups are examples of these applications. One inconvenience with VPN networks is the complexity that can grow with the number of sites that are to be inter-connected. It thus can become more difficult to provision and configure aspects of the VPN network devices or endpoints participating in a VPN network.

For example, as shown on FIG. 2, three sites (018, 019, 020) can be connected to the headquarters (010) using virtual circuits (017) over the Internet (001). A virtual circuit can be the result of coupling two endpoints (hub 012 and spokes 013, 014, 015) with each other with specific parameters that make their peering agreement unique, and as a consequence, helps prevent the data from being intercepted, corrupted or usurped. However, a peering agreement may be only valid between two endpoints. In the example, there is a peering agreement (017) between the headquarters endpoint (hub 012) with each of the remote site endpoints (spokes 013, 014,015). Should some data require being exchanged directly between two remote sites (018, 019), another peering agreement may need to be set in order to establish a virtual circuit (016) between the endpoints (spokes 014, 015) of these sites (018, 019), increasing the administration burden. For a VPN deployment with n sites, the complexity can be $(n-1)^n$ tunnels for a fully meshed implementation. Each tunnel may need to be configured manually. Fortunately, new VPN technologies can remove that burden by making one device the pivot node of the network. The pivot node is a node receiving all or a partial portion of the traffic from the network.

An example of such VPN prior art technology is a Dynamic Multipoint VPN (DMVPN) solution created by Cisco Systems, which can rely on the pivot concept. DMVPN networks can be an enhancement of traditional IP Security (IPSec)-based networks, and can rely on IP Security (IPSec) protocol, Generic Routing Encapsulation (GRE) and Next Hop Resolution Protocol (NHRP). The IPSec protocol is described above. GRE can be a tunneling protocol designed to encapsulate a wide variety of network layer packets inside IP tunneling packets. A tunneling protocol can be used when one network protocol called the payload protocol is encapsulated within a different delivery protocol. FIG. 1 illustrates a GRE tunneling protocol, which can be used to provide a cloud of virtual paths (the DMVPN (002)) from an automation engine (004) and devices (003) through an untrusted network (Internet 001). The DMVPN can remove the need for pre-configuration of static peers into a VPN device configuration in order to establish a virtual circuit. In fact, every VPN device is only peered to the pivot node and can reach any other VPN device of the DMVPN network. Thus, within each VPN device configuration, only the pivot node needs to be registered.

The dynamic aspect of DMVPN can be provided through the NHRP protocol. NHRP can be the protocol used to translate the public IP addresses—also called Non-broadcast Multiple Access Network (NBMA) addresses—to the target remote site IP subnets. An NBMA network can be a network to which multiple computers and devices are attached, but data is transmitted directly from one computer to another over virtual circuits like the GRE network.

The pivot device or VPN head-end can act as an NHRP server (also known as the Next Hop Server. (NHS) where the other VPN devices or CPEs are NHRP clients, also known as Next Hop Clients (NHC)). The VPN head-ends can also be called "hubs" and the CPEs can also be called "spokes". Hubs can be devices that have the role of aggregation and can be in charge of maintaining a database with all the information of the spokes within the DMVPN network. (Note that the term database can also be referred to as a repository or table throughout this disclosure.)

When connecting for the first time on the DMVPN network, the spoke can perform a registration to the NHS server, which registration creates an NHRP map of the spoke NBMA IP address to the IP subnets on the internal network side of the spoke. For instance, if the spoke has three internal network interfaces (and therefore three IP subnets on its internal side), the NHRP entry can map the spoke NBMA IP address to those three internal IP subnets. The hub can have two functions: serving as an NHRP cache and server to the remote sites; and serving as a NHS server, both to the remote sites and to other VPN head ends. As shown on FIG. 3, a DMVPN network (002) can be built on top of the Internet (001). A table (210) can be built by the hub (012) at the registration process (211) of the spokes (013, 014). All spoke IP addressing details can be recorded at that time, including both the internal LAN network details (IP subnets 212, 213) and public IP addresses. In the case of GRE, Next Hop Resolution Protocol (NHRP) can be used to translate the NBMA IP addresses to the target LAN IP subnets (212, 213).

Referring back to FIG. 2, the VPN head-end or VPN aggregator (012) can aggregate all the tunnels (017) from the remote endpoints (013, 014, 015), creating a fully meshed network with just one tunnel (017) configured on each endpoint. When a data flow goes from a hub (012) to or from a spoke (013, 014 or 015), or from one spoke to another spoke via the hub, the type of traffic flow can be called hub-to-spoke (017). This can refer to a point-to-point GRE network (p2p GRE). When a data flow goes from a spoke (013, 014 or 015) to another spoke (013,014 or 015), the type of traffic flow can be called spoke-to-spoke (016). This can refers to a point-to-multipoint GRE network or multipoint GRE network (mGRE). mGRE networks can have all the specifications of the p2p GRE network with the improvement of a spoke capable of directly reaching another spoke without the traffic to transit via a hub (assuming the underlying network on which the GRE network is built is capable of routing from one spoke to another; which is the case when the Internet used as the underlying network). For instance, if the mGRE network consists of one hub and two spokes, those two spokes can directly exchange traffic with each other without sending any of this traffic to the hub. The hub need only participate in establishing the direct connections between the spokes.

VPNs can be a great solution as the underlying network layer in an enterprise domain to deliver applications that do not require a strong service level agreement. However, the more sophisticated the VPN technology, the heavier the implementation burden can be Those skilled in the art can appreciate this burden, which can include, but is not limited to: IP addressing plans, IP routes management, or X.509 certificate management; or any combination thereof. Such a burden can be especially difficult on a DMVPN network.

FIG. 4 illustrates a system that comprises a remote device automation engine (040), which can be capable of providing intelligent automation around all aspects of the VPN provisioning process. In many embodiments of the present invention, the VPN devices (012, 013, 014) that are part of a DMVPN network can be advantageously configured by the automation engine (040) with a reduced amount of human intervention. In many alternative embodiments, the remote device automation engine (040) can remotely configure the VPN devices (012,013, 014) with a fully dynamically generated configuration (060) set sent using various protocols such as telnet (an underlying TCP/IP (Internet Protocol Suite) for accessing remote computers), SSH (Secure SHell), SCP (Secure Copy Protocol), TFTP (Trivial File Transfer Protocol), FTP (File Transfer Protocol), HTTP (HyperText Transfer Protocol), or any other protocol that will occur to those skilled in the art.

Generating VPN Customized Configurations

Remote Device Automation Engine.

Figure 5:
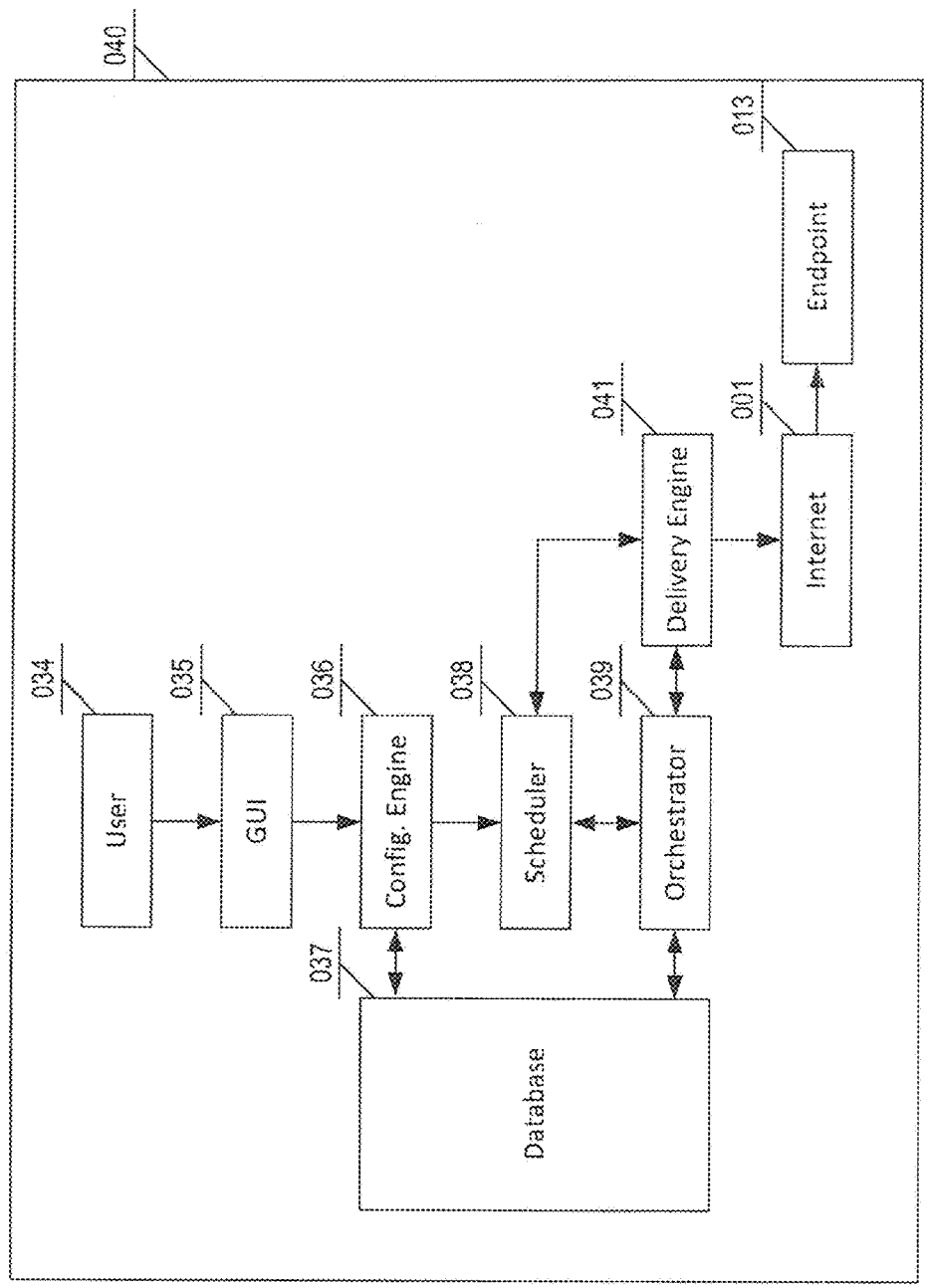

FIG. 5 illustrates details of the example remote device automation engine (040) introduced in FIG. 4. The example remote device automation engine (040) can be used to generate at least one automated VPN customized configuration, by: accepting, using at least one user interface, parameters required for building the configurations from at least one user, the configurations enabling the endpoints to process a mixture of real-time and non-real-time data, and the parameters comprising: endpoint IP addressing scheme information and endpoint design information; automatically generating, using at least one configuration engine, complete customized endpoint configurations for the parameters with no further input required from the user; and deploying, using at least one scheduler, the configurations to the endpoints of the virtual private network. Next generation VPN networks (which can include a mixture of time sensitive and non-time sensitive data) are more advance than simple VPN networks in that they deliver a more advanced experience to end users (e.g., including voice, video and real-time content).

It should be noted that the deployment of QoS aware voice, video, and real-time data enabled IPSec-based VPN networks can introduce a significant management overhead and associated costs in addition to high complexity as associated potential mistakes and errors regularly compromise the success of the deployments. A team of experts is sometimes required to manually deploy voice, video, and real-time data IPSec-based VPNs, and they must use a combination of disparate management platforms and custom programming to create the desired solution. This is a time-consuming and highly manual process that can require weeks to deploy a pilot, months to deploy a production network, and can require on-going manual maintenance to keep the network in production. Some embodiments of the invention described above can solve the inadequacies of current techniques and create a solution for the automated deployment, provisioning, and maintenance of the most advanced QoS aware voice, video, and real-time data enabled IPSec-based VPN networks To create a new VPN, a user can enter the following information into, for example, a graphical user interface (GUI):

1. An IP addressing scheme (described in more detail below in the Registering Master IP Subnets section below).

2. A description of how endpoints should be designed (described in more detail below in the Templates section below) Note that this can include, for instance, the number of internal interfaces, how interfaces (both wired and wireless) should be numbered, or how security should be handled, or any combination thereof.
3. Whether the network will have some resiliency built-in (described in more detail in the Registering HA Groups section). Note that this can include, for instance, how endpoints should be deployed in order to support failures resulting in a resilient and more robust network design.
4. How endpoints can be authenticated so that they can join the network (described in more detail below in the Registering PKI Root CAs section)

The deployment of an endpoint can comprise, for example:
1. Creation of the endpoint in the repository using a GUI. Using the parameters stored in the repository, the example remote device automation engine (040) can create the endpoint specific settings and add them to the repository.
2. Generating the hardware-specific configuration script of the endpoint (discussed in more detail below in the Orchestrator section). Using the specific settings of the target endpoint stored in the repository, the example Orchestrator can generate the hardware-specific configuration script.
3. Delivering the configuration to the endpoint (discussed in more detail below in the Delivery Engine section.) The generated configuration script can be sent to the target endpoint by the Delivery Engine. The endpoint can join the network automatically.

For example, FIGS. 7, 8a, 8b, 8c, 8d, 16 to 26 and 28 describe a process where database tables are populated. Each field has an identifier (shown after the '~' symbol). The identifier shown in the dashed area shows the value allocated to the field when written in the database. Some values can be provided by a user (e.g., illustrated using a '👤' symbol). Other values can be calculated by the example remote device automation engine.

Figure 8A:
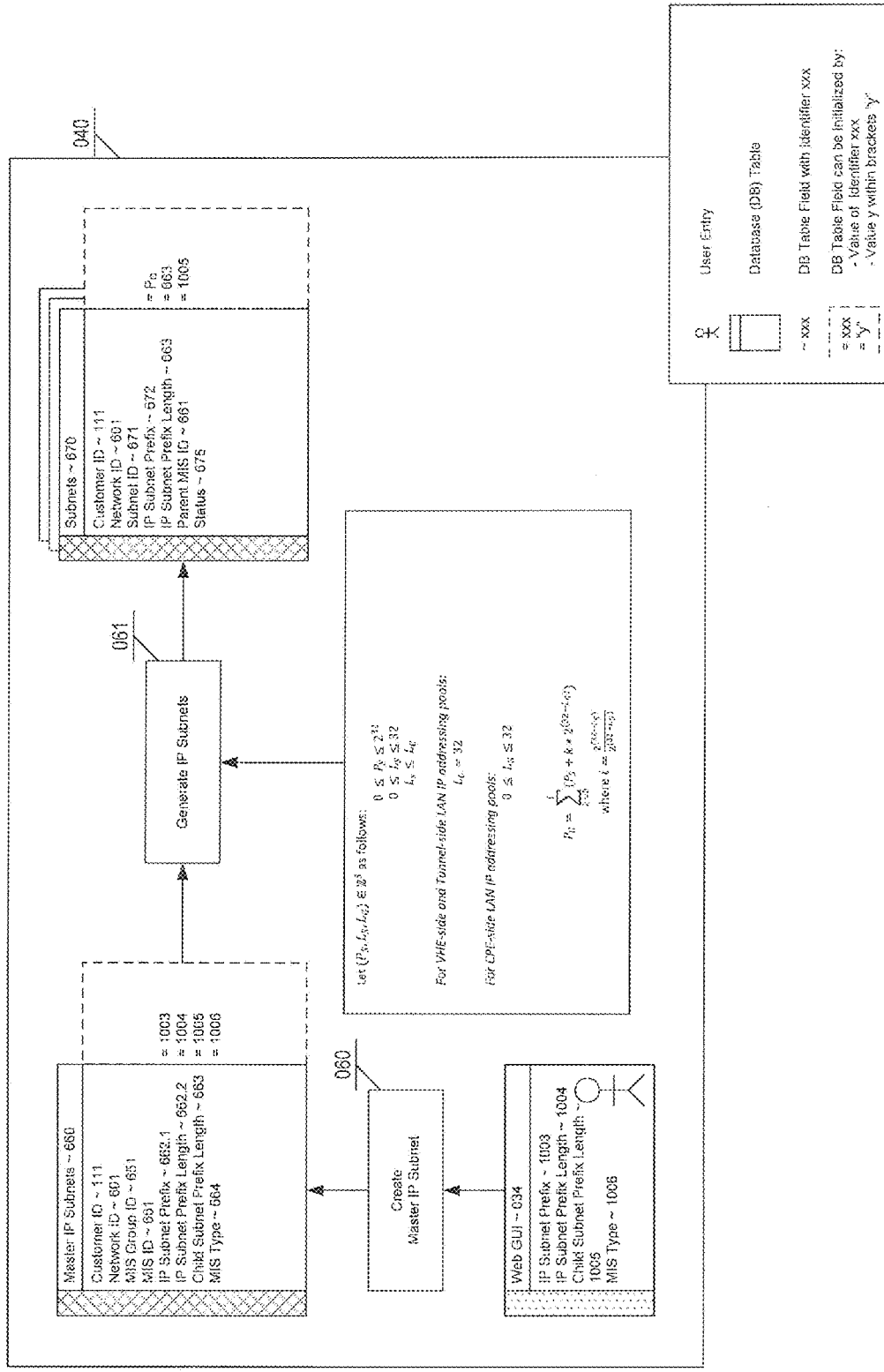

For example, in FIG. 8a, the user '👤' can provides an entry called "IP Subnet Prefix" that has the identifier (1003). When creating a Master IP Subnet entry in Supernets table (660), the IP Subnet Prefix field (662.1) can be initialized with the value of the identifier (1003) given by the user '👤'. Once the information in Web GUI (034) has been entered by the user, the customized endpoint configuration can be automatically generated by the remote device automation engine (040).

Figure 33A:
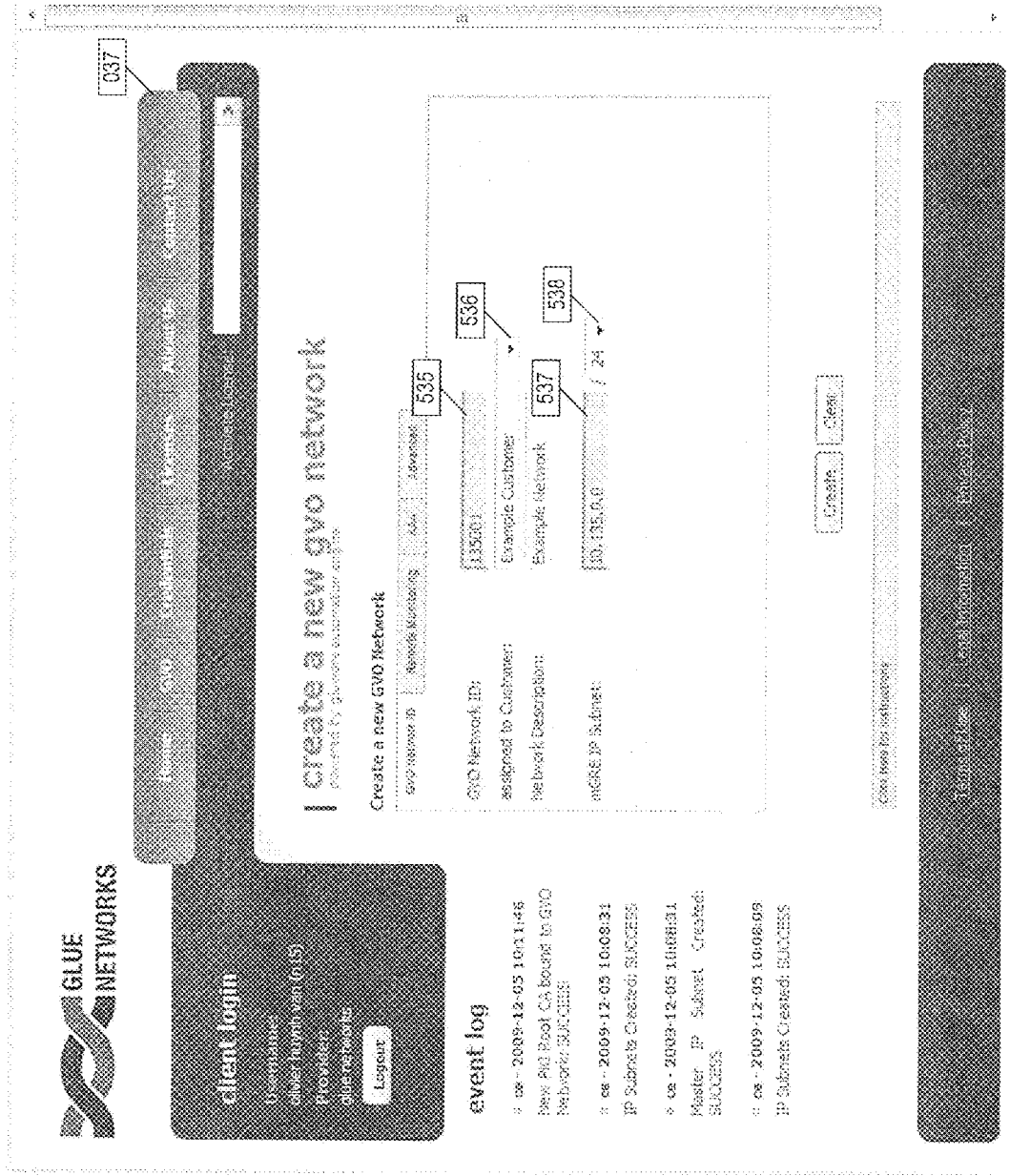
Figure 33B:
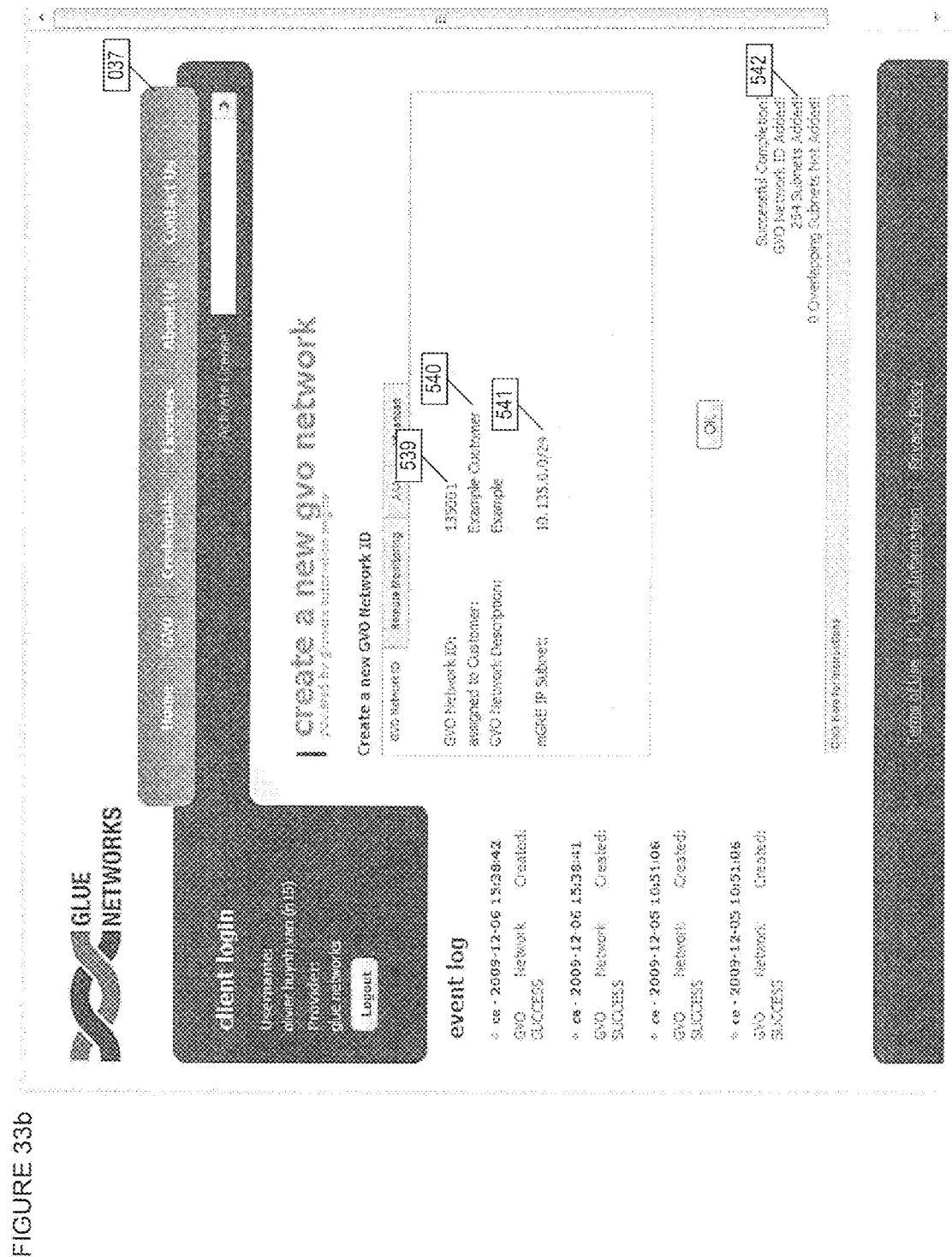
Figure 33C:
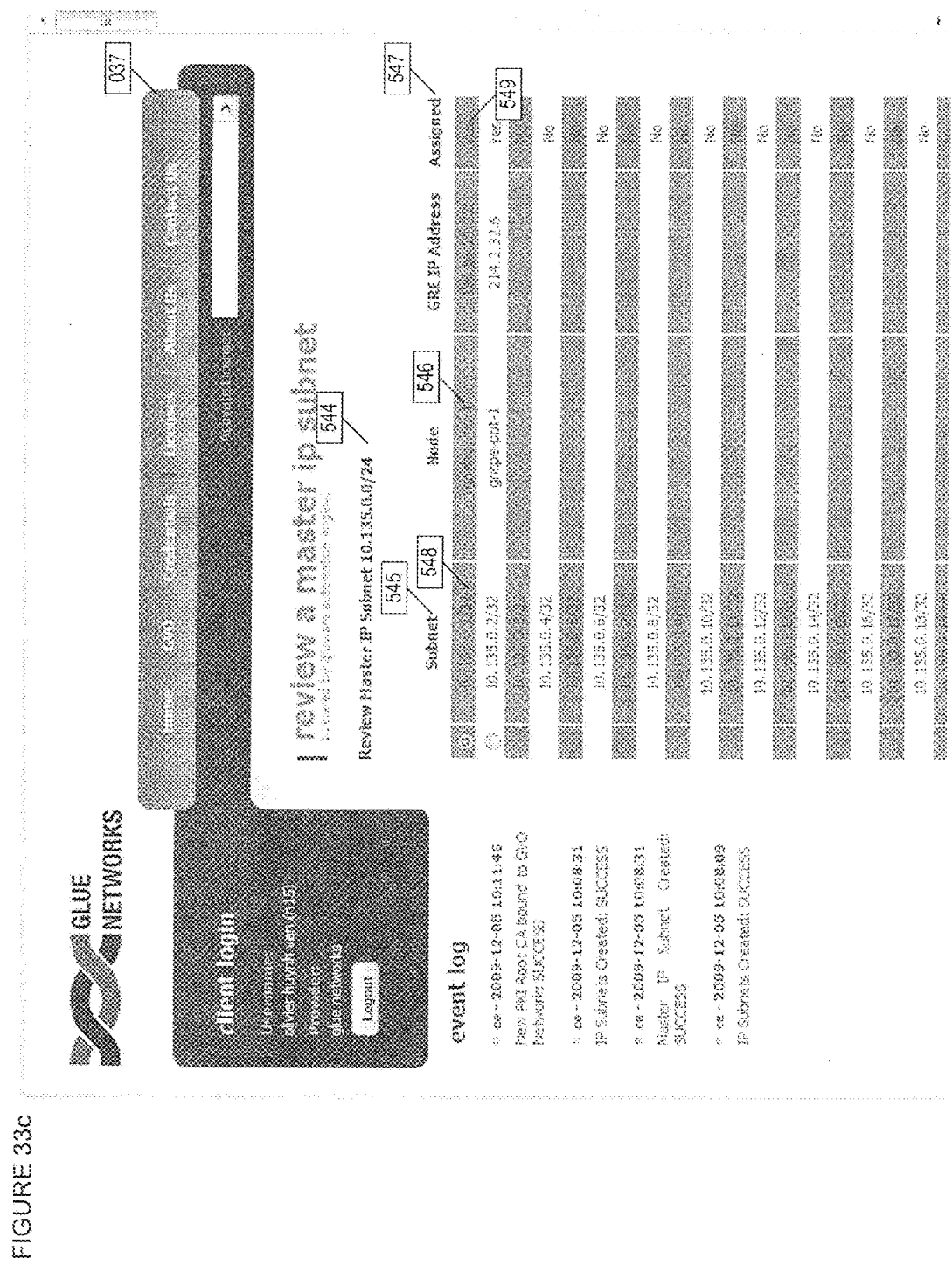
Figure 33D:
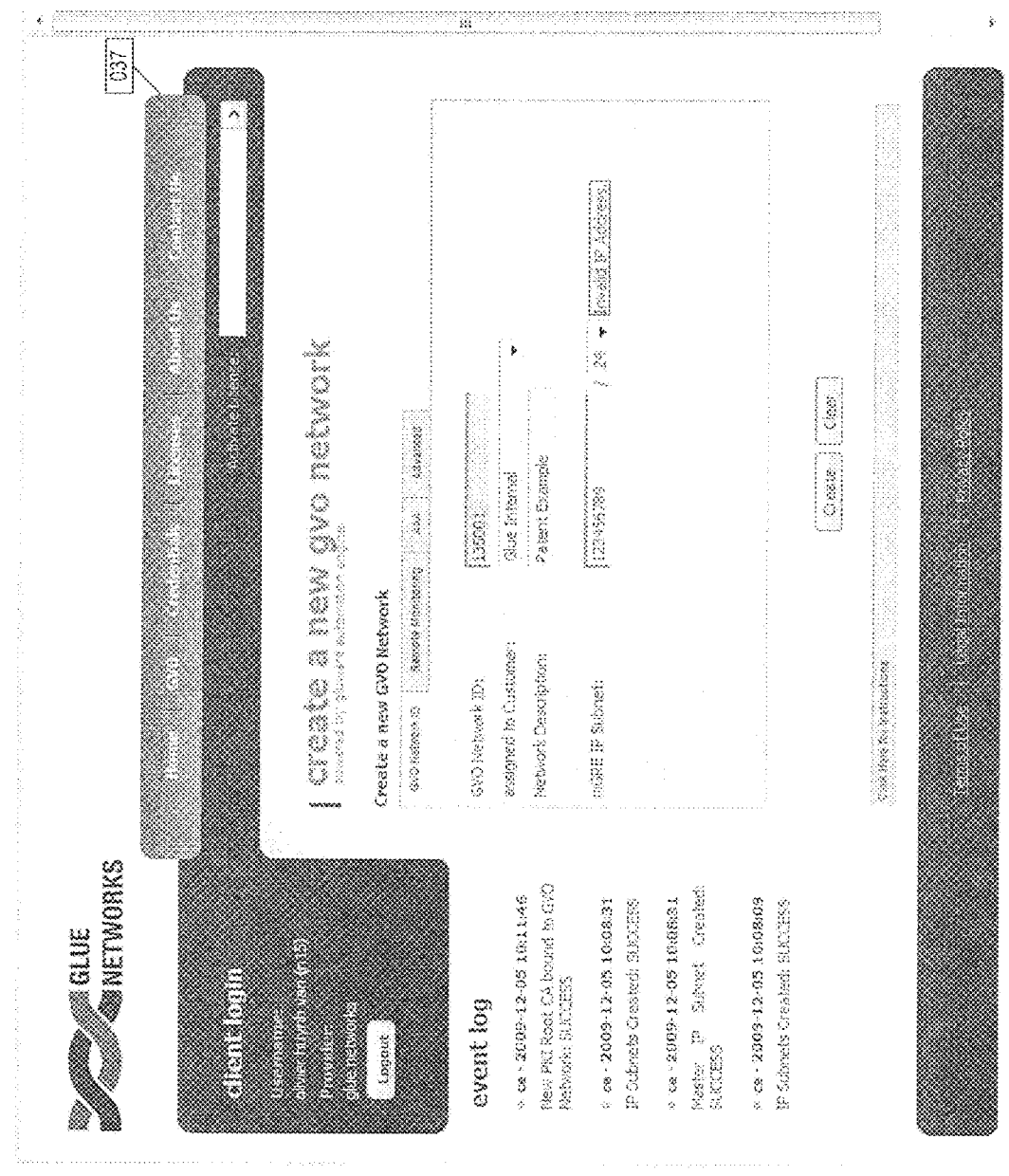
Figure 34:
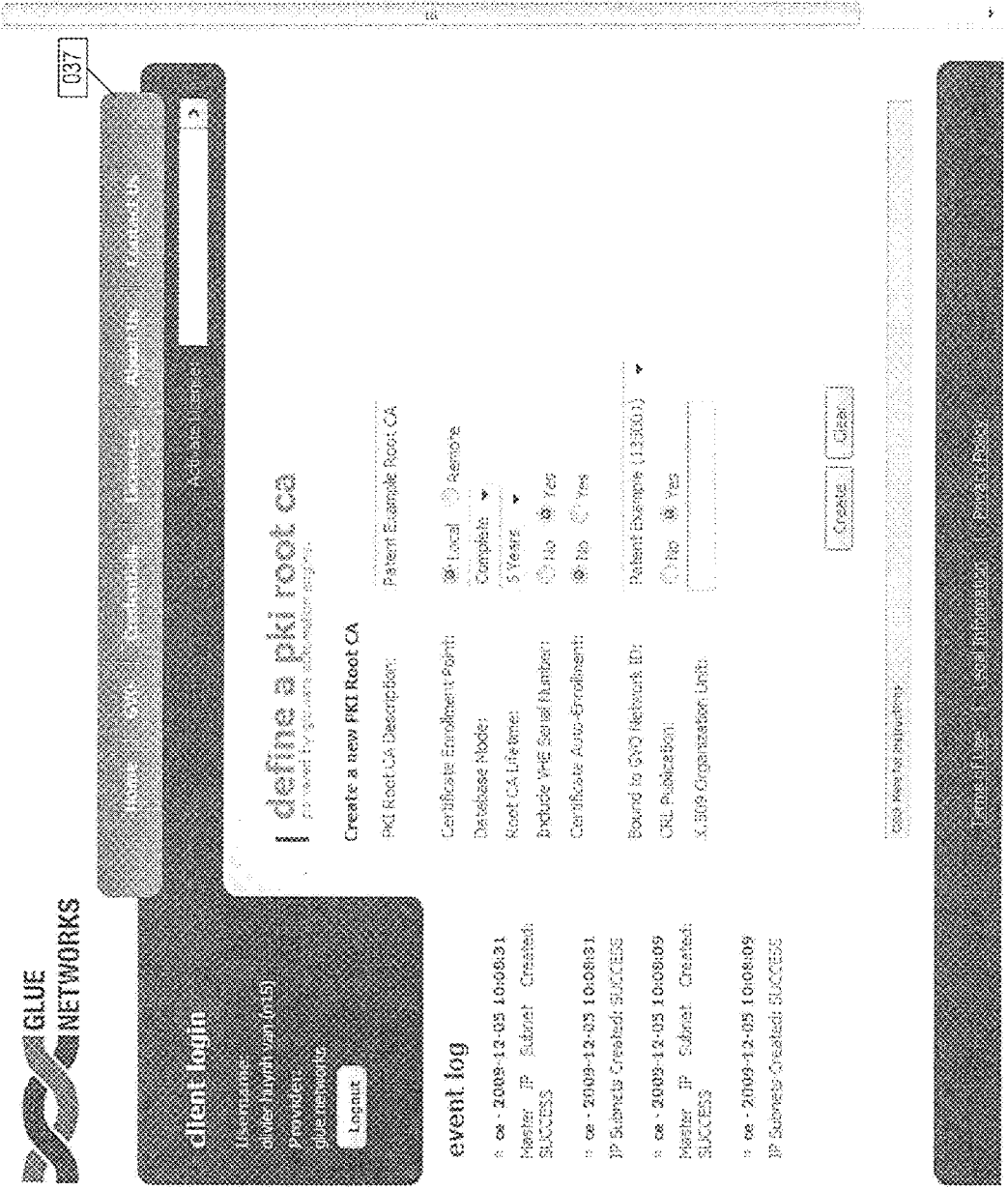

Referring to FIG. 5, many modules of the remote device automation engine (040) are illustrated: the configuration engine (036) and its database (037), the GUI (035), the orchestrator (039), and the scheduler (038). FIG. 5 illustrates these modules and how, in one embodiment, they can be related to each other. The different elements required for building a network can be input by a user (034) using the GUI (035). FIG. 13 illustrates an example of elements captured by the GUI (035). In that example, four fields (500, 501, 502, 503) are provided by the user to create a new network: a network ID (500), a network description (501), an mGRE IP Subnet Prefix (502) and an mGRE IP Subnet Prefix Length (503). Referring back to FIG. 5, the data entered by the user can be validated by the configuration engine (036) and then stored in the database (037). The validation process can help ensure the consistency of the data stored in the configuration engine repository (037). For example, if the expected data is an IP address, the validation will only pass if the submitted data is of an IP address type. FIG. 33d illustrates the validation process where the entry provided in the mGRE IP Subnet Prefix field (502) is invalid, as an IP address notation (A.B.C.D) is expected. As the entered data is not validated, the GUI (035) rejects that entry (506).

Referring back to FIG. 5, each element (e.g., nodes or endpoints, groups, users, etc.) in the example remote device automation engine (040) can be stored in the database (037) with a unique identifier, which can be called an object ID. The object ID can be a way to provide a unique identifier within the configuration engine repository. For example, the unique identifier can take the form of a fixed length 32-byte string, such as an MD5 hash as defined under RFC 1321. Those of ordinary skill in the art will see that the unique identifier can take many other forms.

The data can comprise the endpoint profiling elements (e.g., templates) of the network from which the configuration engine of the example remote device automation engine (040) can automatically dynamically generate complete bespoke (i.e., customized) endpoint (013) configurations with no human intervention. The bespoke configuration generation and delivery can be achieved by an automation engine as explained in more detail in the "Target VHE Endpoint Dynamic Configuration Generation" and "Target CPE Endpoint Dynamic Configuration Generation" sections of this document.

When a deployment is triggered by the user (034), the configuration engine (036) can use the profiling elements stored in the database (037) to build the target endpoint (013) configuration into the database (037). As soon as the target endpoint configuration is built, the configuration engine (036) can then invoke the scheduler (038). The scheduler (038) can be the module in charge of managing the deployment tasks along the time line. As the configuration generation and delivery are achieved in an automated way, the tasks to be performed are scheduled in the scheduler (038) as planned actions. This is a way for the example remote device automation engine (040) to share the workload into reasonable time slots and to avoid resource starvation or connection bottlenecks.

The scheduler (038) can then invoke the orchestrator (039). The orchestrator (039) is the module in charge of generating the proper endpoint configuration code. For instance, in the case of an endpoint (013) being a Cisco (Internetwork Operating System) IOS device, the generated code can be an IOS-based command script. For example, the orchestrator (039) can use template scripts to create the target endpoint configuration shown on FIG. 13. The template scripts (508) can be static hardware specific (e.g. Cisco IOS scripts) scripts with wildcard fields (510). The wildcard fields (510) can represent dynamic values that are taken from at least one table (507) of the database (037). The template script (508) shown in FIG. 13 is for a Cisco IOS router. This template IOS script (508) can allow the example remote device automation engine (040) to define some settings for a tunnel interface of a Cisco IOS Router, in particular some NHRP settings. This template IOS script (508) can contains wildcards (defined by ##Fieldxxxxx## where xxxxx is a number). These wildcards can take any value. The example remote device automation engine (040) can use the information stored in the database (037) to determine the values of these wildcards. For example, the value for the wildcard ##Field18101## (in 508 of FIG. 13) is 135001 (in 509 of FIG. 13). When done, the IOS script (which no longer has wildcards) (509) can be ready to be delivered to the target IOS router.

Referring back to FIG. 5, as soon as the orchestrator (039) has built the endpoint configuration code, the delivery engine (041) can deliver that configuration to the target endpoint (013). As stated earlier, the delivery engine can use any kind of available transports to perform this task, such as, but not limited to telnet, SSH, SCP, TFTP, FTP, HTTP or any other protocol that will occur to those skilled in the art. In some case, where the communication between the example remote device automation engine (040) and the endpoint (013) is not reliable, the delivery engine (041) can also be capable of resuming the configuration delivery tasks. For instance, if a power outage occurs when the delivery engine (041) is performing an action on the endpoint (013), the delivery engine (041) can automatically re-schedule the delivery task and addition endpoint (013) configuration inspection to discover any missing elements of the target configuration.

Figure 6:
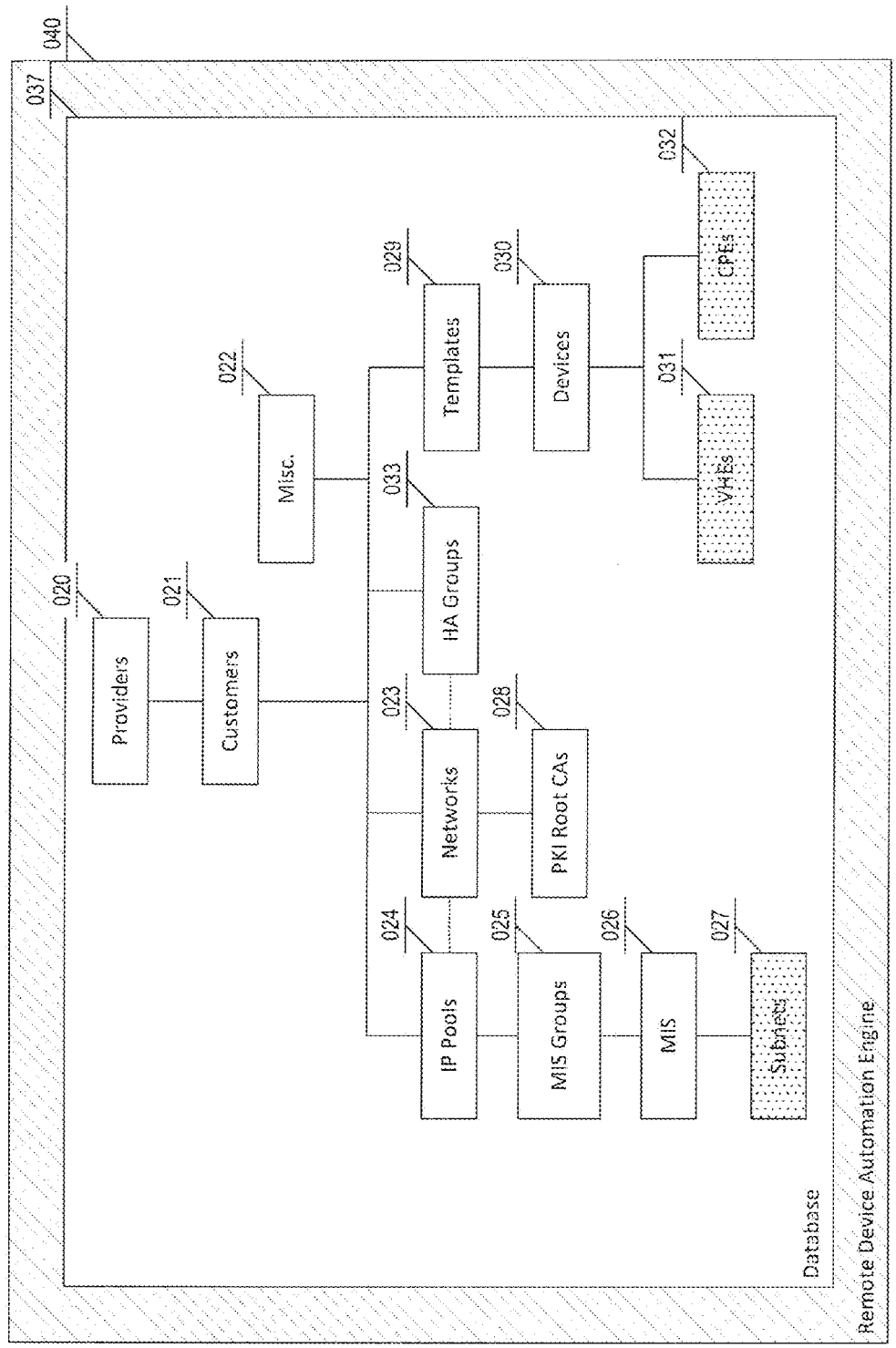

The design of the example remote device automation engine (040) has been made in a manner that allows mass deployment of end points (013) with a minimum of actions required by the user (034) using this example remote device automation engine (040), even though each endpoint (013) configuration can be unique. Those skilled in the art will appreciate that, for instance, network addresses, X.509 certificates or hostnames can be unique. Also, in some embodiments, all the endpoints might not belong to the same network or to the same customer. That is why, as shown on FIG. 6, the database (037) of the example remote device automation engine (040) can be structured to support multi-tenancy: under the provider level, which is the highest level of credentials in the hierarchy. This can allow the creation of many providers which can have as many customers as needed. Below the customer level, there can be many customer-level objects, such as, but not limited to, networks (023), Public Key Infrastructure (PKI) Root Certificate Authorities (CAs) (028), endpoint templates (029), High Availability (HA) groups (033), or IP address pools (024), or any combination thereof. IP address pools (024) can include, but are not limited to: Master IP Subnet (MIS) groups (025), IP Master IP Subnets (MIS) (026), IP Subnets (027), and miscellaneous other data comprising of, but not limited to: activity logs, security rules, routing policies, or licensing information, or any combination thereof.

The network level (023) can include all the foundation parameters required to build a DMVPN network. The network level (023) can include, but is not limited to, networks (023), network-level HA groups (033), network-level IP address pools (024), PKI Root CAs registration details (028) and network-level endpoint templates (029). The customer level (021) can comprise, but is not limited to: networks (023) that belong to the same customer along with the customer-level HA groups (033), customer-level IP address pools (024), customer-level endpoint templates (029) and other customer specific information such as, but not limited to: user credentials, logging records, or licensing details, or any combination thereof. The provider level (020) can include any customer that has purchased a license(s) to use the service. A customer can have the option to manage the VPN networks themselves after deploying the VPN devices and VPN headends, or can choose to have the provider perform that task on their behalf. The provider level (020) comprises of, but is not limited to, customers (021) (and their networks) and provider specific information such as, but not limited to: user and customer credentials, logging records, or licensing details, or any combination thereof. The dashed line between the IP pools (024), HA groups (033) and the networks (023) within FIG. 6, indicates that IP pools (024) and HA groups (033) can be bound to a particular customer (021) or to a particular network (033): customer-level or network-level IP pool (024) or customer-level or network-level HA group.

The example remote device automation engine (040) can rely on network foundation parameters that include, but are not limited to: a platform repository, IP address pools, network IDs, High Availability (HA) groups and templates.

Manage all Hardware Platforms.

Figure 7:
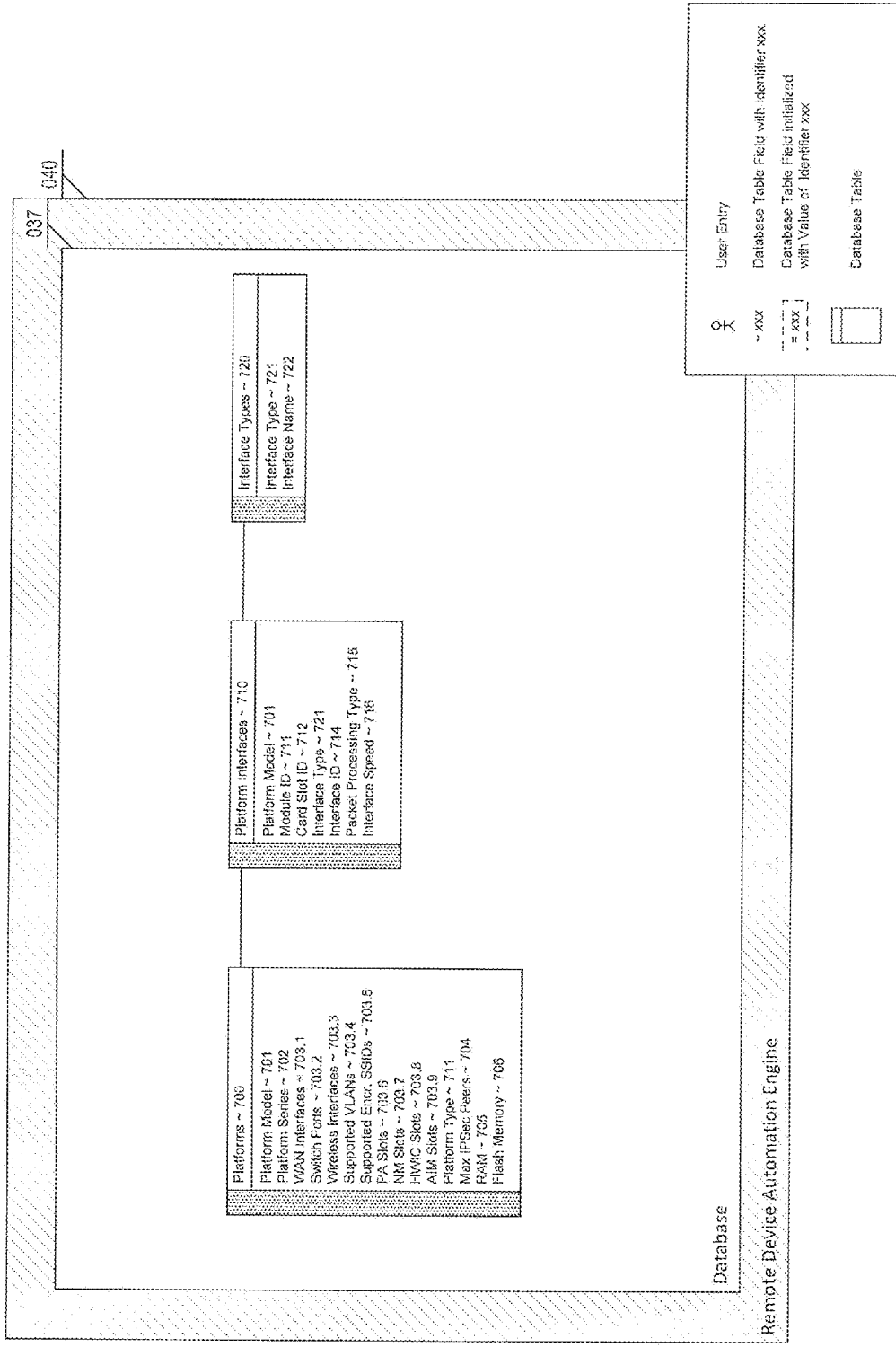

FIG. 7 sets forth a flow chart illustrating an example method for the remote device automation engine (040) to manage all hardware platforms with all possible combinations of field upgradable parts (FUP), such as, but not limited to, additional cards or interfaces to build a platform repository.

The platform repository (700) can include all supported hardware vendor platforms needed to build the network and their associated technical details. This platform database (700) can include, but is not limited to: the platform model (701), the platform series (702), the number of interfaces (routed, switched, wireless) (WAN interfaces 703.1, switch ports (703.2), wireless interfaces (703.3), supported encrypted SSIDs (703.5)), the number of virtual LANs (703.4), the performance-related parameters (e.g., the maximum amount of concurrent tunnels (Max IPSec Peers) supported (704)), the amount of flash memory (706), the amount of Random Access Media (RAM) memory (705), the number of field upgradable parts like interface cards (703.8), network modules (703.7), port adapters (PA) slots (703.6), or service cards or advanced integrated modules (AIM) (703.9), or any combination thereof. The platform repository (700) can help prevent misconfigurations, such as attempting to deploy parameters or options not supported by a target platform.

The platform interfaces 710 can comprise, but are not limited to: the platform model (701), the module ID (711), the card slot ID (712), the interface type (721), the interface ID (714), the packet processing types (715), or the interface speed (716), or any combination thereof.

The interface types 720 can include, but are not limited to: interface type (721) and/or interface name (722).

It should be noted that the IP address pools (024) can be a set of network addresses that can be used within the DMVPN network for the devices to communicate. As a reminder, in computer networks based on the IP protocol, a subnet can be a portion of the computers and devices that have a common, designated IP address routing prefix within the same network. A routing prefix can be the sequence of leading bits of an IP address that precede the portion of the address used as host identifier. All devices in a VPN network can have unique network addresses (e.g., IP addresses). Planning and managing the network addressing plan can be a complicated task and any mistake can lead to overlapping addresses or black holes. (Note that all data sent to black holes may be lost.) Adding one misconfigured device can bring an entire network down. Also, the more IP routes a network has, the larger the routing traffic overhead may be. Hence the need for a consistent network addressing plan allowing network summarization or other network optimization techniques. The example remote device automation engine (040) can generate small IP network routing prefixes from larger network prefixes to build a subnet repository and manage the VPN network IP addressing plan accordingly in an errorless fashion.

Registering Master IP Subnets (MIS), Network IDs, HA Groups, PM Root CAs.

Figure 8B:
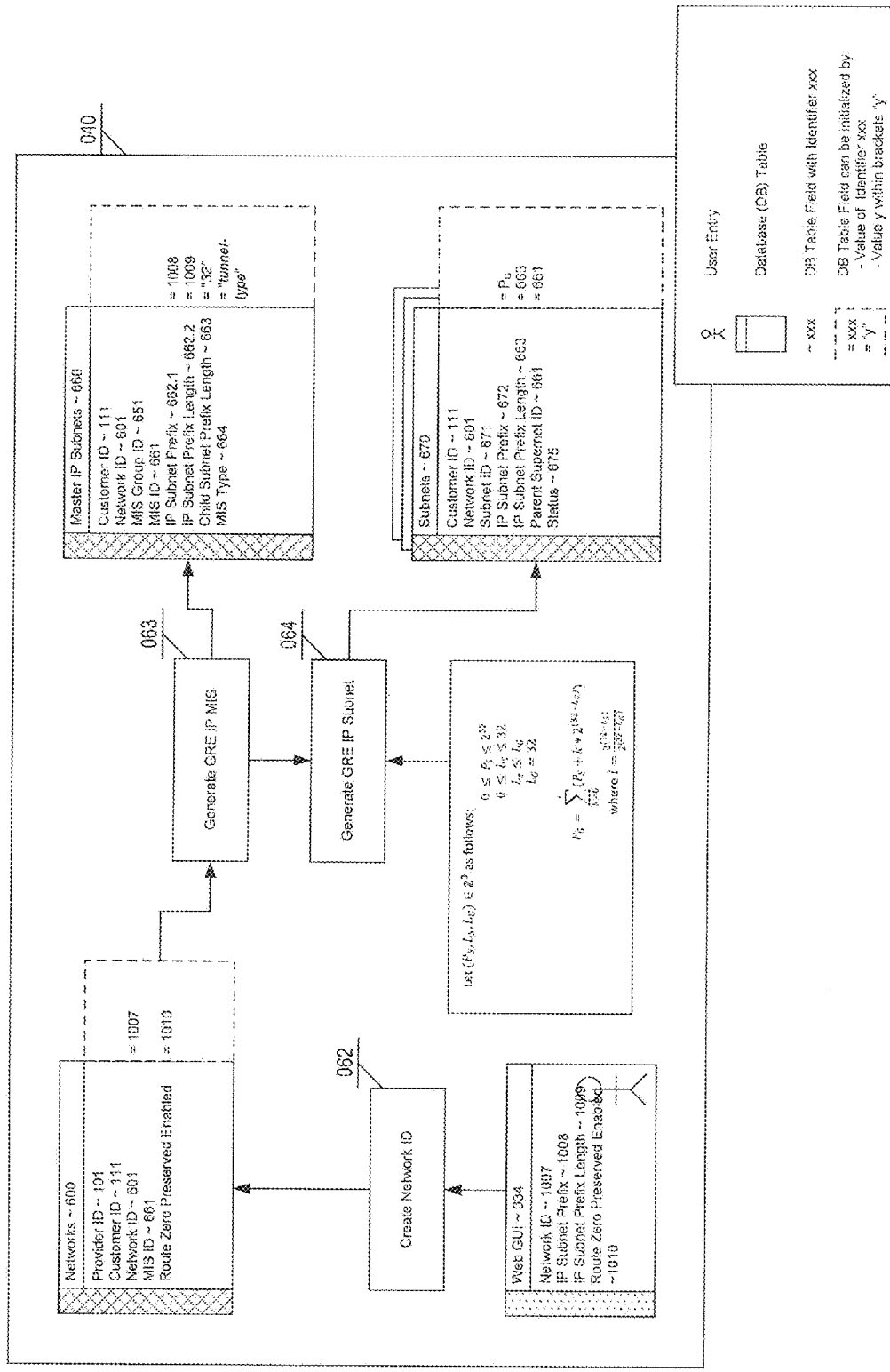
Figure 8C:
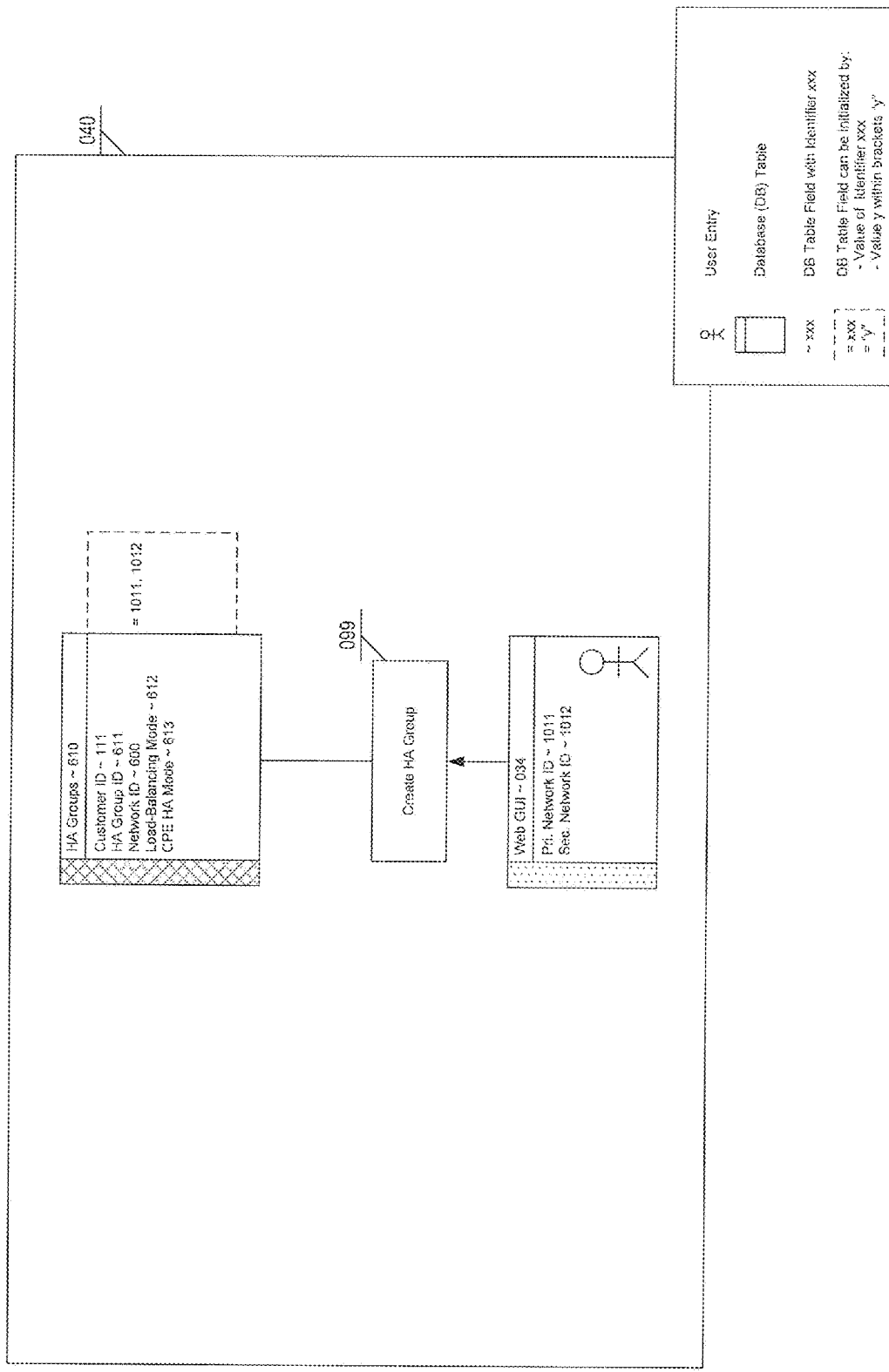

FIGS. 8a-8d are flow charts illustrating example methods for obtaining various information and storing it in repositories. FIGS. 8a-8d describe a process including how database tables are populated with data provided by the user '$\Omega$' to create Master IP Subnets (MIS), Network IDs, HA Groups, PKI Root CAs. Specifically, FIG. 8a registers Master IP Subnets; FIG. 8b registers Network IDs; FIG. 8c registers HA groups; and FIG. 8d registers PKI Root CAs.

Registering Master IP Subnets (MIS).

FIG. 8a sets forth a flow chart illustrating an example method for dynamically generating IP subnets from a Master IP Subnet by "chunking" it into smaller Child IP subnets and storing these smaller IP subnets in a repository. Once stored in the database, the example remote automation engine (040) can assign these Child IP subnets to which endpoint interface requires it, relieving the network administrator (034) from the burden of performing that task manually. Those skilled in the art will understand that the dynamic "chunking" process of the Master IP Subnet can produce either IP subnets or host-based IP addresses depending on the prefix length of the "chunk". For instance, if the Master IP Subnet has a prefix length of /24 (which has 256 possible addresses) and the length of the generated IP subnets is /29 (which has 8 possible addresses), the process will generate 32 contiguous "Child" IP subnets (e.g., 256/8) which all summarize into the exact same "Parent" Master IP Subnet. However, if the prefix length of the generated IP subnets is /32, the process will generate host-based IP addresses that all belongs to the same Master IP Subnet. (For additional information, see the formula and the example application of the formula below.)

As shown via the GUI interface [034], information provided by a user '♀' (e.g., a network administrator) (034) in FIG. 5) is used to create a Master IP Subnet. The information can include: the IP subnet (routing) prefix [1003] and associated IP subnet prefix length [1004] along with a child IP subnet prefix length [1005] A Master IP Subnet type [1006] can also be provided. As shown in FIG. 32a, an example snapshot of the GUI (037) illustrating the creation of a Master IP Subnet where the IP subnet prefix [1003] (523), the associated IP subnet prefix length [1004] (524), the child IP subnet prefix length [1005] (525) and the Master IP Subnet type [1006] (526) are provided by a network administrator. That Master IP Subnet is attached to one particular Network (527). Networks will be described later in this document.

Referring back to FIG. 8a, each large parent network routing prefix can then be stored in the Master IP Subnet database [660] (also called the Supersets database) as the IP subnet prefixes [662.1] and the IP subnet prefix lengths [662.2]. The child IP subnet prefix length [663] can also be stored in the Master IP Subnet database [660] which can define how the Parent Master IP Subnet is going to be "chunked". The Master IP Subnet type [664], customer ID [111], network ID [601], Master IP Subnet group ID [651], or Master IP Subnet ID [661], or any combination thereof, can also be stored in the Master IP Subnet repository [660].

The Master IP Subnet types [664] and child IP subnet prefix lengths [662.2] can include, but are not limited to: VHE-side, CPE-side, Tunnel-side, or any combination thereof. The VHE-side type can form the IP addressing pools on the LAN-side of all the VHEs. The VHE-side IP addressing pools can be used to number the internal interfaces of VHEs. The CPE-side type can form the IP addressing pools on the LAN-side of all the CPEs. The CPE-side IP addressing pools cab be used to number the internal interfaces of the CPEs (where a CPE can have many internal interfaces). The Tunnel-side type can form the IP addressing pools of all the tunnel interfaces inside the DMVPN networks. The Tunnel-side IP addressing pools can be used to number the Tunnel interfaces of the hosts within the DMVPN network (where a host can have many Tunnel interfaces).

The IP subnets can be generated by using the formula illustrated on FIG. 8a. An initial large IP subnet prefix $P_S$ [662.1], with its associated IP subnet prefix length $L_S$ [662.2], can be provided. The IP subnet prefix $P_S$ [662.1] can be verified to see if it is a valid routing prefix for the given IP subnet prefix length $L_S$ [662.2]. If it is not the case, the remote device automation engine (040) can find the correct value for the IP subnet prefix $P_S$ [662.1]. Those skilled in the art will understand that known IP numbering rules defined under the IP protocol can be programmed into the example remote automation engine. To generate smaller IP subnet prefixes $P_G$ [672], another IP subnet prefix length $L_G$ [663] can be provided by the network administrator (034). $L_G$ [663] follows the following condition:

$$L_S \leq L_G$$

All the generated IP subnet prefixes have the same prefix length $L_G$ [663]. The example remote device automation engine (040) can rely on an algorithm using long integers as it is faster to process than strings. The following algorithm can be implemented in the engine.

Let $(P_S, L_S, L_G) \in Z^3$ as follows:

$$0 \leq P_S \leq 2^{32}$$

$$0 \leq L_S \leq 32$$

$$0 \leq L_G \leq 32$$

$$L_S \leq L_G$$

For VHE-side and GRE-side LAN IP addressing pools:

$$L_G = 32$$

For CPE-side LAN IP addressing pools:

$$0 \leq L_G \leq 32$$

$$P_G = \sum_{k=0}^{i} (P_S + k * 2^{(32-L_G)})$$

$$\text{where } i = \frac{2^{(32-L_S)}}{2^{(32-L_G)}}$$

All the $P_G$ [672] generated can be stored in the subnet repository [670] with their associated prefix length $L_G$ [663] and status [675] set to zero to mark them as available subnets to the remote device automation engine (040). Any requirements for IP subnets can be fulfilled by taking them from this subnet repository [670] as long as there are remaining subnets in the database with a status [675] equal to zero (i.e. available, not assigned yet).

For example, if $P_S$=10.135.10.0, $L_S$=24 and $L_G$=29, $P_G$ will have the 32 values: 10.135.10.0, 10.135.10.8, 10.135.10.16, 10.135.10.24, 10.135.10.32, . . . , 10.135.10.240, 10.135.10.248. The 32 generated IP subnets in IP Prefix notation are 10.135.10.0/29, 10.135.10.8/29, . . . , 10.135.10.240/29 and 10.135.10.248/29. As stated earlier, each of these IP subnets will have a status set to zero in the repository [670] to mark them as available. There are 32 available subnets when generated all with a status set to zero. When the remote device automation engine requires an IP subnet, it can take the first IP subnet with a status equal to zero and change that status to one to mark that particular IP subnet not available anymore. The status value helps ensure that an IP subnet is not used twice. Those skilled in the art will note that in the case of having $L_G$=32, there will be 254 (256 minus 2 for removing the Subnet ID and Local Broadcast) available host-based IP subnets (i.e. IP addresses that all belong to the same Master IP Subnet). The example remote automation engine will remove the subnet ID and local broadcast IP address using the IP numbering rule of the IP protocol.

The prefix length $L_G$ is set to 32 for both VHE-side and Tunnel-side types as host-based IP addressing may be required on the internal interfaces on the LAN-side of the VHEs and Tunnel-side interfaces of all the endpoints. Those of ordinary skill in the art will understand the tunnel interfaces of all endpoints can be GRE interfaces and require all the endpoints that are part of the same DMVPN network to share the same IP Subnet (GRE IP Subnet). Also, all the VHEs that are part of the same DMVPN network have all their internal interfaces connected on the same LAN segment (bridge). So for both cases only host-based IP addressing can apply.

Both CPE-side and Tunnel-side IP addressing pools can be created and stored at a network-level (rather than customer-level). The VHE-side IP addressing pools can be created and stored at a customer-level. When dealing with IP addressing plans, a consistent IP addressing scheme can help avoid IP routing issues leading to network problems. VHE-side IP addressing pools registered at a customer-level can avoid requiring the customer enter the same IP addressing pool twice. Using network-level CPE-side and Tunnel-side IP addressing pools can avoid using these pools on different networks resulting in a potential non-consistent IP addressing scheme.

Figure 32:
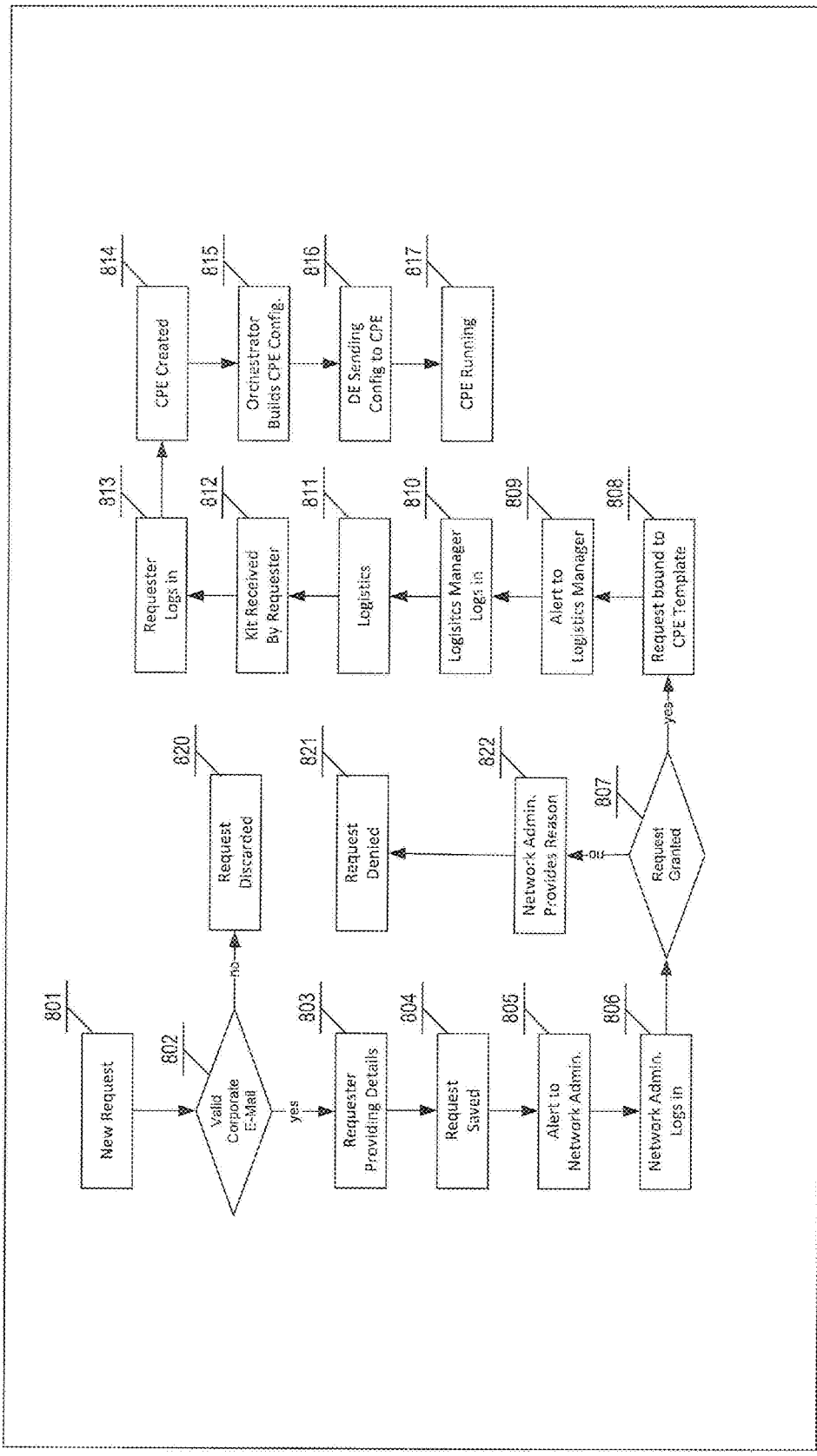
Figure 32A:
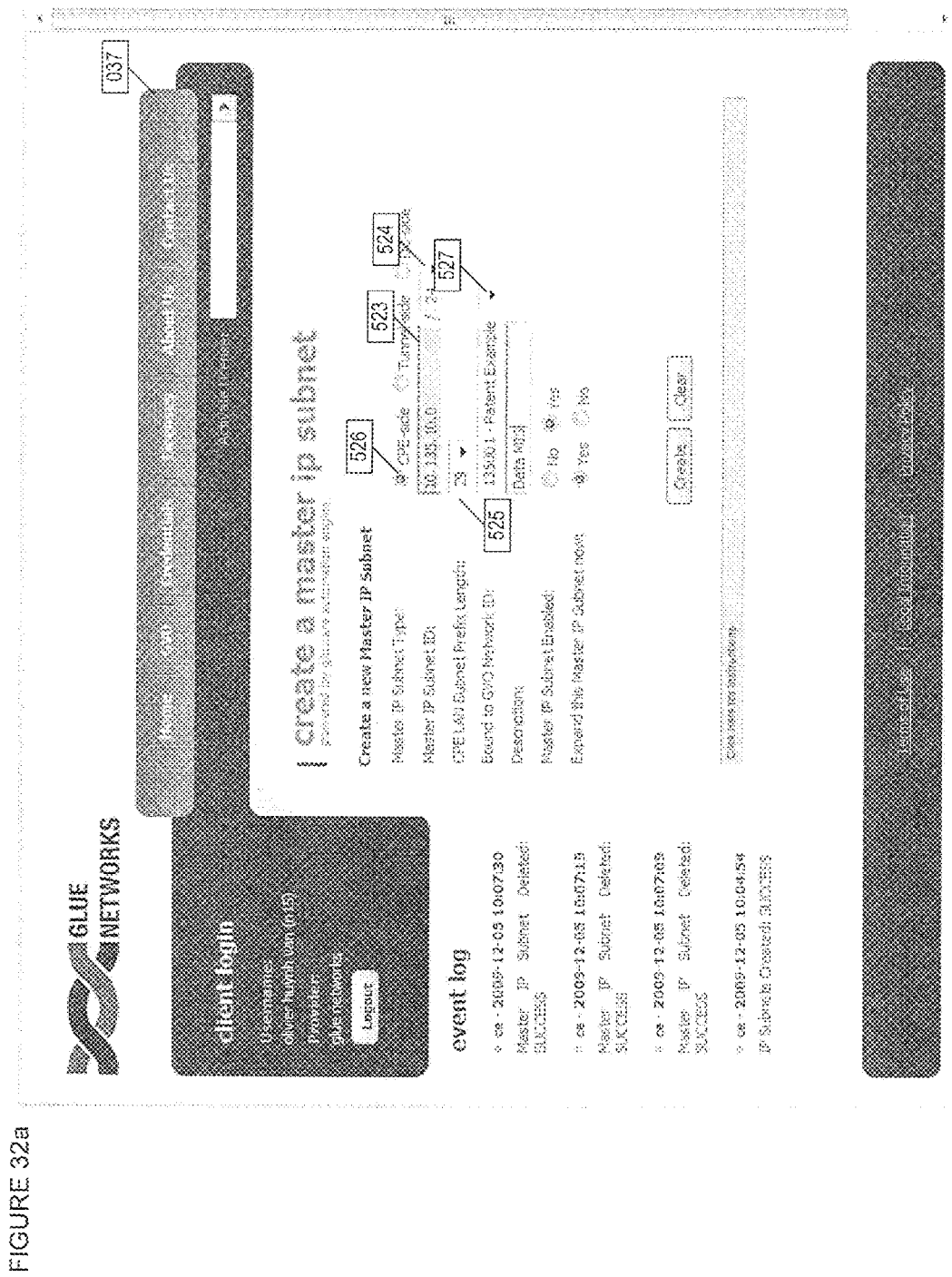
Figure 32B:
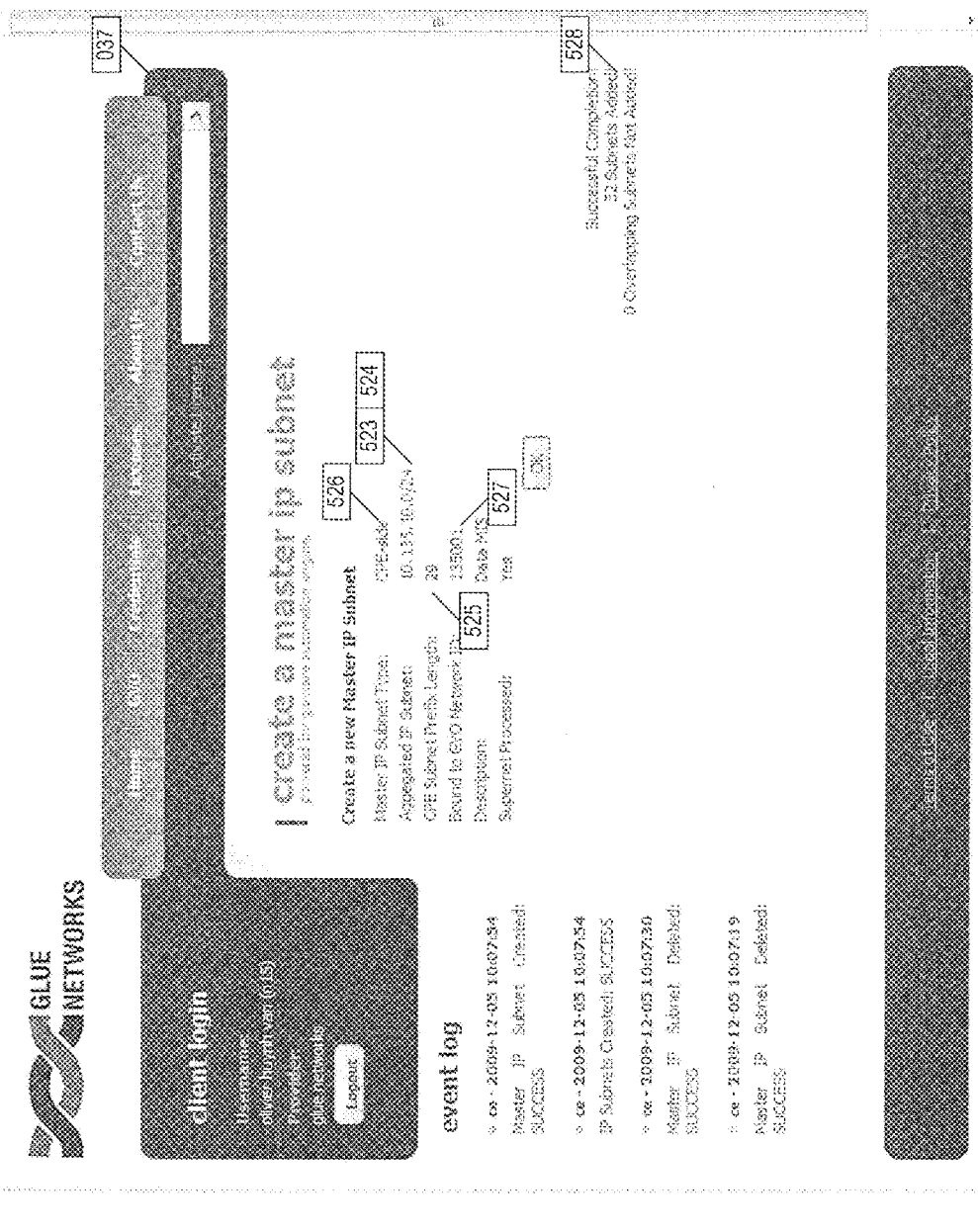
Figure 32C:
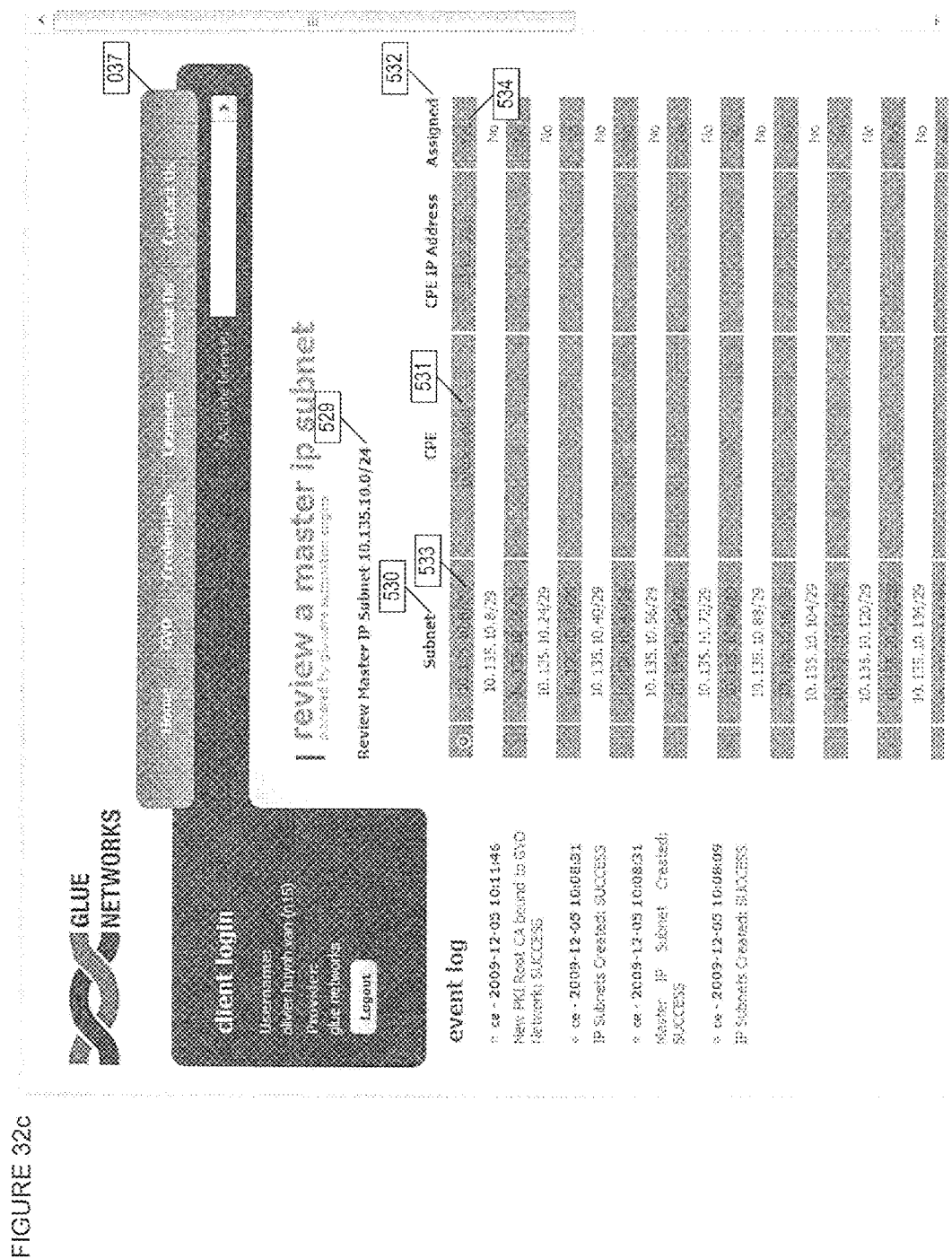

To help illustrate how this example remote device automation engine (40) generates and uses IP subnets, FIG. 32b to FIG. 32c illustrate the process of providing the required information to the remote device automation engine (040) via the GUI, and how it ends up allocating IP subnets "on-the-fly" as needed to the remote endpoints. FIG. 32b shows the result of the example remote device automation engine (040) having processed the user entries provided by the network administrator (back in FIG. 32a). The snapshot of FIG. 32b shows that 32 child IP subnets have been added to the database. FIG. 32c shows another snapshot displaying some of the child IP subnets (530) derived from the parent IP subnet 10.135.10.0/24 (529) and whether these IP subnets are available or not (532). In this example, one endpoint (531) internal interface has been assigned the child IP subnet 10.135.10.0/29 (533) and as a consequence is marked as not being available any longer (534). Let's use an example that will follow the general process described in this document to illustrate how a node is provisioned from start to finish. Assume there are five Master IP Subnets:

Corporate Data MIS (CPE-Type) with $P_S$=10.128.10.0, $L_S$=24 and $L_G$=29 resulting in 32 available child IP subnets that are 10.128.10.0/29, 10.128.10.8/29 . . . 10.128.10.248/29.

Corporate Voice MIS (CPE-Type) with $P_S$=10.128.20.0, $L_S$=24 and $L_G$=29 resulting in 32 available child IP subnets that are 10.128.20.0/29, 10.128.20.8/29 . . . 10.128.20.248/29.

Spouse & Kid MIS (CPE-Type) with $P_S$=192.168.2.0, $L_S$=24 and $L_G$=24 resulting in 1 available child IP subnet that is 192.168.2.0/24.

Corporate DC MIS (VHE-Type) with $P_S$=10.99.0.0, $L_S$=24 and $L_G$=32 resulting in 254 available IP addresses (254 child host-based IP subnets) that are 10.99.0.1, 10.99.0.2 . . . 10.99.0.254 (they all belong to 10.99.0.0/24).

Corporate DC2 MIS (VHE-Type) with $P_S$=10.150.0.0, $L_S$=24 and $L_G$=32 resulting in 254 available IP addresses (254 child host-based IP subnets) that are 10.99.0.1, 10.150.0.2 . . . 10.150.0.254 (they all belong to 10.150.0.0/24).

Registering Network IDs.

FIG. 8b sets forth a flow chart illustrating an example method for registering a Network ID [601] in a repository [660 and 670]. The user '⚲' (e.g. a network administrator) using a GUI [034] can specify the Network ID [1007], the IP subnet (routing) prefix [1008] and IP subnet (routing) prefix length [1009] for this network ID. Those skilled in the art will understand that the IP subnet prefix provided is set to be used to number the tunnel interfaces of the endpoints joining the same DMVPN network and as a consequence is of Tunnel-side type. The example remote automation engine will process that parent IP subnet prefix [1008] using the exact method describe above in section Registering Master IP Subnets with a child IP subnet prefix length set to 32 (as the parent IP subnet is of Tunnel-side type). As shown on FIG. 33a, a snapshot illustrating the process where the network administrator uses a GUI (037) to provide the Network ID (535), the IP subnet prefix (537), the IP subnet prefix length (538) and to which customer (536) that Network ID (535) can be bound. Those skilled in the art will understand that the IP subnet prefix (537) provided can be the inner IP addressing plan of the DMVPN network (GRE). FIG. 33b shows the result of the example remote automation engine having processed the user entries provided by the network administrator (back in FIG. 33a). The snapshot shows that 254 child IP subnets (542) have been added to the database. FIG. 33c shows another snapshot displaying some of the host-based IP addresses (child IP subnets with prefix length set to 32) (545) derived from the parent IP subnet 10.135.0.0/24 (544) and whether these IP subnets are available or not (547). In this particular example, one endpoint (548) tunnel interface has been assigned the IP address 10.135.0.1 (533) and as a consequence is marked as not being available any longer (549).

Referring back to FIG. 8b, once the user has specified the elements above, in (062), the Network ID can be created. Each Network ID's [1007] specific details can be stored in the corresponding network table [600] along with the provider ID [101], customer ID [111], network ID [601], and Master IP Subnet ID [661]. The IP subnet (routing) prefix [1008] and accompanying IP subnet (routing) prefix length [1009] can be stored in the Master IP Subnets database [660], triggering the creation of host-based entries in the subnets repository [670] as the Master IP Subnet can be a Tunnel-side IP addressing pool ($L_G$=32). Also, the user '⚲' can use a feature of the example remote device automation engine [040] called Route Zero Preservation [1010]. This feature can allow the endpoints to remove the route zero (i.e. default route) from their routing table for a route zero to be announced into the DMVPN network. Route Zero Preservation will be detailed later in this document.

In (063), the Master IP Subnet database (660) of Tunnel-side type (GRE) can be processed as explained earlier in the Registering Master IP Subnets section (the GRE IP subnet database [670] can be created using the formula set forth in FIG. 8a. (Note that the elements in the Master IP Subnets database [660] and the Subnets database [670] were explained with respect to FIG. 8a).

For instance, in the example referred to above that follows the general process of provisioning a node from start to finish, as described in this document, suppose that two Network IDs are created, as follows:

European Remote Workforce Network with Network ID 128001 and MIS 10.128.0.0/24 (Tunnel-side MIS, $P_S$=10.128.0.0, $L_S$=24 and $L_G$=32): The Tunnel-side MIS 10.128.0.0/24 can be created, resulting in 254 available IP addresses (254 child host-based IP subnets) that are 10.128.0.1, 10.128.0.2 . . . 10.128.0.254 (they all belong to 10.128.0.0/24). This will be referred to as "European Tunnel MIS" for future reference.

American Remote Workforce Network with Network ID 255001 and MIS 10.255.0.0/24 (Tunnel-side MIS, $P_S$=10.255.0.0, $L_S$=24 and $L_G$=32): The Tunnel-side MIS 10.255.0.0/24 can be created, resulting in 254 available IP addresses (254 child host-based IP subnets) that are 10.255.0.1, 10.255.0.2 . . . 10.255.0.254 (they all belong to 10.255.0.0/24). This will be referred to as "American Tunnel MIS" for future reference.

Registering HA Groups.

An HA Group can be used to define a high availability scheme. As network connectivity is not always stable, high availability is introduced in the network design. However, that complicates the deployment significantly. But thanks to the HA Group definition, the example remote automation engine (040) can perform all the configuration tasks on the endpoints, relieving the network administrator from performing that task manually. An HA Group can have two types: it can either be bound to a VHE Template (VHE-Type) or to CPE Template (CPE-Type). Templates will be explained later in this document in the Template section. If only one Network ID is provided, the corresponding HA group is a VHE-type. This type of HA Group can be used to deploy high availability within VHEs of a same Network ID. If two Network IDs are provided, the corresponding HA group is a CPE-type. This type of HA Group can be used to add high availability when deploying CPEs as the latter can be attached to two distinct Network IDs provided. High availability within a DMVPN network adds resiliency in the network design, allowing endpoints to fail without affecting the user experience.

FIG. 8c sets forth a flow chart illustrating an example method for registering an HA Group in an HA Groups repository [610]. The user '♀' can specifies one Network ID (network ID [1011]) or two Network IDs (primary network ID [1011], secondary network ID [1012]) bound to this HA Group. The Network IDs are then stored in the HA Groups table [610].

Figure 9:
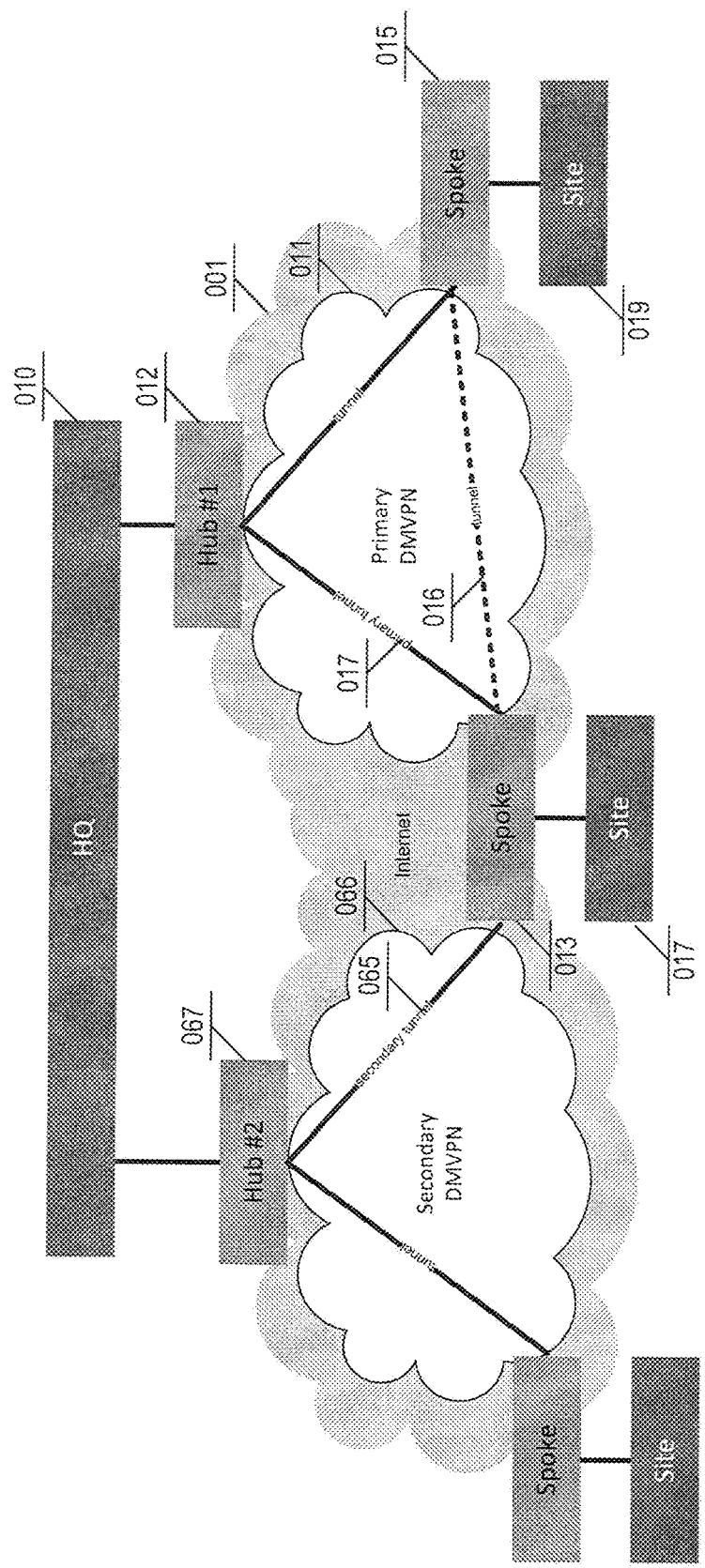

FIG. 9 illustrates dual homing CPEs, with one CPE (013) that is dual attached with a primary tunnel (017) and a secondary tunnel (065) to two different VHEs (012, 067), according to one embodiment. In case of a VHE failure (012), the CPE (013) can still contact the headquarters (010) using the secondary tunnel (065) via the remaining VHE (067). When a VHE (012) is down within a DMVPN network (011) with only one VHE, already established spoke-to-spoke relationships (016) remain (dynamic tunnel from one CPE to another), but new tunnels cannot be created and there is no alternate path to the network (010) behind the VHE (012) that failed.

Figure 10:
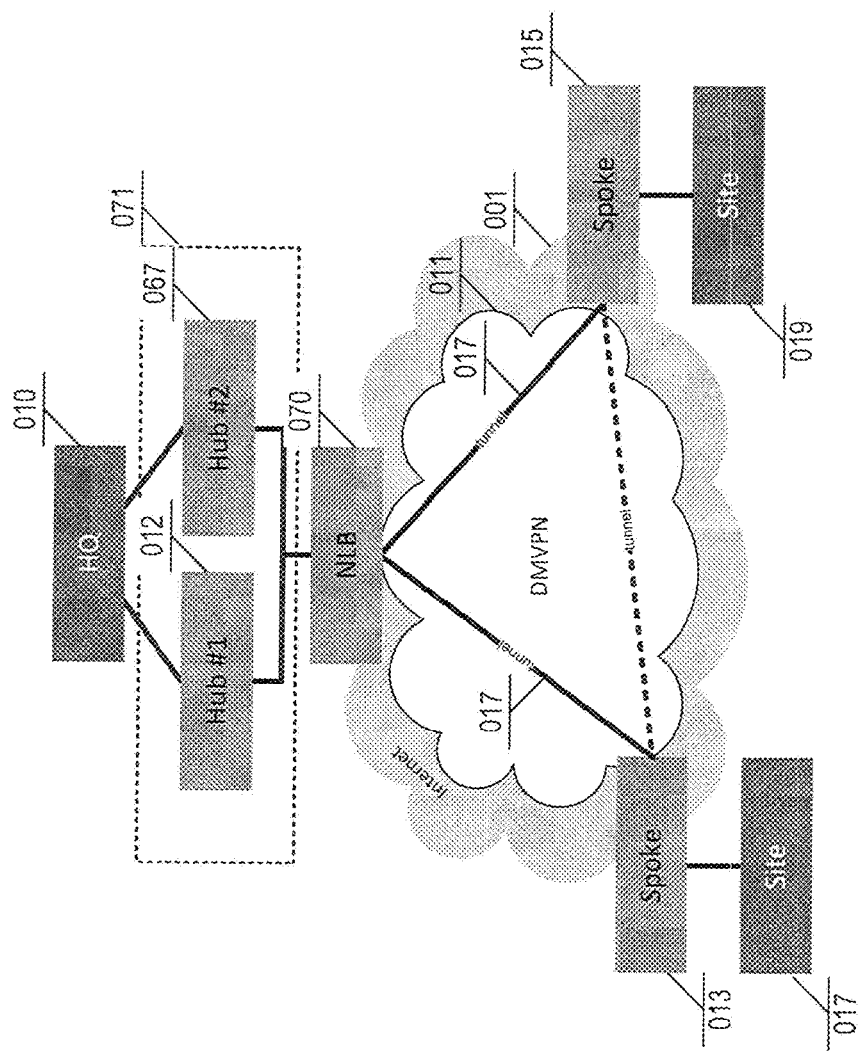

At least two grouping methods are possible to group the VHEs: first of all, using dedicated load-balancing network devices (such as Cisco ACE); or second of all, daisy-chaining the VHEs. The dedicated load-balancing device (070) can be installed in front of the VHEs (012, 067) as shown in FIG. 10. The VHEs can be grouped into a VHE farm (071). The VHE farm (071) can be configured in the load-balancing device (070), and the load-balancing device (070) can redirect the incoming traffic to any suitable VHE (012, 067) within the farm (071) depending on the actual network load of each individual VHE (012, 067). It will occur to those skilled in the art that the load-balancing device (070) can be setup as any regular network load-balancing device; the latter being in charge of load-sharing the traffic workload among the available resources. This technique can simplify the deployment of the CPEs (013, 015) as CPEs (013, 015) only require peering with the load-balancing device (070) rather than the VHEs (012, 067) individually themselves. For those skilled in the art, the CPEs can peer with the virtual IP address of the VHEs handled by the network load-balancing device (070). However, a lot of customers cannot afford these load-balancing devices (070) as they are an expensive investment. In some embodiments, a daisy-chaining technique can be a less expensive alternative.

Figure 11:
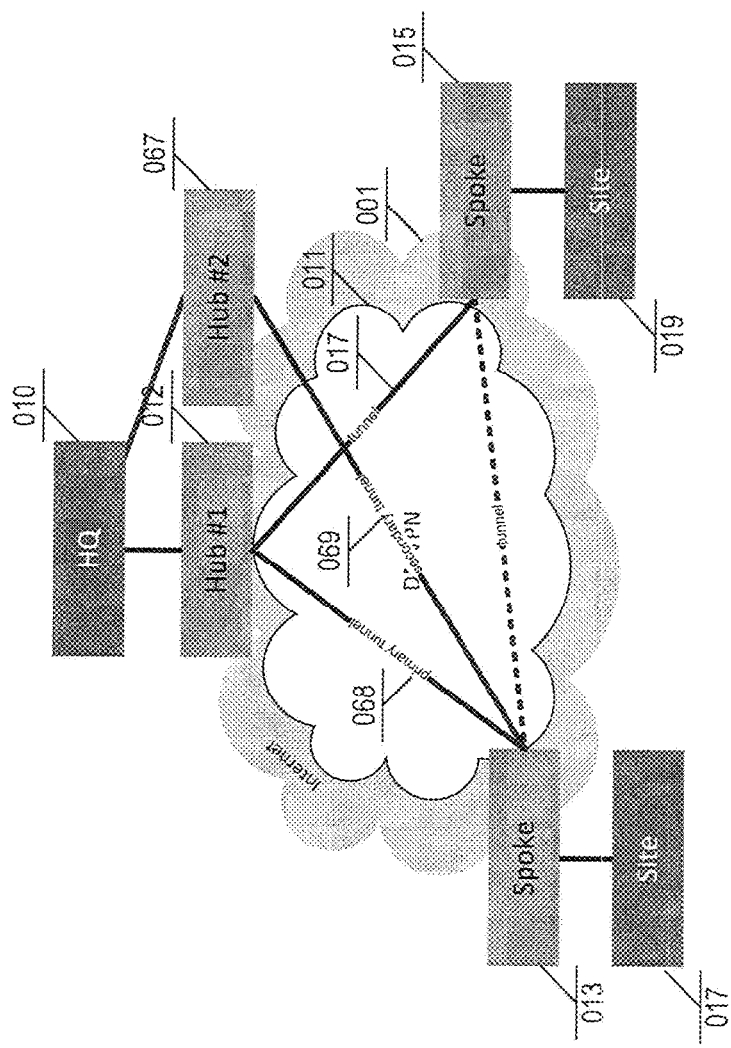

The daisy-chaining technique for grouping VHEs can be another method. It does not require dedicated hardware (e.g. network load-balancing devices). Daisy-chaining can be an advanced network technique that brings scalability in a DMVPN network. As illustrated on FIG. 11, two VHEs (012, 067) can be part of the same DMVPN network (011). One CPE (013) can be dual-homed to these two VHEs (012, 067). The CPE is attached to both VHEs (012, 067). As a consequence, if the primary tunnel (068) to its corresponding VHE (012) fails, the secondary tunnel (069) can allow the CPE (013) to remain connected to the DMVPN network (011). The primary tunnel (068) can go down for many reasons: for instance, there is a power outage and the primary VHE (012) is not powered up anymore, or the primary VHE (012) has not enough credentials to join the DMVPN network (like invalid certificates). Where the CPE (013) remains connected even when the primary VHE (012) fails, the other CPE (015) which is also peered with VHE (012), would be isolated if the tunnel (017) to the corresponding VHE (012) failed. Thus, the CPE (015) is only peered with one VHE (012).

In a DMVPN network, a manual registration can be required within the CPE configuration in order to peer that CPE to a selected VHE. The CPE can be an NHRP client (Next Hop Client NHC) of the VHE that acts as an NHRP server (Next Hop Server NHS). For those skilled in the art, this can be achieved by providing at least two entries: one NHRP map entry and one NHS entry. A VHE can always act as a NHS, but it can also act as a NHC. And this is where daisy-chaining the VHEs is possible. Daisy-chained VHEs means that VHEs are NHRP clients (NHC) of each other the other VHEs acting as NHS. However, meshing of VHEs cannot be done randomly in order to add resiliency and high availability on the DMVPN network. And although perhaps a cheaper alternative than using load-balancing devices, daisy-chaining VHEs can be a complex technique and difficult to implement for the following reasons: there is no intelligence to determine which VHE within the group of daisy-chained VHEs the CPEs will have to peer with (it has to be determined and configured manually); and there is no intelligence to define the NHRP maps and NHS to use within each VHE configuration (it has to be determined and configured manually).

Figure 12A:
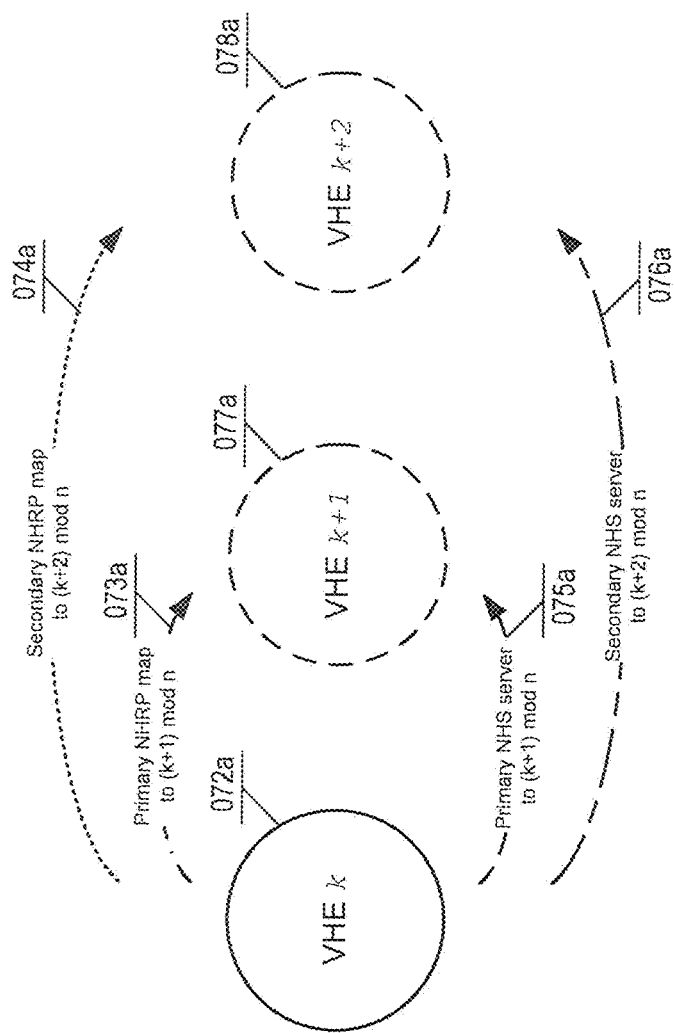

FIG. 12a sets forth a flow chart illustrating an example daisy-chaining deterministic algorithm that can configure the NHRP maps and NHS entries for each VHE accordingly. If the number of VHEs is strictly larger than two VHEs (072a, 077a, 078a), there can be two NHRP maps (073a, 074a) to create (one primary and one secondary) and two NHS entries (075a, 076a) (one primary and one secondary) to add in each VHE (072a). If the number of VHEs is lower than two, the secondary NHRP map (074a) and secondary NHS entry (076a) are not created (as the number of VHEs is too low).

An example of how to daisy-chain N VHEs follows: For a given number N of VHEs that are part of the same Network ID, for each VHE k, the deterministic algorithm can be as follows:

Let $(N, n, k) \in Z^3$ as follows:

$N \geq 2$ $n = N-1$ $0 \leq k \leq n$

For $n \leq 2$:

$NHRP_1(k) = (IP_{GRE}((k+1)/n), IP_{Ext}((k+1)/n))$ $NHS_1(k) = IP_{GRE}((k+1)/n)$

For $n > 2$:

$NHRP_1(k) = (IP_{GRE}((k+1)/n), IP_{Ext}((k+1)/n))$ $NHS_1(k) = IP_{GRE}((k+1))$ $NHRP_2(k) = (IP_{GRE}((k+2)/n), IP_{Ext}((k+2)/n))$ $NHS_2(k) = IP_{GRE}((k+2)/n)$

NHRP(k) can be the NHRP map for a given VHE k. It defines a 2-tuple (x, y) where x is the GRE IP address of the Tunnel interface and y is the IP address of the external interface. $IP_{GRE}(k)$ can be the GRE Tunnel IP Address for a given VHE k. $IP_{Ext}(k)$ can be the outside IP Address for a given VHE k.

The above formulas can be implemented in two scenarios:
The first scenario can be when there are two or less than two VHEs to daisy-chain (n≤2), and the engine can determine only one NHRP map and one NHS.
The second scenario can be when there are more than two VHEs to daisy-chain (n>2), and the engine can determine two NHRP maps and two NHS.

Figure 14:
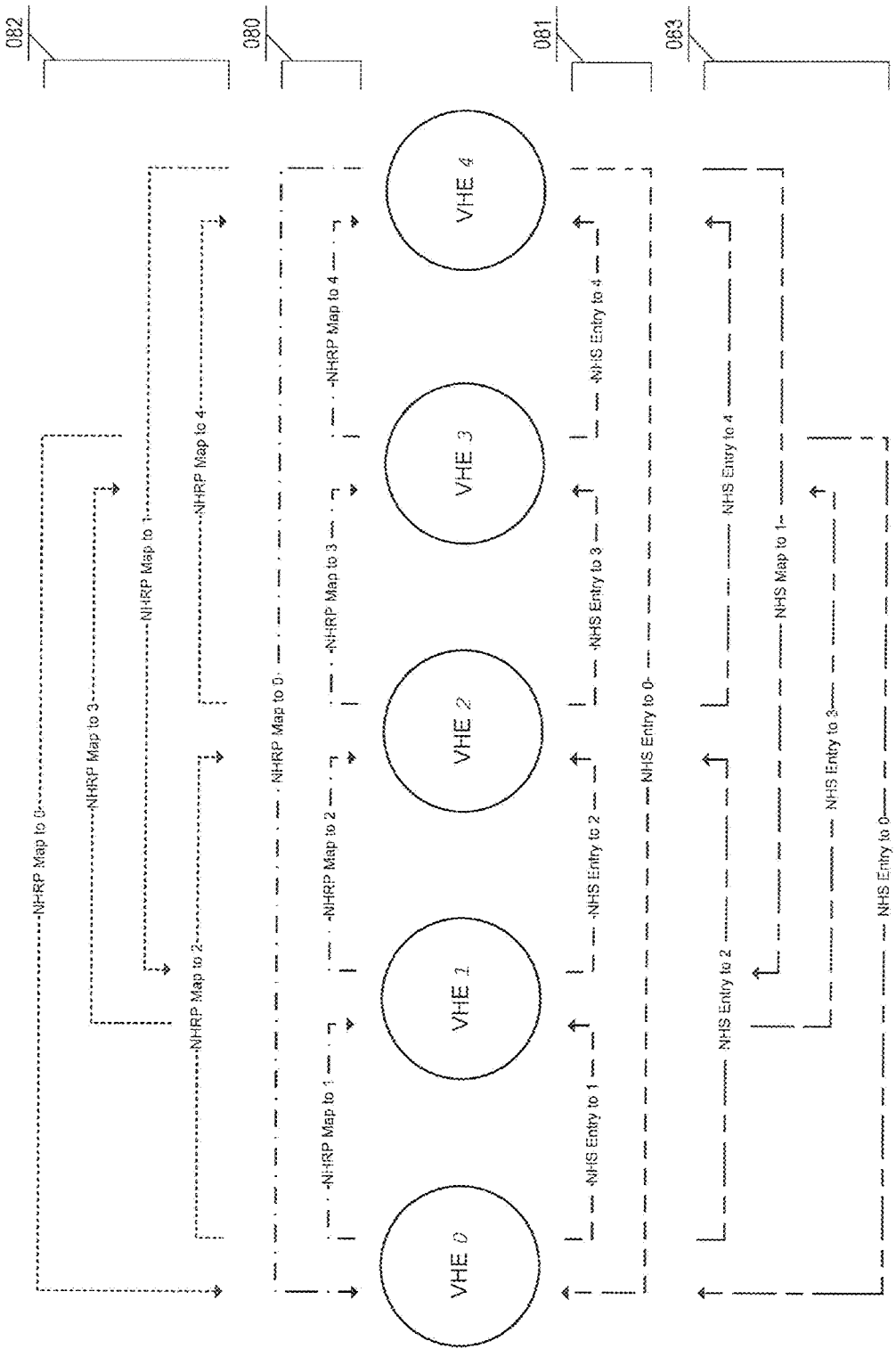

For instance, FIG. 14 illustrates an example of the resulting daisy-chains (080, 081, 082, 083) for five VHEs that are part of the same HA Group (VHE-Type).

The primary NHRP map chain (080) would be 0⇒1⇒2⇒3⇒4⇒0:
 0⇒1 means that the VHE 0 is has an NHRP map to VHE 1
 1⇒2 means that the VHE 1 is has an NHRP map to VHE 2
 2⇒3 means that the VHE 2 is has an NHRP map to VHE 3
 3⇒4 means that the VHE 3 is has an NHRP map to VHE 4
 4⇒0 means that the VHE 4 is has an NHRP map to VHE 0
The secondary NHRP map chain (082) would be 0⇒2⇒4⇒1⇒3⇒0.
 0⇒2 means that the VHE 0 is has an NHRP map to VHE 2
 2⇒4 means that the VHE 2 is has an NHRP map to VHE 4
 4⇒1 means that the VHE 4 is has an NHRP map to VHE 1
 1⇒3 means that the VHE 1 is has an NHRP map to VHE 3
 3⇒0 means that the VHE 3 is has an NHRP map to VHE 0
The primary NHS chain (081) would be 0⇒1⇒2⇒3⇒4⇒0.
 0⇒1 means that the VHE 0 is a NHC of NHS VHE 1
 1⇒2 means that the VHE 1 is a NHC of NHS VHE 2
 2⇒3 means that the VHE 2 is a NHC of NHS VHE 3
 3⇒4 means that the VHE 3 is a NHC of NHS VHE 4
 4⇒0 means that the VHE 4 is a NHC of NHS VHE 0
The secondary NHS chain (083) would be 0⇒2⇒4⇒1⇒3⇒0.
 0⇒2 means that the VHE 0 is a NHC of NHS VHE 2
 2⇒4 means that the VHE 2 is a NHC of NHS VHE 4
 4⇒1 means that the VHE 4 is a NHC of NHS VHE 1
 1⇒3 means that the VHE 1 is a NHC of NHS VHE 3
 3⇒0 means that the VHE 3 is a NHC of NHS VHE 0

So, when configuring VHE 0, two NHRP maps and two NHS entries have to be added:
 one NHRP map to VHE 1
 one NHRP map to VHE 2
 one NHS entry to VHE 1
 one NHS entry to VHE 2
 . . . and so on for the other VHEs . . . .

When an additional VHE is added to an existing group of daisy-chained VHEs, the NHRP maps and NHS entries have to be recalculated for every VHE in order to insert the additional VHE in the chain of VHEs. For instance, if there was five VHEs, one on the primary NHRP map chain is 0⇒1⇒2⇒3⇒4⇒0. Adding a sixth VHE will change that primary NHRP map chain to 0⇒1⇒2⇒3⇒4⇒5⇒0. So the VHE 4 no longer requires an NHRP map to VHE 0, but instead to VHE 5. And VHE 5 requires an NHRP map to VHE 0. This process can be done to the secondary NHRP map chain and to the two NHS chains as well.

The above example explains the use of the example VHE daisy-chaining technique that the example remote device automation engine (040) can use when a VHE-Type HA Group is defined for a Network ID.

Figure 15:
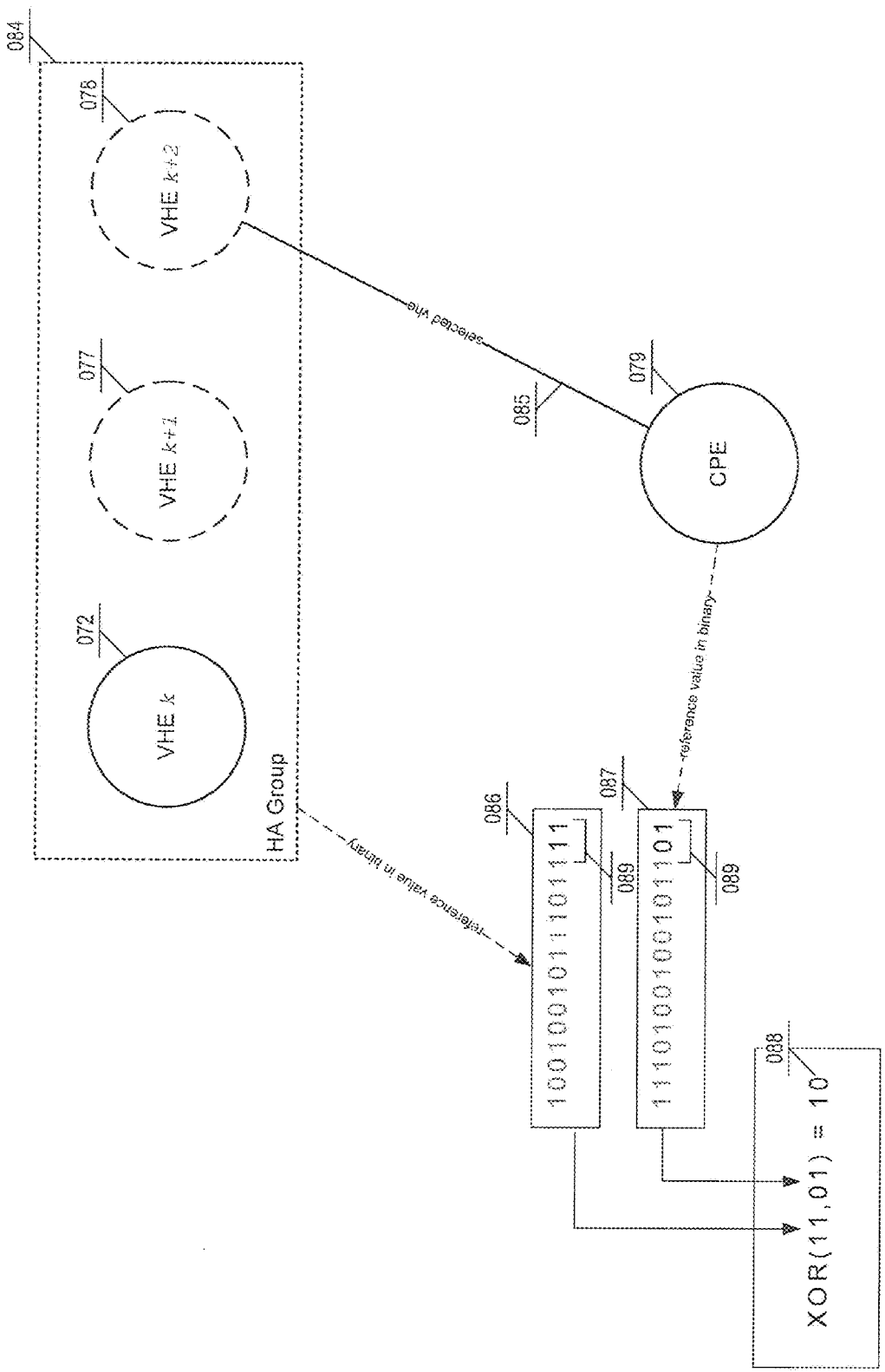
Figure 16:
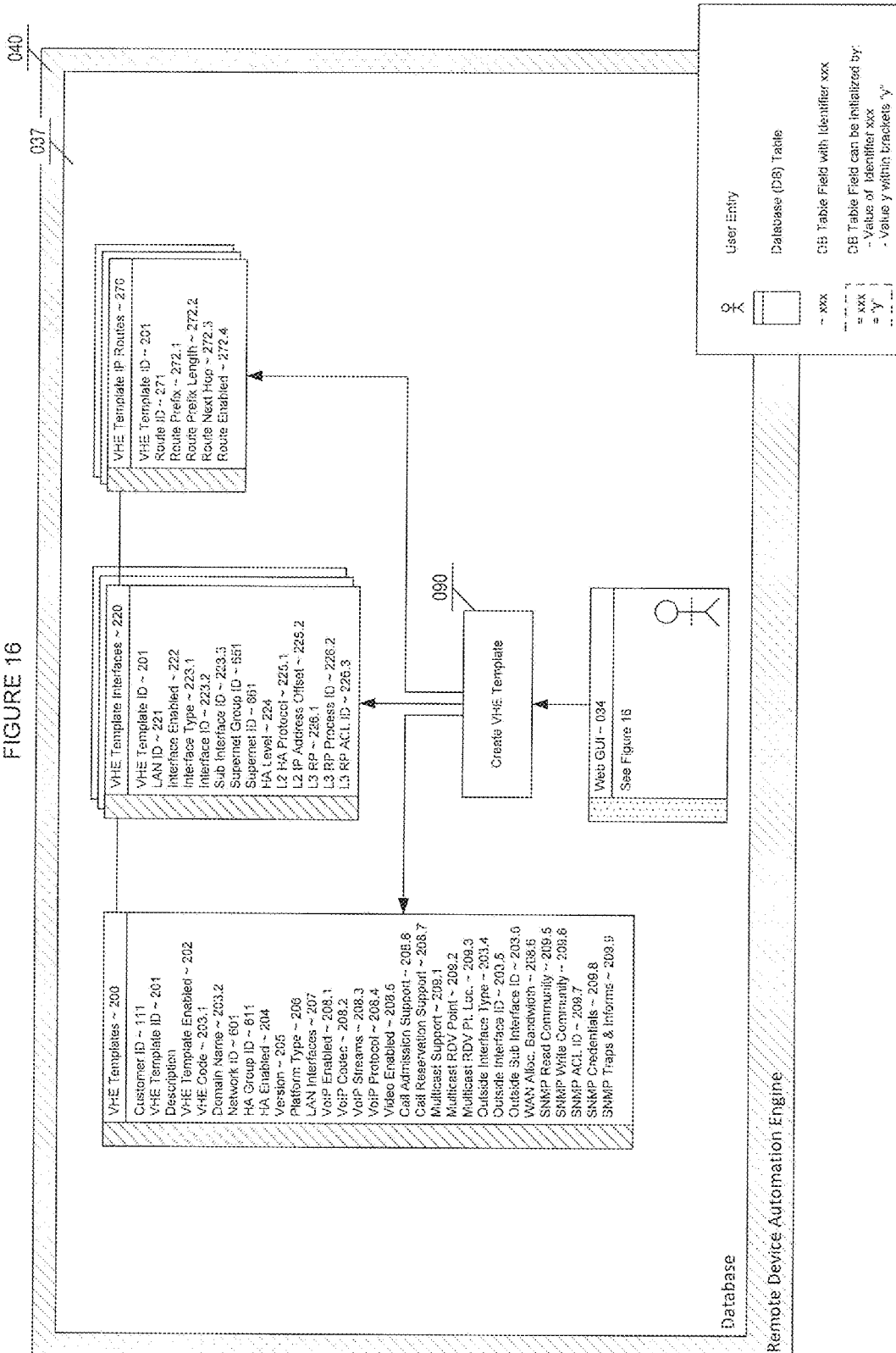
Figure 17:
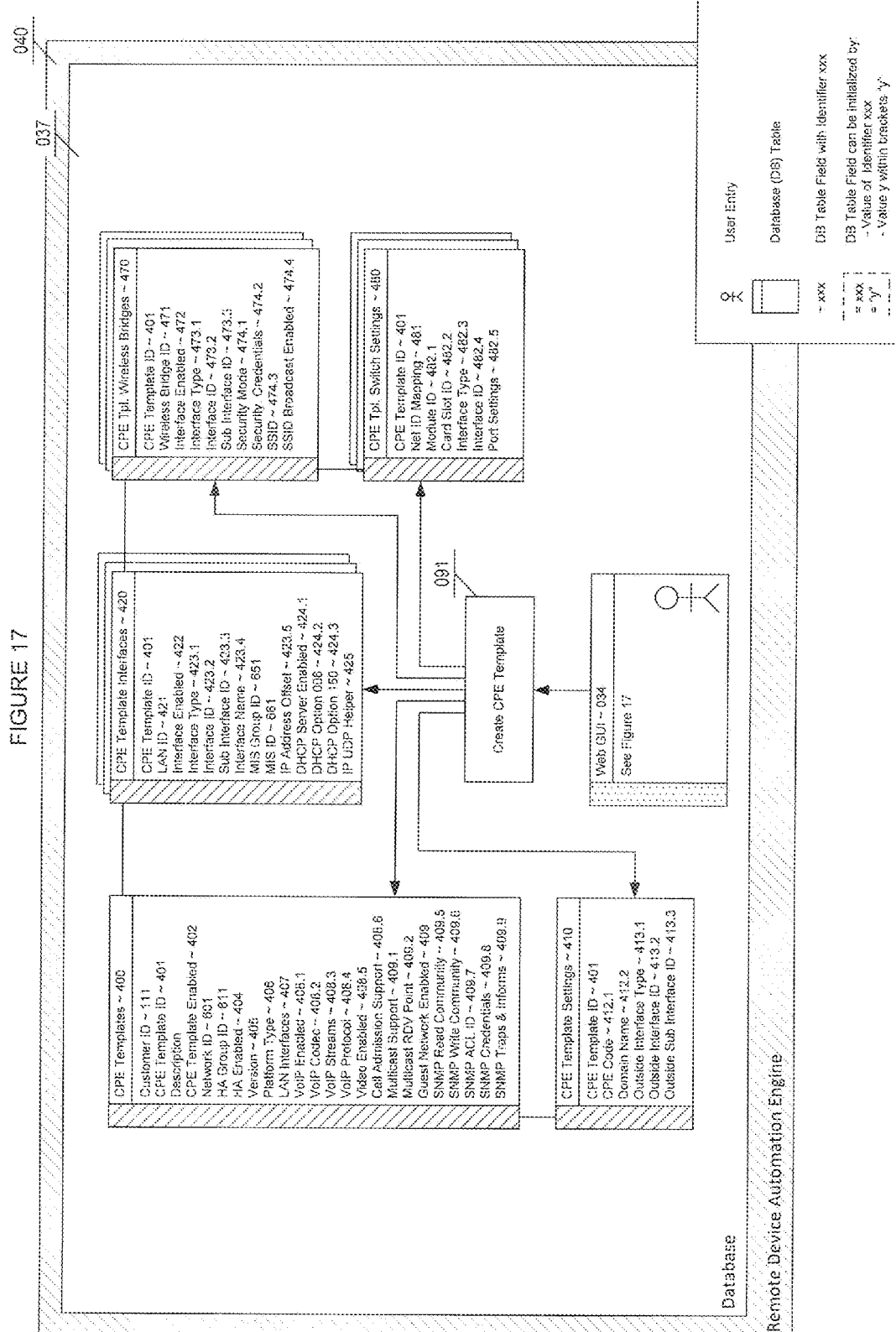

When a CPE is attached to a network comprising of daisy-chained VHEs, the CPE can be dual-homed to at least two VHEs. This can add resiliency to the network design. The example remote device automation engine (040 can leverage another deterministic algorithm, the example deterministic load-balancing algorithm, to choose which VHEs the CPE will peer with. In the example remote device automation engine (040), the deterministic load-balancing algorithm can rely on a hash algorithm that determines the primary VHE to which the CPE will attach to. FIG. 15 sets forth a flow chart illustrating an example method for calculating the hashed value that determines the selected VHE. The hashed value (088) can be calculated by hashing two reference values (086, 087), one from the CPE (079) and one from the HA Group (084). The reference values can comprise, but are not limited to, object unique identifiers (IDs), serial numbers, IP addresses, or any number that can be converted into binary values. The hashed value (088) can be computed from the XOR value of the n last digits (089) of each reference value where n (089) is calculated as such:

Let $(k,n) \in Z^2$ as follows:

$\forall k > 1$ $\exists! n: 2^{n-1} \leq k < 2^n$ where $k = \Sigma VHEs$
n is also known as the depth of the hashing algorithm.
k is the number of VHEs.
The selected VHE (088) is then calculated as follows:

$id(VHE) = (digit_{source} \oplus digit_{destination})/k$ where $digit_{source}$ is the n last digits of the HA group reference value,
and $digit_{destination}$ is the n last digits of the CPE reference value.
id(VHE) is the selected VHE to peer with the target CPE.

In the example of FIG. 15, with three VHEs (072, 077, 078), k=3, hence n=2. The first reference value (from the HA Group) is 1001001011101111. The second reference value (from the CPE) is 1110100100101101. Hence the ID of the selected VHE (088) would be VHE (078) as (11⊕01)/3=2.

Figure 12B:
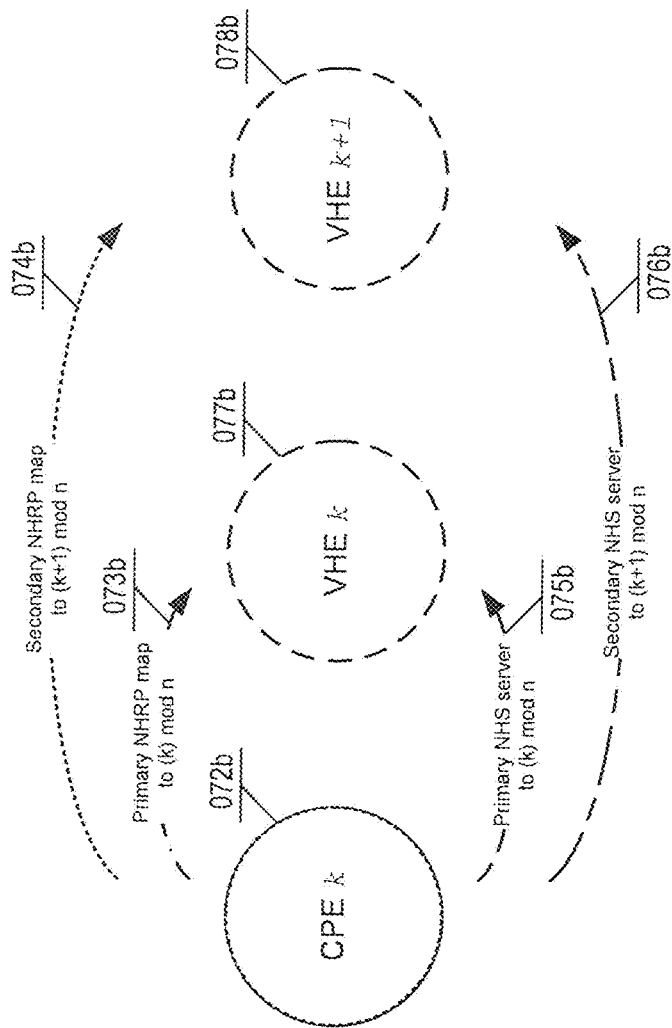

For further explanation, FIG. 12*b* sets forth a flow chart illustrating an example deterministic algorithm that configures the NHRP maps and NHS server entries for each CPE joining a network with daisy-chained VHEs. If the number of VHEs is strictly larger than two VHEs (072b. 077b, 078b), there are two NHRP maps (073b, 074b) to create and two NHS server entries (075b, 076b) to add in each CPE (072b). If the number of VHEs is lower than two, the secondary NHRP map (074b) and secondary NHS server entry (076b) are not created (as the number of VHEs are too low).

The following example illustrates how to peer a CPE to N daisy-chained VHEs. For a given number N of VHEs that are part of the same Network ID, for each CPE k, the deterministic algorithm can be as follows:

Let $(N, n, k) \in Z^3$ as follows:

$N \geq 2$ $n = N - 1$ $0 \leq k \leq n$

For $n \leq 2$:

$NHRP_1(k) = (IP_{GRE}((id(VHE))/n), IP_{Ext}((id(VHE))/n))$ $NHS_1(k) = IP_{GRE}((id(VHE))/n)$

For $n > 2$:

$NHRP_1(k) = (IP_{GRE}((id(VHE))/n), IP_{Ext}((id(VHE))/n))$ $NHS_1(k) = IP_{GRE}(id(VHE))$ $NHRP_2(k) = (IP_{GRE}((id(VHE)+1)/n), IP_{Ext}((id(VHE)+1)/n))$ $NHS_2(k) = IP_{GRE}((id(VHE)+1)/n)$

NHRP(k) is the NHRP map for a given VHE k. It defines a 2-tuple (x, y) where x is the GRE IP address of the Tunnel interface and y is the IP address of the external interface. $IP_{GRE}(k)$ is the GRE Tunnel IP Address for a given VHE k. $IP_{Ext}(k)$ is the outside IP Address for a given VHE k. id(VHE) is the selected VHE to peer with the target CPE. id(VHE)+1 is the following VHE from the selected VHE to peer with the target CPE.

The example deterministic load-balancing algorithm in addition to the algorithm described above can allow the example remote device automation engine (040) to make decisions on which VHEs a CPE will be peered to. In addition, when a VHE is removed or added to the HA Group (i.e. the pool of daisy-chained VHEs within the same network), the deterministic algorithms can recalculate whether a CPE is correctly peered with its VHEs or needs to be moved to other VHEs.

Daisy-chaining HA Groups can contain all VHEs that require being daisy-chained using the previously described methodology. In addition to Daisy-chaining HA Groups, there are also Bundling HA Groups. Bundling HA Groups can contain all the CPEs that require being dual attached to two different networks. For instance, if a customer has two datacenters, two DMVPN networks can be built: one in each datacenter. Then a CPE can be peered to at least one VHE of the first DMVPN network and at least one VHE of the second DMVPN network.

Referring back to FIG. 8c, some advanced settings are also available such as Load-Balancing Mode [612] or CPE HA Mode [613]. When a CPE is dual-attached to two distinct DMVPN networks, Load Balancing Mode [612] determines whether the two networks will be active simultaneously, or whether one network will be the primary and the secondary network used as a backup. For instance, when a customer has two datacenters, he can have the choice to have the two datacenters accessible or have only one datacenter accessible if the access to the other one fails. When a CPE joins a DMVPN network with many VHEs (daisy-chained VHEs), the CPE HA Mode [613] defines whether the CPE will be dual-homed (attached to at least two VHEs) or not (attached to only one VHE). This can be useful when dealing with busy VHEs (as each CPE will only peer with one VHE instead of two, hence saving resources).

For instance, in the example referred to above that follows the general process of provisioning a node from start to finish, as described in this document, suppose, that two HA Groups can be created:

Daisy-chaining HA Group "DS Group" with Network ID 255001 (previously created).

Bundling HA Group "Dual-Homing Group" with primary Network ID 128001 (previously created) and secondary Network ID 255001 (previously created).

Registering PKI Root CAs.

Within IPSec-based VPN networks, endpoints that are part of the same VPN network may need to authenticate themselves to each other to help ensure the flow of information is achieved between known endpoints. Any rogue endpoints cannot therefore participate in the network flow for a third party to try to intercept, corrupt or usurp the information. IPSec-based networks can use two kinds of authentication mechanisms: pre-shared keys or X.509 certificates. Using pre-shared keys can be a quick way to bind endpoints together to build the VPN network. A pre-shared key can be a secret word that is known by all the endpoints participating to the same VPN network. As this is just a word, it can be stolen easily and any rogue endpoint may be potentially able to join the VPN network. Alternatively, using X.509 certificates can be a secure mechanism which invokes a trusting third party in charge of authenticating all the endpoints of the same VPN network. This third party can also be known as a Public Key Infrastructure or PKI. X.509 certificates cannot be forged or copied as a PKI relies on strong encrypting and hashing algorithms. Each endpoint that needs to join the VPN network can receive a X.509 certificate from a PKI server. Before exchanging data with each other, endpoints exchange their X.509 certificates and, if these certificates come from a known third party (i.e., the same PKI server), the information starts flowing between the endpoints. An X.509 certificate can be secure, but it also can be a burden to administer. For example, the revocation of compromised certificates can be difficult. The example remote device automation engine (040) can manage all aspects of the X.509 certificate's lifecycle.

Figure 8D:
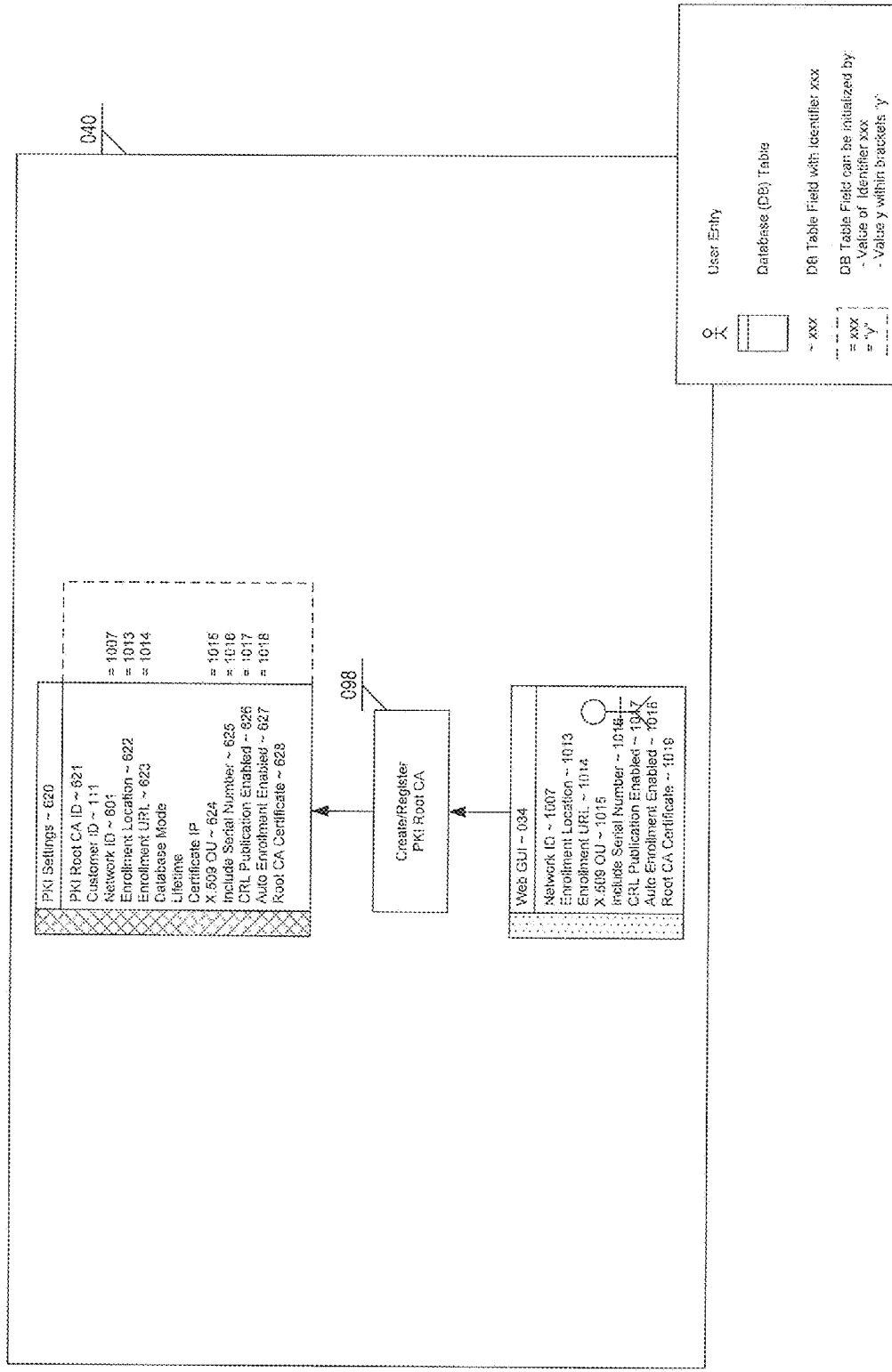

FIG. 8d sets forth a flow chart illustrating an example method for registering a new or existing PKI server to a Network ID. In (098), the PKI Root CA can be created/registered. The user '♀' can specify two scenarios:

There is no existing PKI server: In this scenario, the example remote automation engine can be in charge of creating and managing the PKI server and associated Certificate Lifecycle. Hence the requirements of the user providing all the necessary elements (described below).

There is an existing PKI server to use: In this scenario, a third party can manage the existing PKI server and Certificate Lifecycle.

The following elements can be stored in the PKI settings table [620]: the Network ID [601], the enrollment location [622] that specifies an external PKI server, the enrollment URL [623] and the root CA certificate [628]. If the PKI server already exists, the PKI server is of a "remote" type. The user '♀' can specify the Hypertext Transfer Protocol (HTTP) Uniform Resource Location (URL) [1014] of the existing PKI server, which is the enrollment URL where the endpoints can enroll for a new X.509 certificate. For instance, if a customer uses external signing trustees like VeriSign or Thawte, he can specify the enrollment point that is provided by these trustees, resulting in all endpoints using that enrollment point to get their certificates.

If the PKI server does not exist and needs to be created, at least one of the VHEs of a Network ID can host the PKI server. This PKI server is of a "local" type. The user '⚥' can specify the PKI server to be local (enrollment location [1013]).

In both cases, whether the PKI server is local or remote, the user '⚥' can also specify the X.509 Organization Unit (OU) [1015] that can be used to distinguish many X.509 certificates from different PKI Servers. Additional options can be specified, such as, but not limited to: whether or not the device serial number [1016] needs to be included in the X.509 certificate (to prevent certificates from being moved or copied from one device to another), whether or not the Certificate Revocation List (CRL) [1017] is enforced when authenticating endpoints (to deny access to endpoints with revoked certificates), or whether or not auto-enrollment [1018] is enabled to allow auto renewal of expiring X.509 certificates. These elements are also stored in the PKI Settings table [620]: X.509 OU [624], Include Serial Number Option [625], CRL Checking Feature [626] and Auto Enrollment Feature Enabled [627].

For instance, in the example referred to above that follows the general process of provisioning a node from start to finish, as described in this document, suppose, that a PKI Root CA is created and bound to Network ID 128001. The PKI Root CA can be set to be local (the example remote automation engine can manage it) and the OU can be set to "EU". All the other settings can be set to default values (e.g., CA lifetime to 5 years, certificate lifetime to 1 year, CRL enabled, Serial Number in stored in Certificate). As a consequence, as those skilled in the art will realize, the PKI server will deliver certificates to legitimate endpoints including the OU=EU.

Assume another PKI Root CA is created and bound to Network ID 255001. The PKI Root CA can be set to be local (the example remote automation engine can manage it) and the OU can be set to "US". All the other settings can be set to default values (e.g., CA lifetime to 5 years, certificate lifetime to 1 year, CRL enabled, Serial Number in stored in Certificate). As a consequence, as those skilled in the art will realize, the PKI server can deliver certificates to legitimate endpoints including the OU=US.

Templates.

Deploying VPN networks does not need to be a difficult task, as endpoints in the network can have almost the same configurations. However, these configurations are not quite identical as they differ by the number of specific parameters that are unique to a particular node. As a consequence, in large deployments, the complexity around configuring hundreds or thousands of nodes can be very high, leading inevitably to network downtime and related troubleshooting, deployment delays or unexpected expenditures. The example remote device automation engine (040) can rely on templates, defining the profile of the target endpoints, to dramatically reduce the administration burden when deploying DMVPN networks. Templates are not just a set of pre-defined full configurations for endpoints with joker (i.e., wild card) values that can be replaced when needed. The term "template" in this specification can include "a set of parameters and settings shared among objects using these templates". To gain more flexibility and match real life scenarios, the example remote device automation engine (040) can leverage templates to understand how the final network design needs to look, or in simpler words, understand the way the network engineer would like to see his network designed. The parameters that define a template can be gathered using online forms. From all the data gathered in these forms, the example remote device automation engine (040) can have all the specific settings of the DMVPN network and can be able to dynamically generate the necessary device configurations and configure the remote devices accordingly.

The device templates can comprise, but are not limited to, two types of templates: the VHE templates and the CPE templates.

VHE Templates.

The VHE templates can define the common network settings shared among the VHEs. As a VHE can host several LAN interfaces, the VHE template can support an unlimited number of LAN interfaces. As specified earlier, the example remote device automation engine's (040) online forms can collect the related VHE network design information. These online forms can use tabs to lay out the different sections and help the user understand what information is required to achieve a successful data collection.

The VHE template form can comprise, but is not limited to, the tabs and fields described in FIG. 16 and FIGS. 30*a*-30*e*.

VHE Template Sanity Check.

Sanity checks (as explained below) can be performed in real-time to ensure no overlapping, wrong or missing data in the template. The VHE sanity check can be the process within the example remote device configuration engine (040) that helps ensure the consistency of the configuration elements provided by the user. As explained earlier, these configuration elements can be stored in the endpoint templates and can be used to dynamically generate the configuration of the target endpoints by the example remote device configuration engine (040). The VHE sanity check can include checking the configuration elements, such as, but not limited to: network interfaces and IP addressing pools. The configuration elements can comprise, but are not limited to:

Conflicting elements when relevant, such as conflicting network interfaces, overlapping network addressing spaces, distinct Network IDs for VHES Daisy-Chaining HA Groups, conflicting network protocols, etc.

Unique element registration when relevant, such as providers registration, customer registration, Network IDs registration, user credentials registration, HA groups registration, PKI root CAs registration, network address pools registration, templates registrations, endpoints registration, etc.

Invalid element format or value when relevant, such as insufficient or excessive network bandwidth allocation, invalid IP addresses, invalid network prefixes, invalid network prefixes length, etc.

For instance, in the example referred to above that follows the general process of provisioning a node from start to finish, as described in this document, suppose, that two VHE Templates are created: EU VHEs and US VHEs. All the values provided via the GUI are shown in FIG. 30*e-f*.

As shown in FIG. 30*e*, EU VHEs (3005) is a VHE Template assigned to Network ID 128001 (3010) with no resiliency defined (no HA Group) (3015), the inside interface is ignored (3020), the amount of protected bandwidth is 10 Mbps, voice and video supports are enabled (3025, 3030) with 10 protected voice streams (3035) using G.711 codec (3040).

As shown in FIG. 30*f*, US VHEs (3050) is a VHE Template assigned to Network ID 255001 (3055) with resiliency defined (HA Group "DS Group") (3060), the inside interface is enabled (3065) (and will be automatically configured) using GLBP protocol (3070) with 10.150.0.1 as the Master IP Address (Master Node IP Offset is Subnet ID+1 with Corporate DC2 MIS: 10.150.0.0/24) (3075, 3080), the amount of protected bandwidth is 10 Mbps, voice and video supports are enabled (3090, 3095) with 10 protected voice streams (3085) using G.711 codec (3096).

CPE Templates.

The CPE templates can define the common network settings shared among the CPEs. As a CPE can host several LAN interfaces, the CPE template can support an unlimited number of LAN interfaces. As specified earlier, the example remote device automation engine (040) can have online forms that can collect the related CPE network design information. These online forms can use tabs to lay out the different sections and help the user to understand what information is required to achieve successful data collection. Also, data CPE sanity check can be performed in real-time to help ensure no overlapping, wrong or missing data in the template. The CPE sanity check process is explained below.

Similar to the VHE template form, the CPE template form can comprise, but is not limited to, the tabs and fields set forth in FIG. 17 and FIGS. 31a-31c.

CPE Template Sanity Check.

The CPE sanity check can be the process within the example remote device configuration engine (040) that helps ensures the consistency of the configuration elements provided by the user. As explained earlier, these configuration elements can be stored in the endpoint templates and can be used to dynamically generate the configuration of the target endpoints by the example remote device configuration engine (040). The CPE sanity check can include checking the configuration elements such as network interfaces, IP addressing pools, etc. The configuration elements can comprise, but are not limited to, the elements listed above with respect to the VHE sanity check.

For instance, in the example referred to above that follows the general process of provisioning a node from start to finish, as described in this document, suppose that two CPE Templates are created: EU CPEs and APAC CPEs. All the values provided via the GUI are shown in FIGS. 31c-g.

As shown in FIG. 31c, EU CPEs (3105) is a CPE Template assigned to Network ID 128001 (3110) with no resiliency defined (no HA Group) (3115) with three inside interfaces (3120):
DATA:
  VLAN 10 numbered with an IP Subnet from Corporate Data MIS and an offset set to Subnet ID+1
  Wireless SSID data@gvo with WPA2
  DNS 10.99.0.1 and 10.99.0.2
VOICE:
  VLAN 20 numbered with an IP Subnet Corporate Voice MIS and an offset set to Subnet ID+1
  Wireless SSID voice@gvo with LEAP (using ipphone/myipphone credentials)
  DNS 10.99.0.1 and 10.99.0.2
GUEST:
  VLAN 30 numbered with an IP Subnet of Spouse & Kid MIS and an offset set to Subnet ID+1
  This VLAN is a Spouse & Kid VLAN (not routed)
  Wireless SSID guest with WPA2
  DNS 194.98.65.65 and 194.98.65.165
. . . with the embedded switch map (3125) as follows:
  VLAN DATA on Port0, Port1
  VLAN VOICE on Port2
  VLAN GUEST on Port3

As shown in FIG. 31e, APAC CPEs (3150) is a CPE Template assigned to both Network IDs 128001 and 255001 (3155) (resiliency defined with HA Group "Dual-Homing Group") with two inside interfaces (3160):
DATA:
  VLAN 10 numbered with an IP Subnet from. Corporate Data MIS and an offset set to Subnet ID+1
  Wireless SSID data@gvo with WPA2
  DNS 10.99.0.1 and 10.99.0.2
VOICE:
  VLAN 20 numbered with an IP Subnet Corporate Voice MIS and an offset set to Subnet ID+1
  Wireless SSID voice@gvo with LEAP (using ipphone/myipphone credentials)
  DNS 10.99.0.1 and 10.99.0.2
. . . with the embedded switch map (3165) as follows:
  VLAN DATA on Port0, Port1, Port2
  VLAN VOICE on Port3

Endpoint Generation (Configuration Engine).

With the remote device configuration engine (040) templates defined, the remote device automation engine can generate the endpoint configuration into its repository. This can provide an advantage, in that an endpoint configuration can be saved to the database rather than be generated directly by the endpoint configuration command set. It is also possible to change the generated values before the endpoint configuration command set is produced and sent to the endpoint. FIGS. 18-26 illustrate methods for generating VHE and CPE configurations into the repository.

Target VHE Endpoint Generation.

Figure 18:
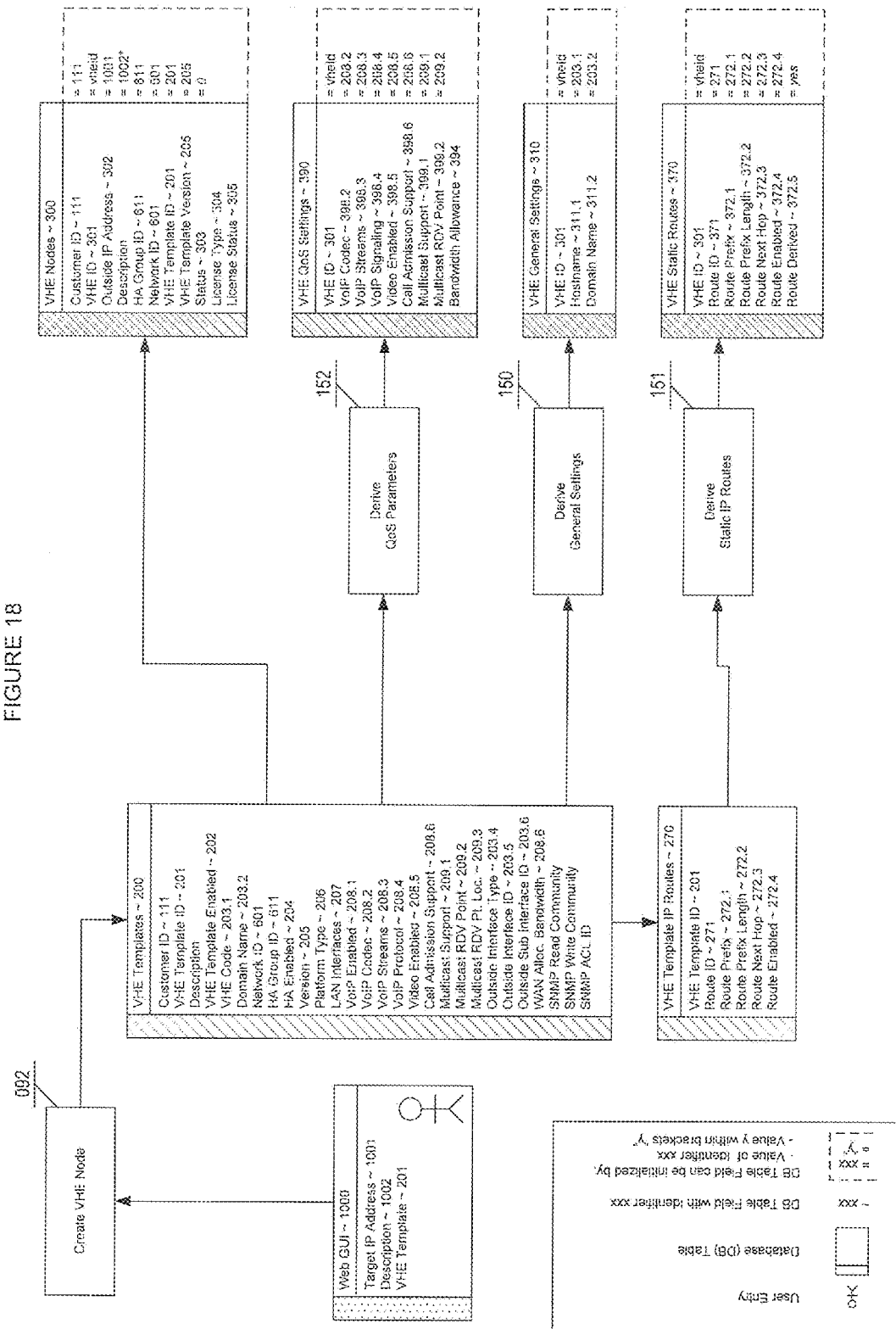

FIGS. 18 to 21 set forth several flow charts illustrating an example method for creating the VHE configuration in the repository. FIG. 18 illustrates an example of a user '$\mathring{\lambda}$' triggering the creation of a new VHE in (092), which can cause a set of parameters to be used from the VHE Template table [200] to derive the VHE node and VHE General Settings tables [300, 310]. The VHE templates database [200] can comprise, but is not limited to: the Customer ID [111], the HA Group ID [611], the Network ID [601], the VHE Template ID [201] used to generate this VHE node, or the current VHE Template Version [205], IP Domain Name [311.2], or any combination thereof. Another set of parameters can be dynamically generated These parameters can comprise, but are not limited to: the VHE ID [301] that can be a newly generated reference value for this VHE node, the outside IP address [302] that can be the external IP address provided by the user '$\mathring{\lambda}$' and can be used to send the generated configuration command set to the target VHE node, the description [1002] that can include a self-incrementing counter, the status [303] which can be initialized to the value of zero as the VHE node is not yet deployed, the hostname [311.1] that can be generated from the VHE code [203.1] in the VHE template [200], and a self incrementing counter [?]. The parameters License Type [304] and License Status [305] will be initialized after the VHE has been successfully deployed.

FIG. 18 also illustrates an example of how, when the user '$\mathring{\lambda}$' triggers the creation of a new VHE in (092), in (152), a set of parameters can be derived from the VHE Template table [200] to the VHE node Quality of Service (QoS) Settings table [390]. These parameters can comprise, but are not limited to: VHE ID [301], a Voice over IP (VoIP) Coder Decoder (Codec) [398.2] used, a number of concurrent VoIP streams [398.3] expected, a VoIP signaling protocol [398.4], a video enabled flag [398.5] for the video streaming support, a call admission support [398.6] for the bandwidth preservation technique, a multicast support [399.1], or a multicast rendez-vous point [399.2] IP address, or any combination thereof. Another set of parameters can be dynamically generated. These can comprise, but are not limited to, an external interface Bandwidth Allowance (BA) [394] that can be calculated as follows:

For:
1. a given VoIP Codec with an encrypted payload of $b_c$ per voice call,
2. a given number of concurrent calls s, $$BA = b_c \times s$$

where BA is the Bandwidth Allowance for the external interface [384].

For instance, the rate of G.729 codec-based voice encrypted with IPSec (3DES/SHA-1) is set to 64 Kbps. Indeed, let's see how this rate is calculated based on a 60-byte G.729 voice packet with a 50 pps (packets per second) rate over a PPP encapsulation. IP GRE Encapsulation adds 24 bytes. The ESP header that is part of the IPSec encapsulation contains a 4-byte Security Parameter Index (SPI) field and the 4 byte sequence number (anti-replay logic). Those skilled in the art will appreciate that 3DES algorithm requires adding padding to the plain text as DES is a block cipher, encrypting blocks of 8 bytes (64-bits) at a time. ESP might add up to 255 bytes of padding. The ESP Authentication Data field must align on a 4-byte boundary. The ESP Pad length field is 1 byte and starts at the third byte of a 4-byte word, and the ESP Next Header field occupies the forth byte. The Next Header field is used to identify the payload's protocol. The ESP Authentication Data field contains the SHA-120 byte hash truncated to 12 bytes as specified in RFC 2104 regarding truncation of the hash value). The ESP IV (Initialization Vector) ensures the uniqueness cipher text if the same plain text characters are encrypted in different blocks or messages. It is used by block chaining ciphers like DES. In this example, IPSec adds 52 bytes to the IP GRE packet, so the resulting packet combined with IP GRE and IPSec is 136 bytes. As a PPP encapsulation adds 4 bytes of Layer-2 overhead, the resulting packet is now 140 bytes. 140 bytes at 50 pps is 56'000 bits per second. Those skilled in the art will appreciate that as they might be different layer-2 overhead, setting the rate to 64 Kbps covers all the possible scenario. The same calculation is done with other voice codecs. For instance, the rate set for an IPSec tunnel with a G.711 codec-based voice payload is 128 Kbps.

FIG. 18 also illustrates how a user '⚥' can trigger the creation of a new VHE in (092), and how a set of parameters can be derived in (151) from the VHE Template IP routes table [270] to the VHE node static IP routes table [390]. These parameters can comprise, but are not limited to (for each static IP route): the route prefix [372.1], the route prefix length [372.2], the route next hop [372.3], or the route enabled flag [372.4], or any combination thereof. Another set of parameters can be dynamically generated. These parameters can comprise, but are not limited to: a new route ID [371] for each route to identify a route specifically, and/or a flag route derived [372.5] to keep track of routes added by the VHE Template IP routes [270] or by the user '⚥'. A VHE ID [301] can also be included in the VHE static route database [370].

Figure 19:
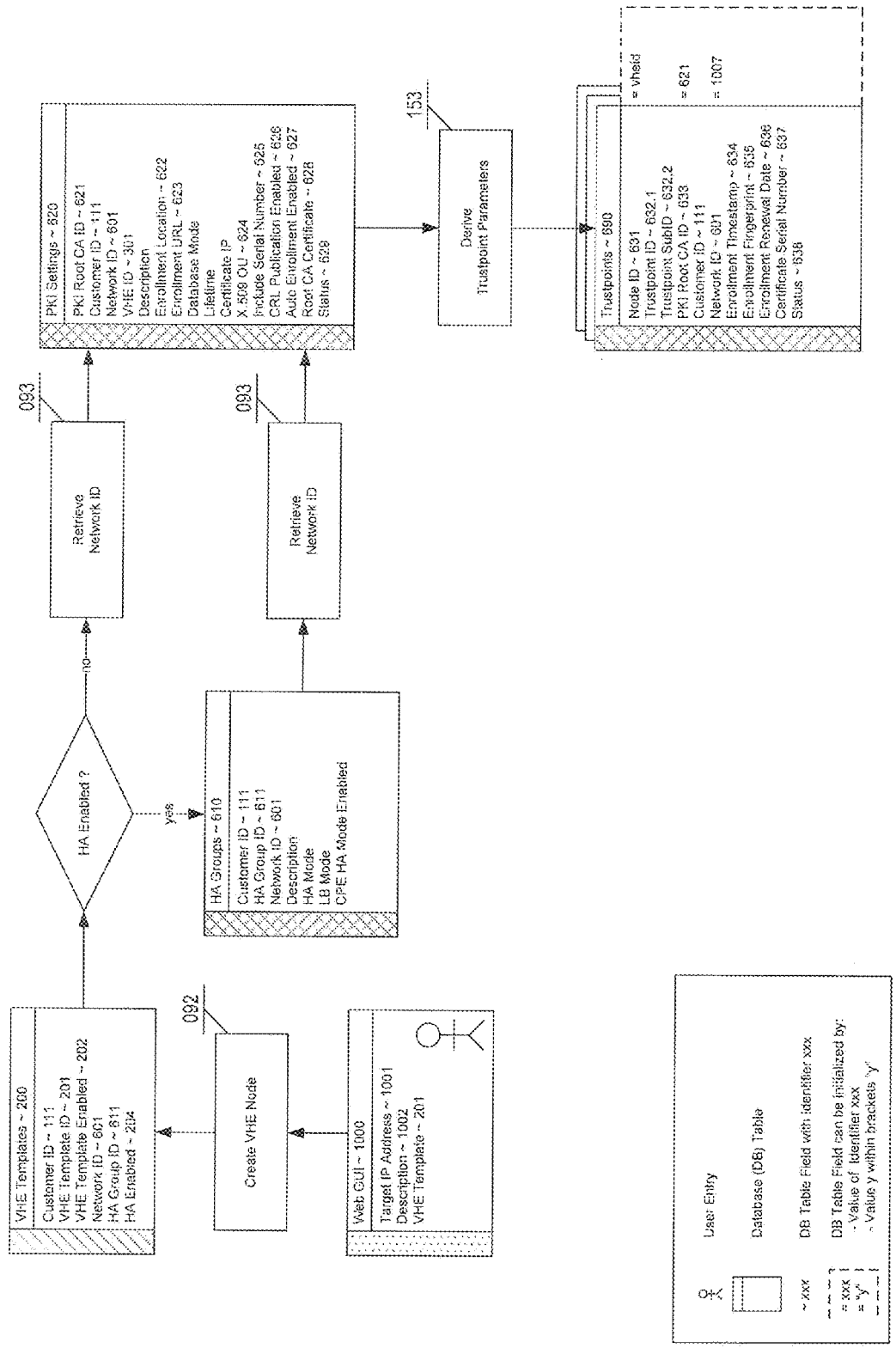

FIG. 19 sets forth a flow chart illustrating an example method for generating an entry into the Trustpoint table [690]. Depending on the VHE Template [200] being bound to either one or many Network IDs [601] or a Daisy-Chaining HA Group ID [610], one or many entries can be created in the Trustpoint table [690]. Indeed, when the Template [200] is bound to one Network ID [601], one Trustpoint entry can be created as only one certificate is required to join that Network ID [601]. So if the VHE Template [200] is bound to many Network IDs [601], many entries can be created in the Trustpoint table [690]. Parameters in the Trustpoint table [690] can be derived in (153) from the PKI Root CA settings table [620] and can include, but are not limited to: Node ID [631] that will be initialized with the VHE reference value [301], the Trustpoint ID that can be a newly generated reference value for this Trustpoint entry [632.1], the Trustpoint Sub ID that is an index to number all the Trustpoints of a same endpoint (a VHE in that case) [632.2], or the PKI Root CA ID [633] that refers to the PKI Root CA of the current Network ID [601], or any combination thereof. The Status [638] can be set to zero as the enrollment has not started (it will start later). All the other parameters are not initialized until the VHE enrolls for its certificates (process detailed later).

Figure 20:
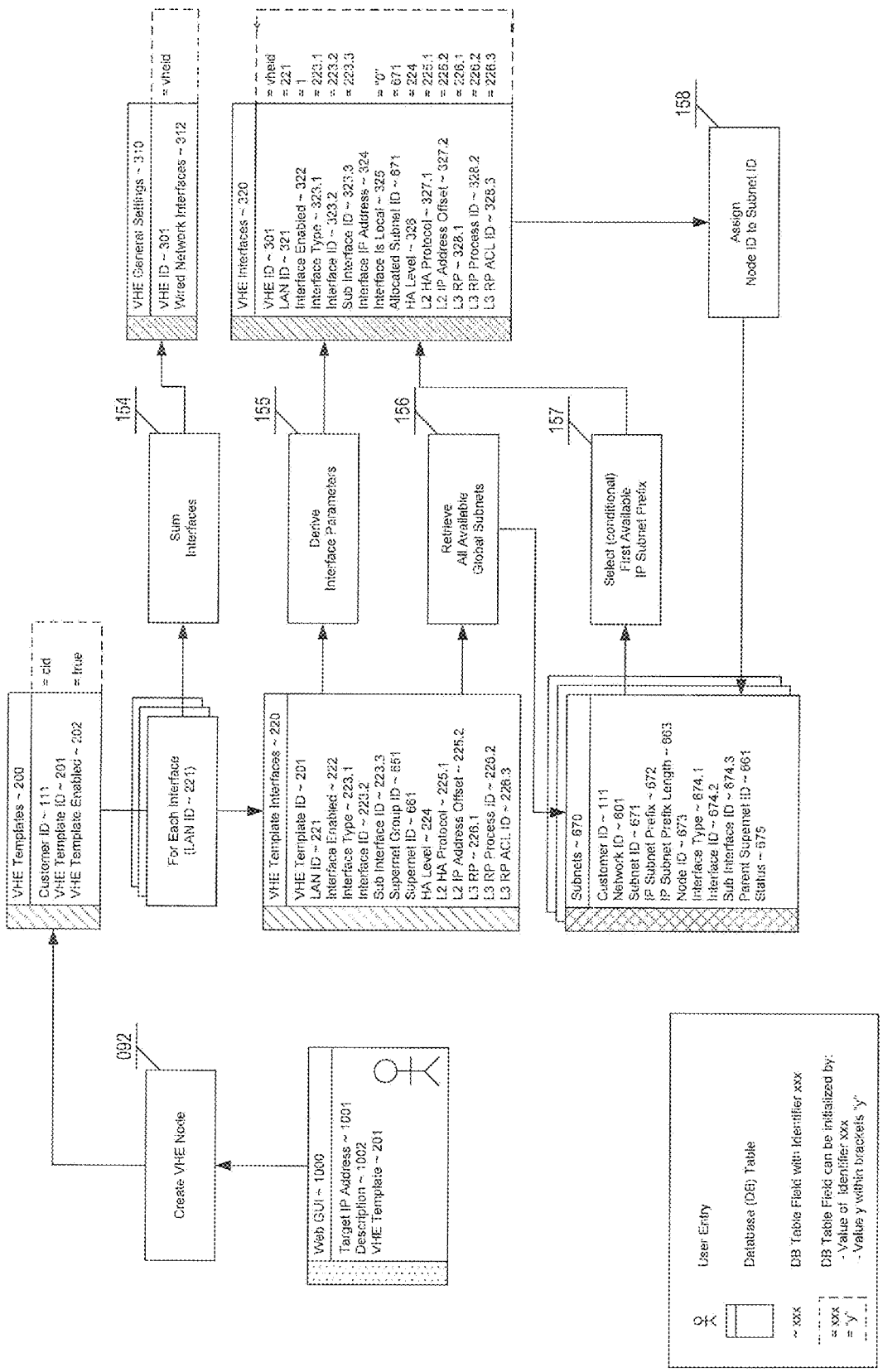

FIG. 20 illustrates an example of when the user '⚥' triggers the creation of a new VHE in (092), and a set of interface parameters can be derived in (155) from the VHE Template (see FIG. 19 for description) and saved to the VHE node interfaces table [320]. An interface can be added if the interface enabled flag [322] is set to true. Otherwise, the interface configuration can be ignored. This can allow the user '⚥' to define interfaces where no amendments, modifications or configurations are required. The interface parameters can comprise, but are not limited to: the LAN interface ID [321], the interface type [323.1], the interface ID [323.2], the sub interface ID [323.3], the "interface is local" flag [325] which can allow the IP subnet ID to be part of the announced routing prefix within the DMVPN network, the allocated subnet ID [671] which can allow tracking of the allocated subnet from the subnets repository [670], the HA Level [326] which can define whether any layer-2 redundancy mechanism or layer-3 routing protocol is required on the interface (such as, e.g., Gateway Load Balancing Protocol (GLBP), Hot Standby Routing Protocol (HSRP), Enhanced Interior Gateway Routing Protocol (EIGRP), Open Shortest Path Protocol (OSPF), Routing Information Protocol (RIP) or any other redundancy or routing protocols that will occur to those skilled in the art), the L2 HA Protocol [327.1] which can be any as previously described, the layer-2 IP address offset [327.2] that can define the master IP address used if a layer-2 redundancy protocol is required, the layer-3 routing protocol [328.1] which can be any as previously described, the layer-3 routing protocol Process ID [328.2] that can define the process ID used by the routing protocol if required on the VHE node, or the layer-3 routing protocol Access Control List (ACL) ID [328.3] that can assign an optional routing updates filter to the routing process if required; or any combination thereof. Another set of parameters can be dynamically generated. These parameters can comprise, but are not limited to, the interface IP address [324] that is taken (156) from the subnet repository [670].

If no layer-2 redundancy protocol is required on the interface, the first available IP address can be retrieved in 157 from the subnet repository [670] and assigned to the interface of the VHE node. If a layer-2 redundancy protocol is required on the interface, the first available IP address that is not the IP address calculated with the layer-2 IP address offset [225.2] that defines the master IP address of the layer-2 redundancy protocol can be retrieved in 157 from the subnet repository [670] and assigned to the interface of the VHE node. In both cases, within the subnets repository [670], any successful assignment of IP address to an interface can lead to the interface type [674.1], interface ID [674.2] and sub interface ID

[674.3] being saved in 158 to allow tracking of the assignment. The number of interfaces generated can be counted and the VHE general settings table [310] (which can have parameters of VHE ID 301 and wired network interfaces 312) can be updated accordingly in 154.

Figure 21:
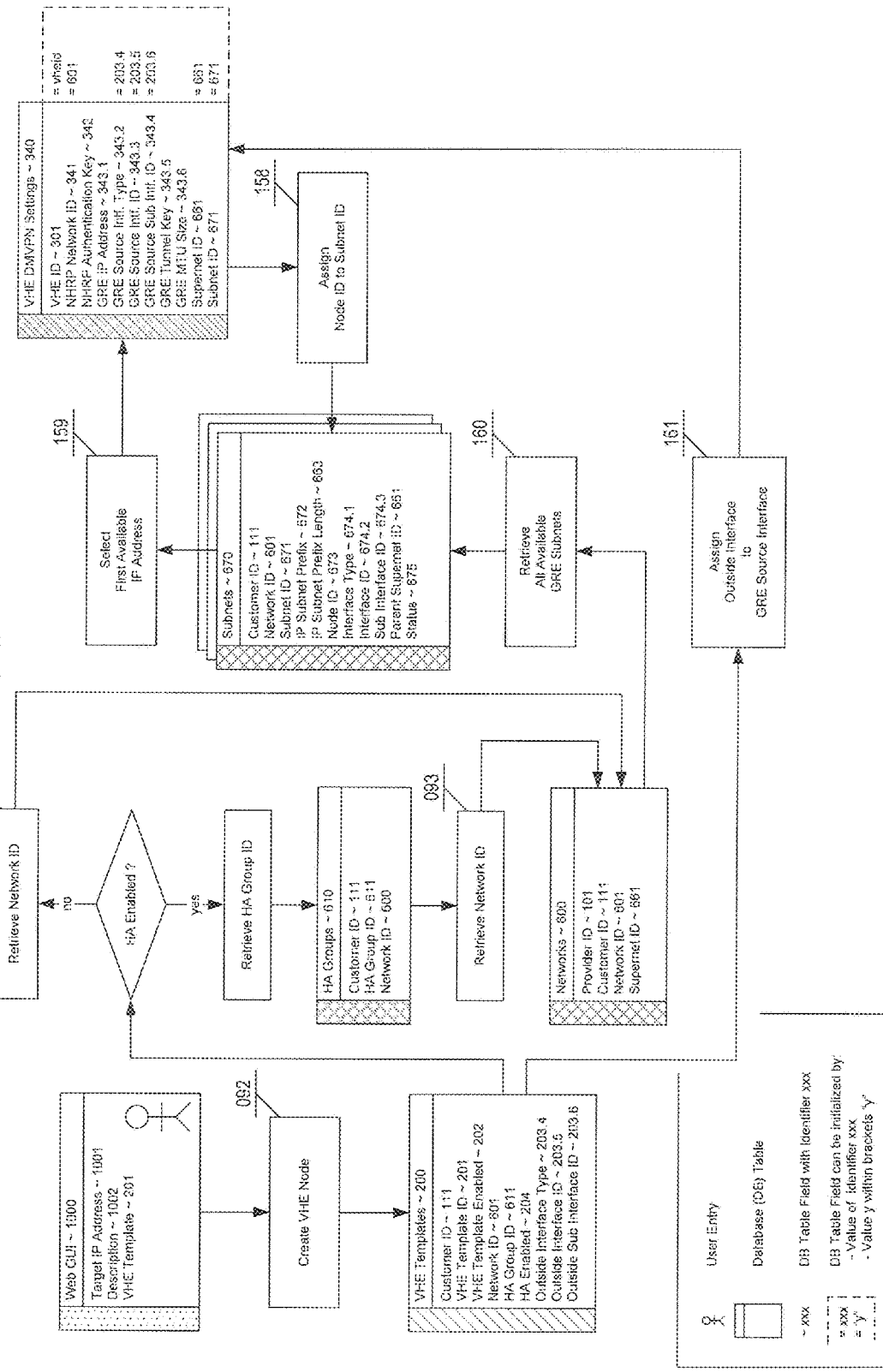

For further explanation, FIG. 21 sets forth a flow chart illustrating an example method for defining the VHE node DMVPN settings table, according to one embodiment. In 092, the VHE node is created and stored in the VHE template database [200]. It is then determined if the VHE template is HA enabled. If no, in 093, the network ID is retrieved from the network database [600]. If the VHE template is HA enabled, the HA group ID is retrieved from the HA groups database [610]. In 093, the network ID can then be retrieved.

In 160, all available associated GRE IP subnets can be retrieved from the subnets repository [670]. The first available IP address can also be retrieved in 159 from the subnet repository [670] and assigned to the GRE interface of the VHE node. The IP address [343.1] can be stored in the VHE node DMVPN table [340] along with other parameters derived from the VHE template table [200]. These parameters can comprise, but are not limited to: the NHRP network ID [341] that is set to the network ID initially found (093), the NHRP authentication key [342] that is a fixed generated value for each network ID, the GRE source interface type [343.2] along with the GRE source interface ID [343.3] and the GRE source sub interface ID [343.4] to assign the outside interface of the VHE node to be the source GRE interface (161), the GRE MTU size [343.6] set to value comprised between 576 and 1416, or the GRE tunnel key [343.5], or any combination thereof. A VHE ID [301] can also be included in the VHE static route database [370].

The GRE tunnel key [343.5] can be calculated as follows: For a given Network ID NetID, $$TK(\text{NetID}) = 100000 \times \text{NetID}$$

where TK(NetID) is the GRE Tunnel Key [343.5]

Within the subnets repository [670], any successful assignment of IP address to a GRE interface can lead to the interface type [674.1], interface ID [674.2] and sub interface ID [674.3] to be saved (158) to allow tracking of the assignment. The assigned subnet ID [671] and parent Master IP Subnet ID [661] for the GRE interface can also be saved in the VHE node DMVPN table [340].

For instance, in the example referred to above that follows the general process of provisioning a node from start to finish, as described in this document, suppose that five VHEs are created: one from the "EU VHEs" Template and four from the "US VHEs" Template.

Deriving the VHE 0 from the EU VHEs Template assigned to Network ID 128001 with no resiliency defined (no HA Group):
Inside Interface is ignored
GRE Tunnel IP Address (from European Tunnel MIS): 10.128.0.1/24
BA=10*(384 Kbps+128 Kbps)*1024*95%
Deriving the VHE 0 from the US VHEs Template assigned to Network ID 255001 with resiliency defined (HA Group "DS Group"):
Inside Interface: Enabled
IP Subnet (from Corporate DC2 MIS): 10.150.0.0/24
GLBP Master IP Address (Subnet ID+1): 10.150.0.1/24
IP Address: 10.150.0.2/24
GRE Tunnel IP Address (from American Tunnel MIS): 10.255.0.1/24
BA=10*(384 Kbps+128 Kbps)*1024*95%
Primary Daisy-Chain to VHE 1
Secondary Daisy-Chain to VHE 2
Deriving the VHE 1 from the US VHEs Template assigned to Network ID 255001 with resiliency defined (HA Group "DS Group"):
Inside Interface: Enabled
IP Subnet (from Corporate DC2 MIS): 10.150.0.0/24
GLBP Master IP Address (Subnet ID+1): 10.150.0.1/24
IP Address: 10.150.0.3/24
GRE Tunnel IP Address (from American Tunnel MIS): 0.255.0.2/24
BA=10*(384 Kbps+128 Kbps)*1024*95%
Primary Daisy-Chain to VHE 2
Secondary Daisy-Chain to VHE 3
Deriving the VHE 2 from the US VHEs Template assigned to Network ID 255001 with resiliency defined (HA Group "DS Group"):
Inside Interface: Enabled
IP Subnet (from Corporate DC2 MIS): 10.150.0.0/24
GLBP Master IP Address (Subnet ID+1): 10.150.0.1/24
IP Address: 10.150.0.4/24
GRE Tunnel IP Address (from American Tunnel MIS): 10.255.0.3/24
BA=10*(384 Kbps+128 Kbps)*1024*95%
Primary Daisy-Chain to VHE 3
Secondary Daisy-Chain to VHE 0
Deriving the VHE 3 from the US VHEs Template assigned to Network ID 255001 with resiliency defined (HA Group "DS Group"):
Inside Interface: Enabled
IP Subnet (from Corporate DC2 MIS): 10.150.0.0/24
GLBP Master IP Address (Subnet ID+1): 10.150.0.1/24
IP Address: 10.150.0.5/24
GRE Tunnel IP Address (from American Tunnel MIS): 10.255.0.4/24
BA=10*(384 Kbps+128 Kbps)*1024*95%
Primary Daisy-Chain to VHE 0
Secondary Daisy-Chain to VHE 1
Target CPE Endpoint Generation.

Figure 22:
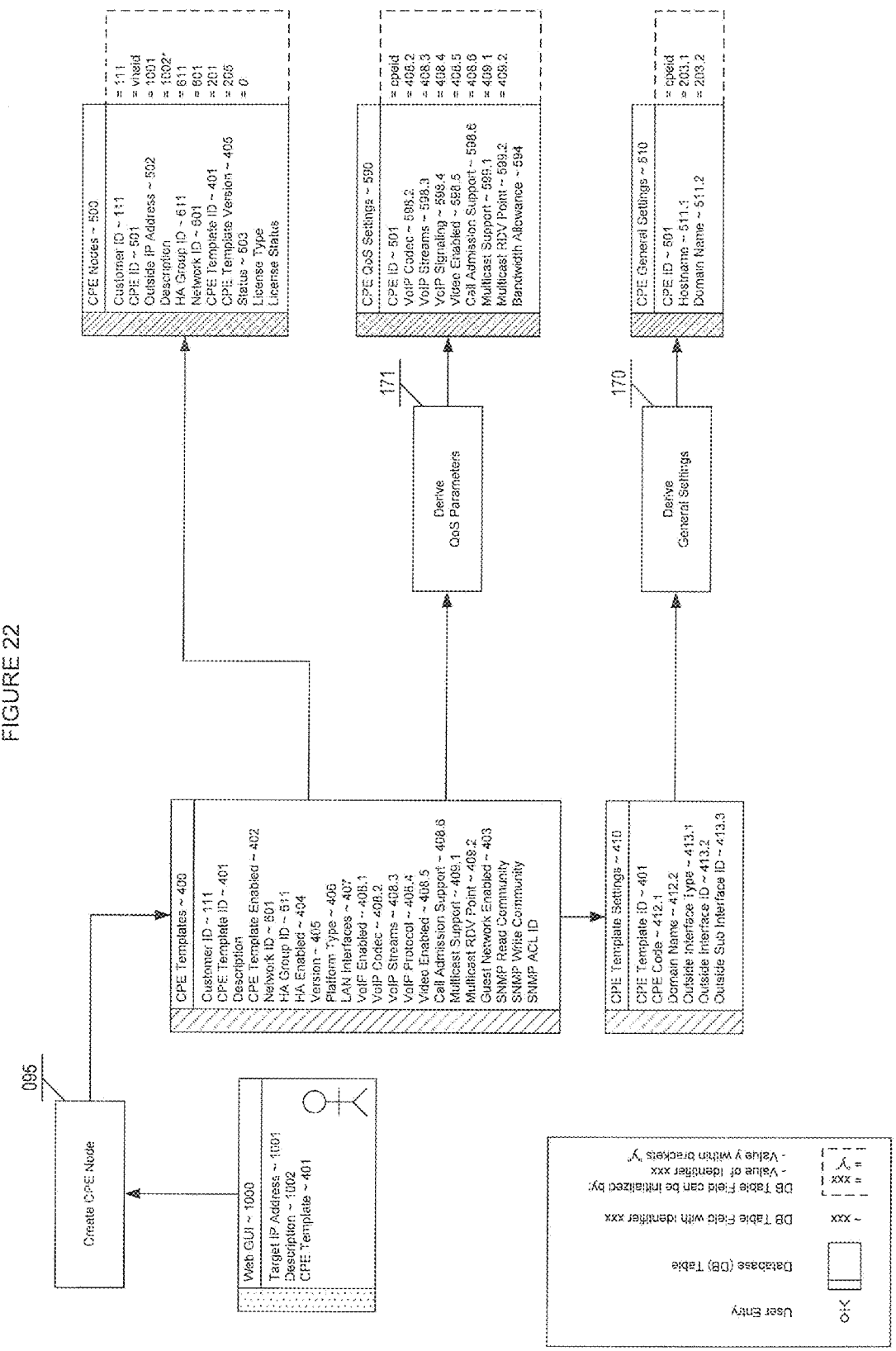

FIGS. 22 to 26 set forth several flow charts illustrating an example method for creating the CPE configuration in the repository. In FIG. 22, when the user '⚤' triggers the creation of a new CPE in 095, a set of parameters can be derived from the CPE Template table [400] and the CPE Template Settings table [410] to the CPE Nodes and CPE General Settings tables [500, 510]. These parameters in the CPE Template table [400] and the CPE Template Settings table [410] can comprise, but are not limited to: the Customer ID [111], the HA Group ID [611], the Network ID [601], the CPE Template ID [401] used to generate this CPE node, the current CPE Template version [405], or IP domain name [511.2], or any combination thereof. Another set of parameters can be dynamically generated. These can comprise, but are not limited to: the CPE ID that can be a newly generated reference value for this CPE node [501], the outside IP address [502] that can be the external IP address provider by the user '⚤' and that can be used to send the generated configuration command set to the target CPE node, the description that can include a self incrementing counter, the status [503] set to the value of "0" as the CPE node is not yet deployed, the hostname [511.1] that can be generated from the CPE code [412.1] in the CPE Template [400]; or a self-incrementing counter; or any combination thereof.

In FIG. 22, when the user '☥' triggers the creation of a new CPE in 095, a set of parameters can be derived in 171 from the CPE Template table [400] to the CPE node Quality of Service (QoS) settings table [590]. These parameters can comprise, but are not limited to: the Voice over IP (VoIP) Coder Decoder (Codec) [598.2] used, the number of concurrent VoIP streams [598.3] expected, the VoIP Signaling protocol [598.4], the video enabled flag [598.5] for the video streaming support, the call admission support [598.6] for the bandwidth preservation technique, the multicast support [599.1], or the multicast rendez-vous point [599.2] IP address, or any combination thereof. Another set of parameters can be dynamically generated. These parameters can comprise, but are not limited to: the external interface Bandwidth Allowance (BA) [594] that can be calculated as follows:

For:
1. a given VoIP Codec with an encrypted payload of $b_c$ per voice call,
2. a given number of concurrent calls s, $$BA = b_c \times s$$

where BA is the Bandwidth Allowance for the external interface [584].

For instance, the rate of G.711 codec-based voice encrypted with IPSec (3DES/SHA-1) is set to 128 Kbps. Indeed, let's see how this rate is calculated based on a 200-byte G.711 voice packet with a 50 pps (packets per second) rate over a PPP encapsulation. IP GRE Encapsulation adds 24 bytes. The ESP header that is part of the IPSec encapsulation contains a 4-byte Security Parameter Index (SPI) field and the 4 byte sequence number (anti-replay logic). Those skilled in the art will appreciate that 3DES algorithm requires adding padding to the plain text as DES is a block cipher, encrypting blocks of 8 bytes (64-bits) at a time. ESP might add up to 255 bytes of padding. The ESP Authentication Data field must align on a 4-byte boundary. The ESP Pad length field is 1 byte and starts at the third byte of a 4-byte word, and the ESP Next Header field occupies the forth byte. The Next Header field is used to identify the payload's protocol. The ESP Authentication Data field contains the SHA-1 20 byte hash truncated to 12 bytes as specified in RFC 2104 regarding truncation of the hash value). The ESP IV (Initialization Vector) ensures the uniqueness cipher text if the same plain text characters are encrypted in different blocks or messages. It is used by block chaining ciphers like DES. In this example, IPSec adds 80 bytes to the IP GRE packet, so the resulting packet combined with IP GRE and IPSec is 280 bytes. As a PPPoE encapsulation adds 8 bytes of Layer-2 overhead, the resulting packet is now 288 bytes. 288 bytes at 50 pps is 115'200 bits per second. Those skilled in the art will appreciate that as they might be different layer-2 overhead, setting the rate to 128 Kbps covers all the possible scenario. The same calculation is done with other voice codecs. For instance, the rate set for an IPSec tunnel with a G.729 codec-based voice payload is 64 Kbps.

Figure 23:
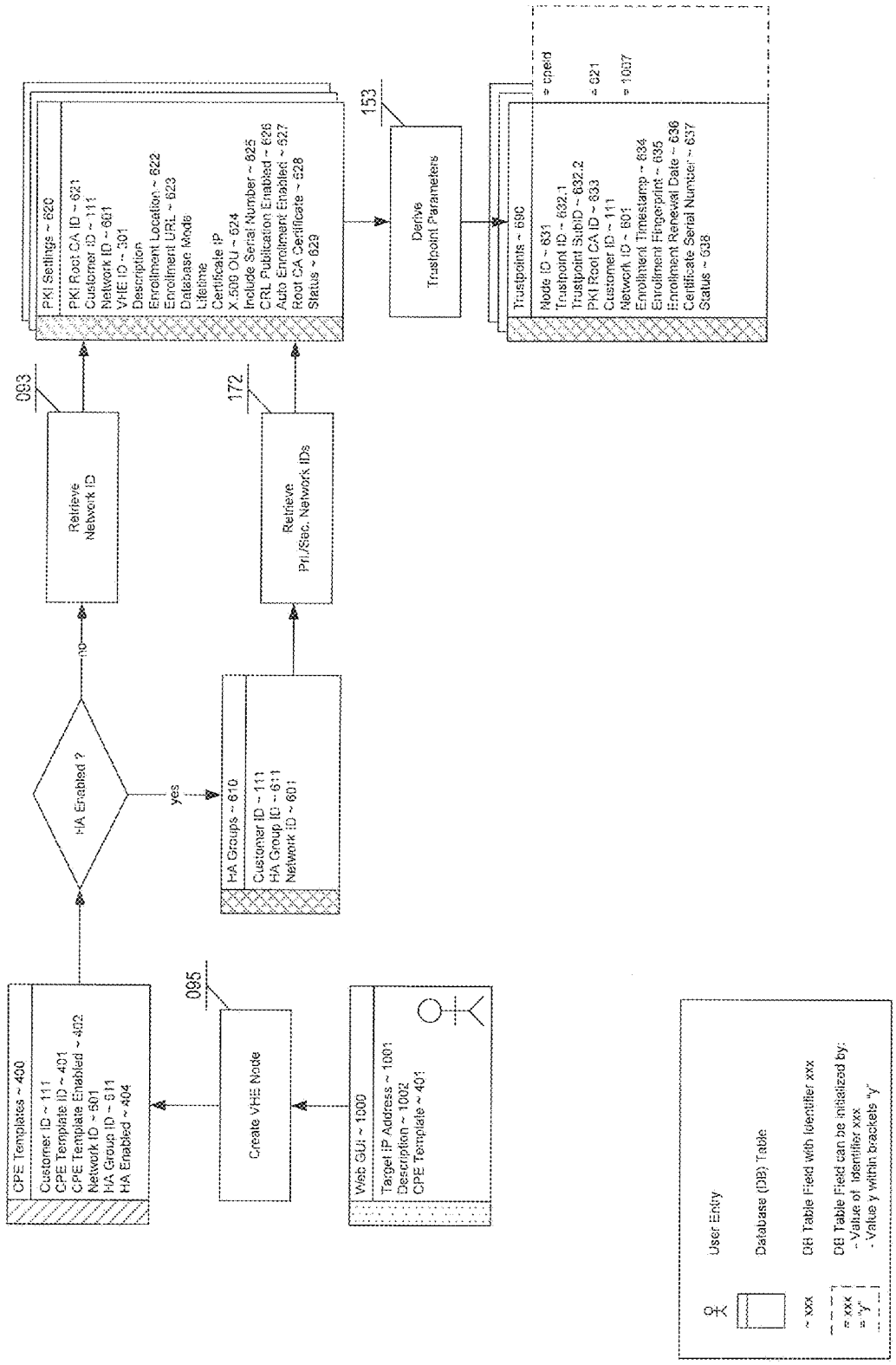

FIG. 23 sets forth a flow chart illustrating an example method for generating an entry into the Trustpoint table [690]. Depending on the CPE Template [400] being bound to either one Network ID [601] or a Bundling HA Group ID [611], one or many entries can be created in the Trustpoint table [690]. Indeed, when the Template [400] is bound to one Network ID [601], one Trustpoint entry is created as only one certificate is required to join that Network ID [601]. But if the CPE Template [400] is bound to a Bundling HA Group [611], at least two entries can be created in the Trustpoint table [690] as a Bundling HA Group [611] can consist in two Network IDs, one primary and one secondary. Hence two certificates are required to join the primary and secondary Network IDs respectively. Parameters in the Trustpoint table [690] can be derived in (153) from the PKI Root CA settings table [620] and can include, but are not limited to: Node ID that will be initialized with the CPE reference value [501], the Trustpoint ID that can be a newly generated reference value for this Trustpoint entry [632.1], the Trustpoint Sub ID that can be an index to number all the Trustpoints of a same endpoint (a CPE in that case) [632.2], or the PKI Root CA ID [633] that can refer to the PKI Root CA of the current Network ID [601], or any combination thereof. The Status [638] can be set to zero as the enrollment has not started (it will start later). All the other parameters are not initialized until the CPE enrolls for its certificates (process detailed later).

Figure 24:
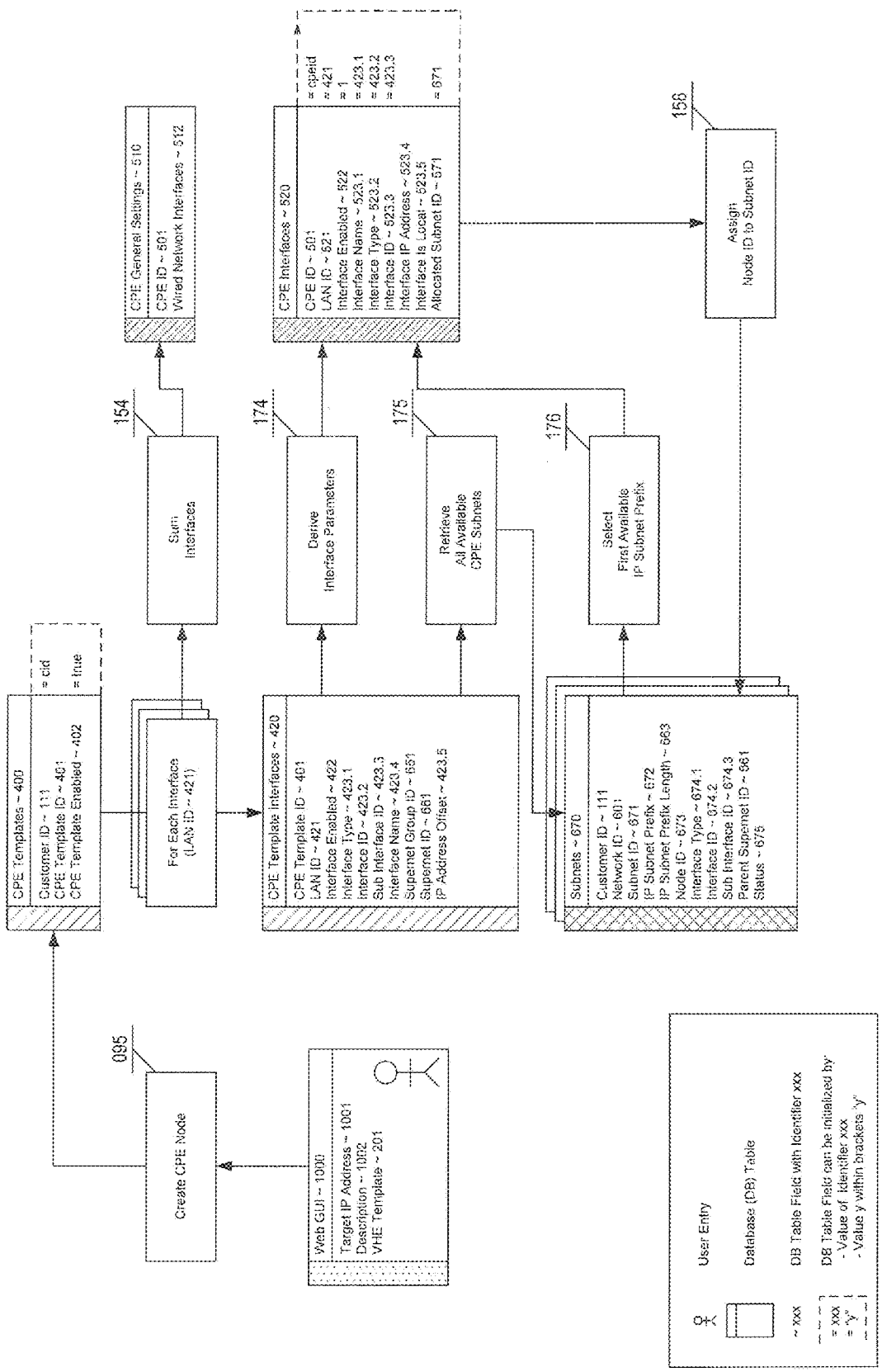

In FIG. 24, when the user '☥' triggers the creation of a new CPE in 095, a set of parameters can be derived in 174 from the CPE Template [400] to the CPE node interfaces table [520]. An interface can be enabled only if the interface enabled flag [522] is set to true. Otherwise, the interface will be disabled. The parameters in the CPE interface table [520] can comprise, but are not limited to: the LAN interface ID [521], the interface name [523.1], the interface type [523.2], the interface ID [523.3], the sub interface ID [523.4], the "interface is local" flag [523.5] to allow the IP subnet ID being part of the announced routing prefix within the DMVPN network, or the allocated subnet ID [671] to allow tracking of the allocated subnet from the subnets repository [670], or any combination thereof. A CPE ID [501] can also be included.

Another set of parameters can be dynamically generated. These parameters can comprise, but are not limited to: the interface IP address [523.4] that is generated by taking the first available IP subnet prefix retrieved in 176 from the subnets repository [670] and adding it to the CPE Template IP address offset [423.5]. The IP address offset [423.5] can be a feature of the example remote device automation engine which can perform even IP numbering across all the endpoints. For instance, for two CPE nodes and two given IP subnet prefixes such as 10.255.1.8/29 and 10.255.1.16/29, if the IP address offset is set to SubnetID+2, the first CPE node interface will get 10.255.1.10/29 as the calculated IP address (8+2=10) and the second CPE node interface will get 10.255.1.18/29 as the calculated IP address (16+2=18). As another example, for two other CPE nodes and two given IP subnet prefixes such as 10.244.3.128/29 and 10.244.3.136/29. if the IP address offset is set to Broadcast ID-1, the first CPE node interface will get 10.244.3.134/29 as the calculated IP address (135−1=134) and the second CPE node interface will get 10.244.3.142/29 as the calculated IP address (143−1=142). The number of interfaces generated can be counted and the CPE General Settings table [510] updated accordingly in 154. Within the subnets repository [670], any successful assignment of IP address to an interface can lead to the interface type [674.1], interface ID [674.2] and sub interface ID [674.3] to be saved in 158 to allow tracking of the assignment.

Figure 25:
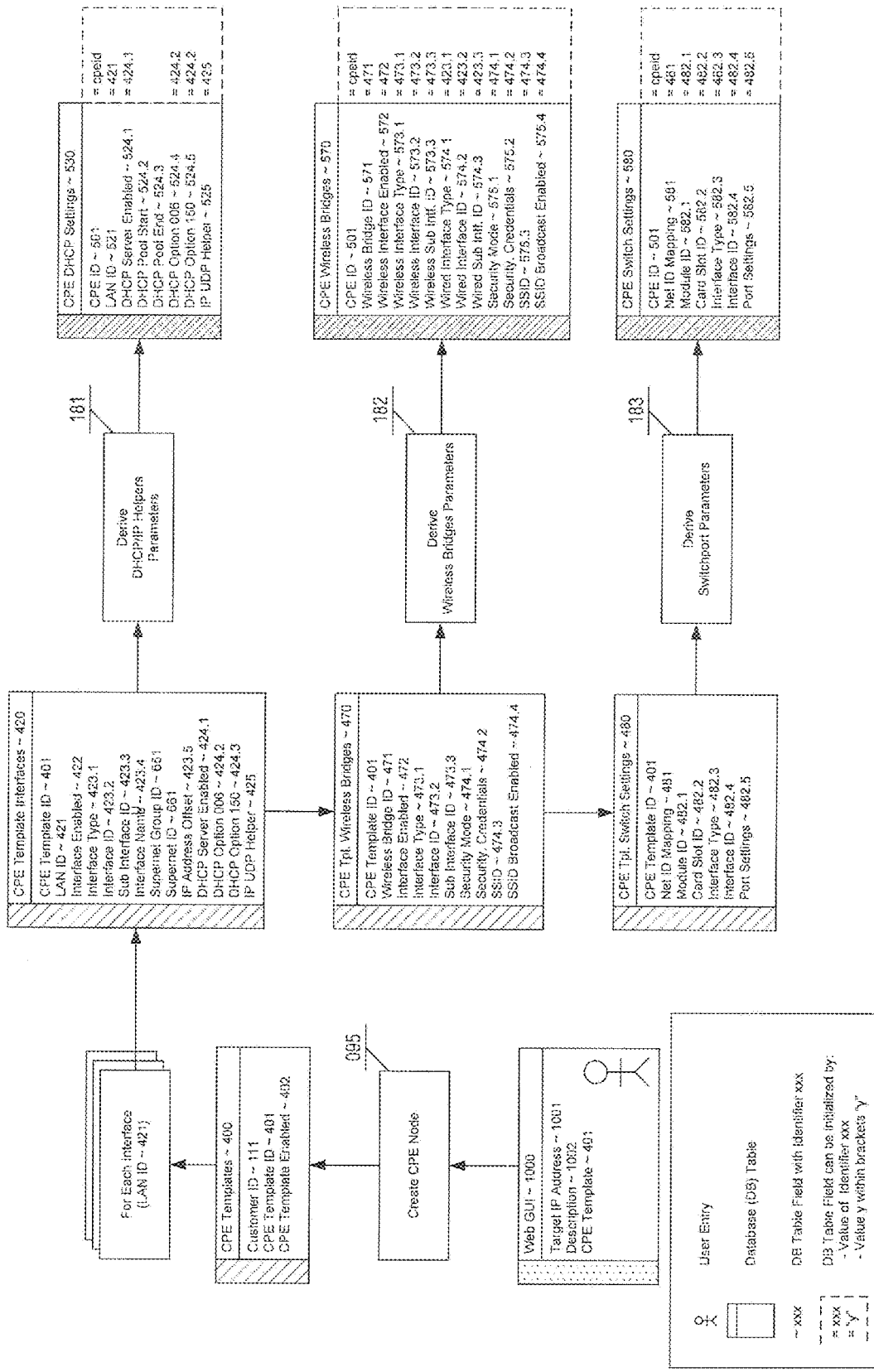

In FIG. 25, when the user '☥' triggers the creation of a new CPE in 095, a set of parameters can be derived in 181 from the CPE template interfaces table [420] to the CPE node DHCP settings table [530]. These parameters can comprise, but are not limited to: the LAN interface ID [521], the DHCP server enabled flag [524.1] that defines if the local DHCP server is enabled in the CPE node, the DHCP pool start [524.2] value that defines the first value for the last octet of the DHCP pool if the local DHCP server is enabled, the DHCP pool start [524.3] value that defines the last value for the last octet of the DHCP pool if the local DHCP server is enabled, the DHCP option 006 [524.4] value that defines the DNS servers when the local DHCP server is enabled, the DHCP option 150 [524.5] value that defines the TFTP servers when the local DHCP server is enabled, or the IP UDP helper [525] value that defines the IP UDP helper IP addresses that forward the UDP packets if the local DHCP server is disabled, or any combination thereof. A CPE ID [501] can also be included.

Also in FIG. 25, when the user '⚥' triggers the creation of a new CPE in (095), a set of parameters can be derived in (182) from the CPE Template Wireless Bridges table [470] to the CPE Wireless Bridges table [570]. These parameters can comprise, but are not limited to: the wireless bridge ID [571], the wireless interface enabled [572] flag when a LAN interface is bridged to a wireless interface, the wireless interface type [573.1] and corresponding wired interface type [574.1], the wireless interface ID [573.2] and corresponding wired interface ID [574.2], the wireless sub interface ID [573.3] and corresponding wired sub interface ID [574.3], the wireless security mode [575.1] that defines the wireless security mode, the wireless security. credentials [575.2] that defines the corresponding security credentials for the given security scheme [575.1], the wireless SSID [575.3], or the SSID broadcast enabled [575.4] flag that defines whether the SSID is broadcast and visible, or any combination thereof. A CPE ID [501] can also be included.

Referring again to FIG. 25, when the user '⚥' triggers the creation of a new CPE in (095), a set of parameters can be derived in (183) from the CPE. Template switch settings table to the CPE node switch settings table [580]. These parameters can comprise, but are not limited to: the net ID mapping [581] which defines the VLAN ID to which the switch port is assigned to, the module ID [582.1], the card slot ID [582.2], the interface type [582.3], the interface ID [582.4], all last four values defining the physical location of a switch port on the CPE node, or the port settings [582.5] that defines the physical settings of the switch port (speed, duplex, MDI-x), or any combination thereof. A CPE ID [501] can also be included.

Figure 26:
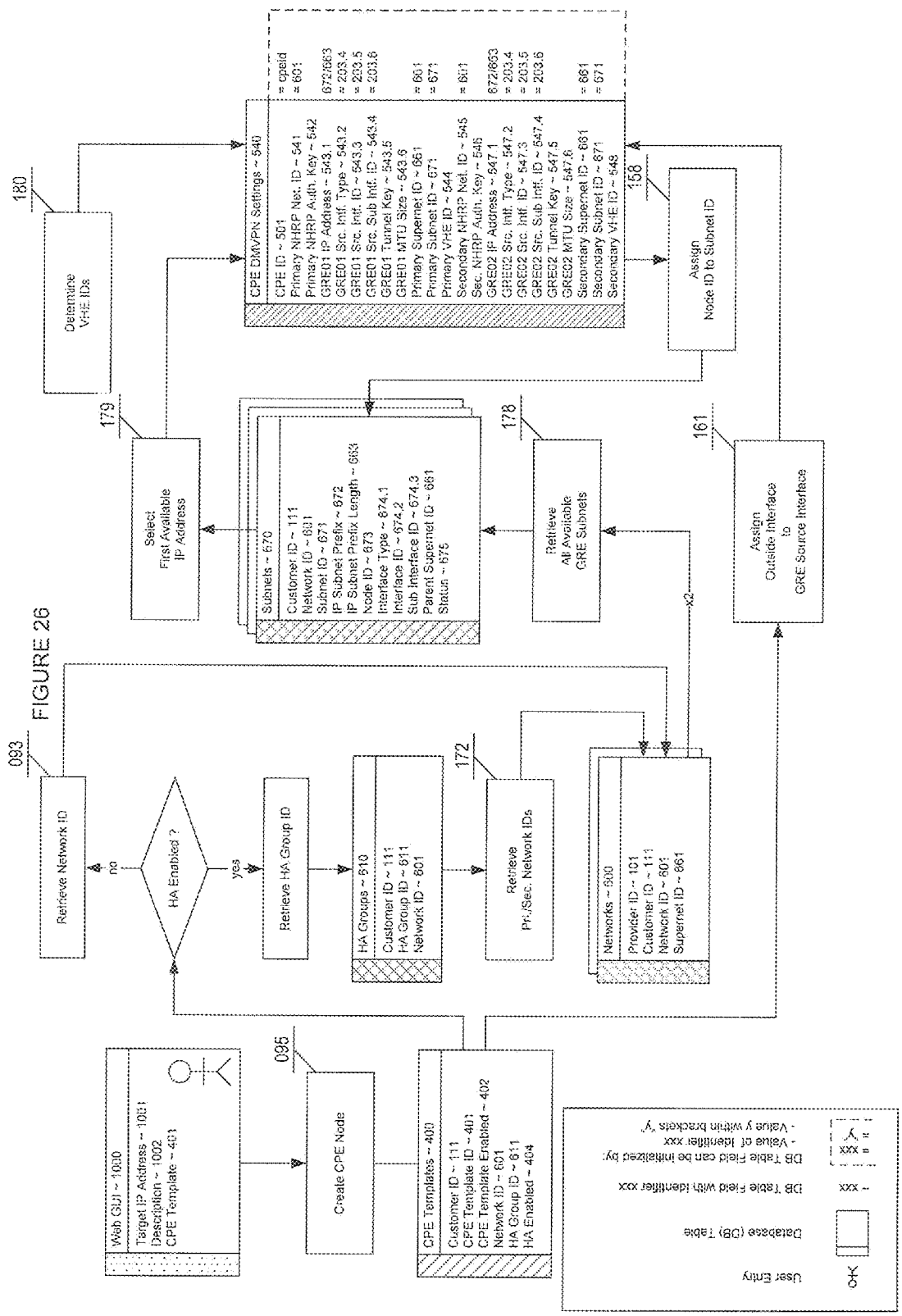

FIG. 26 sets forth a flow chart illustrating an example method for defining the CPE node DMVPN Settings table, according to one embodiment. In (095), the CPE node is created. It is then determined if it is HA enabled. Depending on the CPE Template [400] being bound to either a Network ID [601] or a CPE Bundling HA Group [611], one Network ID in (093), or two Network IDs in (172), can be found to retrieve the associated GRE IP subnets in (178) from the subnets repository [670]. The CPE node can have one GRE interface per Network ID attached. If the CPE does not belong to a CPE Bundling HA Group, the CPE node is not dual-attached (only attached to one Networks ID) and has one GRE interface. If the CPE belongs to a CPE Bundling HA Group, the CPE node is dual-attached (attached to two Network IDs) and has two GRE interfaces. In (179), the first available IP addresses can be retrieved from the subnet repository and assigned to each GRE interface of the CPE node. The resulting IP addresses [543.1, 547.1] can be stored in the CPE DMVPN Settings table [540] along with other parameters derived from the CPE Template table [400] and networks table [600]. If the CPE is not dual-attached, these parameters can comprise, but are not limited to: the NHRP network ID [541] that is set to the network ID initially found in (093), the NHRP authentication key [542] that is fixed generated values for each. Network ID, the GRE source interface type [543.2] along with the GRE source interface ID [543.3] and the GRE source sub interface ID [543.4] to assign the outside interface of the CPE node to be the source GRE interface in 161, the GRE MTU size [543.6] set to value comprised between 576 and 1416, or the GRE tunnel key [543.5], or any combination thereof. The GRE tunnel key [543.5] can be calculated as follows:

For a given Network ID NetID, $$TK(NetID) = 100000 \times NetID$$

where TK(NetID) is the GRE Tunnel Key [543.5]

If the CPE is dual-attached, these parameters can comprise, but are not limited to: the IMHRP network IDs [541, 545] that are set to the network IDs initially found (172), the NHRP authentication keys [542, 546] that are fixed generated values for each network ID, the GRE source interface types [543.2, 547.2] along with the GRE source interface IDs [543.3, 547.3] and the GRE source sub interface IDs [543.4, 547.4] to assign the outside interface of the CPE node to be the source GRE interface (161), the GRE MTU sizes [543.6, 547.6] set to values comprised between 576 and 1416, or the GRE tunnel keys [543.5, 547.3], or any combination thereof. The GRE tunnel keys [543.5, 547.3] can be calculated as follows:

For a given primary Network ID NetID$_1$, $$TK_1(NetID_1) = 100000 \times NetID_1$$

where $TK_1(NetID_1)$ is the primary GRE Tunnel Key [543.5]

For a given secondary Network ID NetID$_2$, $$TK_2(NetID_2) = 100000 \times NetID_2$$

where $TK_2(NetID_2)$ is the secondary GRE Tunnel Key [547.5]

In both cases, within the subnets repository [670], any successful assignment of IP address to a GRE interface can lead to the interface type [674.1], interface ID [674.2] and sub interface ID [674.3] to be saved (158) to allow tracking of the assignment. The assigned subnet ID [671] and parent Master IP Subnet ID [661] for the GRE interfaces can also be saved in the CPE node DMVPN table [540]. The assignment of VHE IDs—the VHE node to which each GRE interface of the CPE node is pointing at—can be achieved by leveraging the deterministic load-balancing algorithms described earlier.

For instance, in the example referred to above that follows the general process of provisioning a node from start to finish, as described in this document, suppose that two CPEs are created: one from the "EU CPEs" Template and four from the "APAC CPEs" Template.

Deriving the CPE 0 from the EU CPEs Template assigned to Network ID 128001 with no resiliency defined (no HA Group).
        GRE Tunnel IP Address (from European Tunnel MIS): 10.128.0.2/24
        VLAN10 DATA
            IP Subnet (Corporate Data MIS): 10.128.10.0/29
            IP Address (Subnet ID+1): 10.128.10.1/29
            Wireless SSID data@gvo with WPA2
            DNS 10.99.0.1 and 10.99.0.2
        VLAN20 VOICE:
            IP Subnet (Corporate Voice MIS): 10.128.20.0/29
            IP Address (Subnet ID+1): 10.128.20.1/29
            Wireless SSID voice@gvo with LEAP (using ipphone/myipphone credentials)
            DNS 10.99.0.1 and 10.99.0.2
        VLAN30 GUEST:
            IP Subnet (Spouse & Kid Voice MIS): 192.168.2.0/24
            IP Address (Subnet ID+1): 192.168.2.1/24
            This VLAN is a Spouse & Kid VLAN (not routed)

Wireless SSID guest with WPA2
   DNS 194.98.65.65 and 194.98.65.165
... with the embedded switch map as follows:
   VLAN DATA on Port0, Port1
   VLAN VOICE on Port2
   VLAN GUEST on Port3
Deriving the CPE 0 from the APAC CPEs Template assigned to Network IDs 128001 and 255001 with resiliency defined (HA Group "Dual-Homing Group").
   Primary GRE Tunnel IP Address (from European Tunnel MIS): 10.128.0.3/24
   Secondary GRE Tunnel IP Address (from American Tunnel MIS): 10.255.0.5/24
   VLAN10 DATA
      IP Subnet (Corporate Data MIS): 10.128.10.0/29
      IP Address (Subnet ID+1): 10.128.10.1/29
      Wireless SSID data@gvo with WPA2
      DNS 10.99.0.1 and 10.99.0.2
   VLAN20 VOICE:
      IP Subnet (Corporate Voice MIS): 10.128.20.0/29
      IP Address (Subnet ID+1): 10.128.20.1/29
      Wireless SSID voice@gvo with LEAP (using ipphone/myipphone credentials)
      DNS 10.99.0.1 and 10.99.0.2
... with the embedded switch map as follows:
   VLAN DATA on Port0, Port1, Port2
   VLAN VOICE on Port3

Workflow Process

Extending the corporate network boundaries to a remote workforce (e.g. VPNs) is a difficult task—as explained earlier (and where the example remote device automation engine (040) provides a solution)—but configuring endpoints is only half of the problem. The other aspect of the deployment is provisioning endpoints to all the remote locations and managing upcoming requests from users that want to be part of the remote workforce. Indeed, if remote locations include a high number of premises like homes, the IT department is not structured to deal with the logistics (ordering, staging, shipping) or user requests. For a large corporate entity with thousands of employees, the IT support team would not be able to deal with the flow of the user requests.

An example workflow is illustrated in FIG. 32, which deals with many aspect of the provisioning process allowing, end-users to self-provision their access and significantly reducing the workload of the technically skilled team. Before explaining how the Workflow works, it should be noted that the example remote device automation engine (040) can enforce role-based access control (RBAC) as specified under the NIST/ITL, Bulletin of December 1995 entitled "An Introduction to Role-based Access Control", which is herein incorporated by reference. RBAC can allow a hierarchical enforcement of user credentials based on their roles and privileges. To run the example Workflow, three roles can be required: the Network Administrator, the Logistics Manager and the End-User (Requester). The Network Administrator can have the role of granting, denying or revoking a remote access to the network. The Logistics Manager can have the role of dispatching all the necessary kits to allow the Requester to use the service. The kits can comprise, but are not limited to, a network device (i.e. router) and a VoIP phone. The Requester can be the end-user requesting the service (to join the remote workforce).

When willing to be part of the remote workforce and access the corporate network remotely, the Requester can connect (802) on the example remote device automation engine (040) portal (GUI) and fills a Form (803). That Form can include all the necessary details (803) to enable the service, including, but not limited to: some Requester personal details such as a postal delivery address for the logistics manager to dispatch the kit, some initial specific credentials tied to the remote location (e.g., but not limited to, specific broadband credentials, specify broadband access details such as the Virtual Private Circuit (VPC) for a DSL-based access, or any fixed IP addresses, or any combination thereof), or some initial specific corporate identifiers which would "help" to identify the Requester (e.g., but not limited to, an employee corporate ID, a social security number, or a corporate organization unit, or any combination thereof), or any combination thereof. The Requester can also provide his corporate e-mail address (802). This can be a way of checking and automatically attaching the Request to the relevant customer account (the Customer ID as defined in the example remote device automation device database) using the corporate e-mail domain. For instance, if a customer A has the customera.com e-mail domain, any Requester with an e-mail containing @customera.com can be attached to the Customer A.

As soon as the Form is filled in, the Request can be stored in the example remote device automation engine (040) database. The Requester can come back at any time on the example remote device automation engine portal to get a status on his/her Pending Request. An Alert (805) can be sent to the Network Administrator (e.g., but not limited to, an e-mail and/or a text message) to warn him/her about the Pending Request. Using the example remote device automation engine (040) portal (806), the Network Administrator can grant, deny or simply delete (807) that Pending Request. When the Pending Request is denied (807: no), the Requester will not be able to get access to the corporate network remotely. The reason of the rejection (822) can also be provided. When the Pending Request is approved (807: yes), the Network Administrator can also bind the Request to a particular CPE Template (808). That can inform the example remote device automation engine (040) how to configure the Requester target endpoint accordingly (e.g., to join the "right" DMVPN Networks). As soon as the Request as been approved, the Logistics Manager can receive an Alert (809) to inform him/her there is an approved Request pending. As preparing the kit, the Logistics Manager can change the status of the Request (i.e. like, but not limited to, Kit Ordered, Kit Dispatched) (811). By connecting to the remote device automation engine (040) portal or by receiving an Alert, the Requester can know the status of his Request in real-time. The Kit can be dispatched by the Logistics Manager. The Requester can receive the kit (812) and can connect it on the Internet. The Requester can go back to the remote device automation engine (040) portal (813) and choose the option to enable the service (e.g., to access to the corporate network). That can create the CPE (814) in the example remote device automation engine database derived from the CPE Template as specified by the Network Administrator earlier in the Workflow and start the process of remotely configuring the CPE (815, 816). The endpoint can then be running and the Requester can access the corporate network remotely (817).

Thanks to the Workflow, the workload associated to that Request can be minimal for the Network Administrator.

Orchestrator

An example orchestrator can be used to generate the VPN's customized configuration. As set forth above, the devices can be defined in both VHE and CPE nodes. In the database, the example remote device automation engine (040) can invoke the orchestrator to generate the device command scripts. The example orchestrator can divide the deployment of a target device into phases or tasks, so that different states of the devices can be managed. One difficulty of managing remote devices connected to the Internet is the outside interface. Depending on the technology used to get access to the provider's network from the customer premises, various protocols are available. This is very true for residential Internet access versus corporate accesses. These access technologies to access the Internet can comprise, but are not limited to: any DSL-based technology (ADSL, G.SHDSL, IDSL, VDSL), cable technologies (DOCSIS), radio technologies (satellite links, GSM-based technologies), Metro Ethernet-based technologies (FTTH), and other technologies that will occur to those skilled In the art. For instance, many DSL technologies implement an Asynchronous Transfer Mode (ATM) layer over the low-level bit stream layer to enable the adaptation of a number of different technologies over the same link. DSL implementations may create bridged or routed networks. Current implementations can use Point-to-Point Protocol (PPP) over Ethernet or ATM (PPPoE or PPPoA), while authenticating with a user ID and password and using PPP mechanisms to provide network details (PPP Internet Protocol Control Protocol or IPCP). As a consequence, the initial configuration of an endpoint to get access to the Internet can differ from one to another: different types of interfaces (ATM, Ethernet, Basic Rate Interface or BRI) or encapsulations (PPPoA, PPPoE), embedded DSL modem in the router or not, different user credentials and so on. The example remote device automation engine (040) therefore can perform an endpoint discovery prior to any deployments. Those skilled in the art will appreciate that, in the case of PPPoA or PPPoE on a Cisco router, additional dial-up interfaces can be added to the configurations, including, but not limited to, dialer interfaces. A Dialer interface has to be numbered, and although best practices recommend using interface number IDs "0" or "1" as the most common Dialer interface IDs, any number can be given to it, such as Dialer0, Dialer1, . . . Dialer9. Another example can be given with modular devices such as routers. When adding an interface card into a router, the interface numbering depends on what slot the card has been inserted. If not, previous device discovery is performed, and some features cannot be deployed because of specific command sets that are aimed at interfaces themselves. The consequence can be that, potentially, not all endpoints have similar initial configurations and therefore, no unique DMVPN configurations can be generated and sent over all the endpoints. Some specific initial details already on the endpoint configurations may have to be taken into account in the deployment phase.

In the example remote device automation engine (040), the orchestrator discovery phase can retrieve all the necessary details that are specific to each endpoint. These specific configuration target device parameters can comprise, but are not limited to: endpoint serial numbers, PPP encapsulation types (PPPoA, PPPoE, RFC 1483), the Virtual Channel Identifier (VCI), the Virtual Path Identifier (VPI), the firmware image name, the firmware image version, the feature set, the license type, or the external interface ID, or any combination thereof.

The example orchestrator does not need to directly access the endpoints. Referring back to FIG. 5, the example remote device automation engine (040) can rely on a dedicated module to perform this task: the delivery engine (041). The example delivery engine (041) can be a module which accesses the endpoints over the Internet. A scheduler (038) can manage the timeline for the tasks' execution, allowing the workload to be spread across the timeline and avoid overwhelming the delivery engine (041). Some of the tasks submitted to the delivery engine (041) can come from the example orchestrator (039) but can also come from the configuration engine (036).

Figure 27:
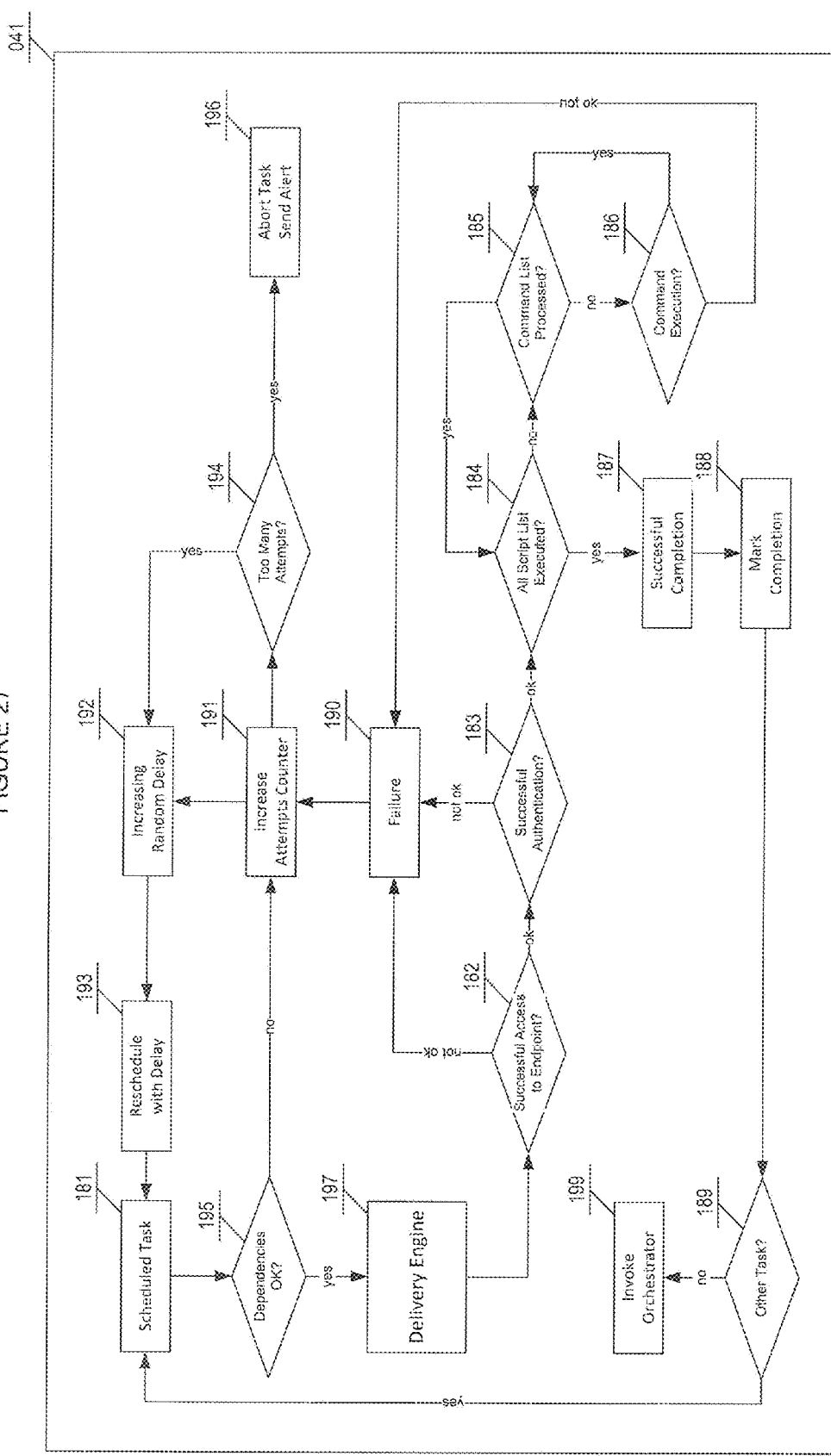

For further explanation, FIG. 27 sets forth a flow chart illustrating the example delivery engine (041), according to one embodiment. A schedule task is submitted in (181). The task dependencies are checked in (195). If the task is dependent on some other non-completed tasks in (195), the task execution is postponed in (193), with an increasing random delay in (192). The number of attempts in (191) can be increased to keep track of the number of failures. If the number of attempts is too high in (194), the task execution can be aborted and not rescheduled in (196). An alert can be raised in (196). If the dependencies are checked and valid, and there are no dependencies or all other dependencies are completed in 195, the task execution can debuts in (197). The example delivery engine (041) can then attempt to connect to the remote endpoint using various possible network protocols such as telnet, SSH, SNMP or any other protocols that will occur to those skilled in the art. Secured protocols can be preferred before falling back to less secure protocols. If the access to the endpoint is not successful in (182), the delivery engine can record a failure in (190). As with previous failures such as failed dependencies in (195), the task can be rescheduled in (193), with an increasing random delay in (192), or a cancellation in (196) if too any attempts have occurred in (194). If the access to the endpoint is successful in (182), the example delivery engine (041) can submit some form of authentication in (183) to get credentials to the endpoint. If the authentication phase fails in (183), the example delivery engine (041) can manage the failure in (190), as previously described. If the authentication phase is successful in (183), the example delivery engine (041) can retrieve all the scripts in 184, and can execute them one by one in (184). A script can be a set of commands (see 185) to be submitted to the endpoint in (186). Two methods of command delivery are possible: 1) submitting each command one by one and waiting for its execution by tracking error or warning messages from the endpoint in real-time (this method is called script mode); 2) submitting all the commands at once by building a temporary file that can be sent to the endpoint using a file transfer protocol, having it read by the parsing engine of the endpoint, and tracking any error or warning messages in real-time (this method is called block mode). The file transfer protocol that can be used can be: Trivial File Transfer Protocol (TFTP), File Transfer Protocol (FTP), Hypertext Transfer Protocol (HTTP), Secure Copy Protocol (SCP) or any other protocol that will occur to those skilled in the art.

The example delivery engine (041) can constantly monitor the endpoint response time by either sending Internet. Control Message Protocol (ICMP) packets, by measuring the time taken to execute a single command, by implementing an IP SLA-based monitoring on the remote endpoint, or by any other method that will occur to those skilled in the art. Depending on the response time of the remote endpoint, the example delivery engine can choose script mode instead of block mode. Block mode may be better with a bad communication with the remote endpoint, because it submits the command to the remote endpoint only when the entire command set has reached the endpoint. Script mode may be better with a good communication with the remote endpoint, because the response of the endpoint to each command is parsed in real-time without issuing any time-outs.

When sending a command to the endpoint triggers an error or a warning message in 186, the example delivery engine (041) can manage the failure in (190), as previously described. When all the command of the script has been successfully sent to the endpoint in (185), the example delivery engine (041) can check in (164) to see if all the scripts have been sent to the endpoint. If there are remaining scripts to execute in (184), they can be processed accordingly in (185). If all the scripts have been successfully executed in (184), the task has been completed successfully in (187), and is marked accordingly in the database in (188). If a following task to this task is found in (189), the following task can be scheduled for execution and queued in the scheduler queue in (181). If no following task is found in (189), the example orchestrator can be notified that the task has been successfully completed.

Figure 28:
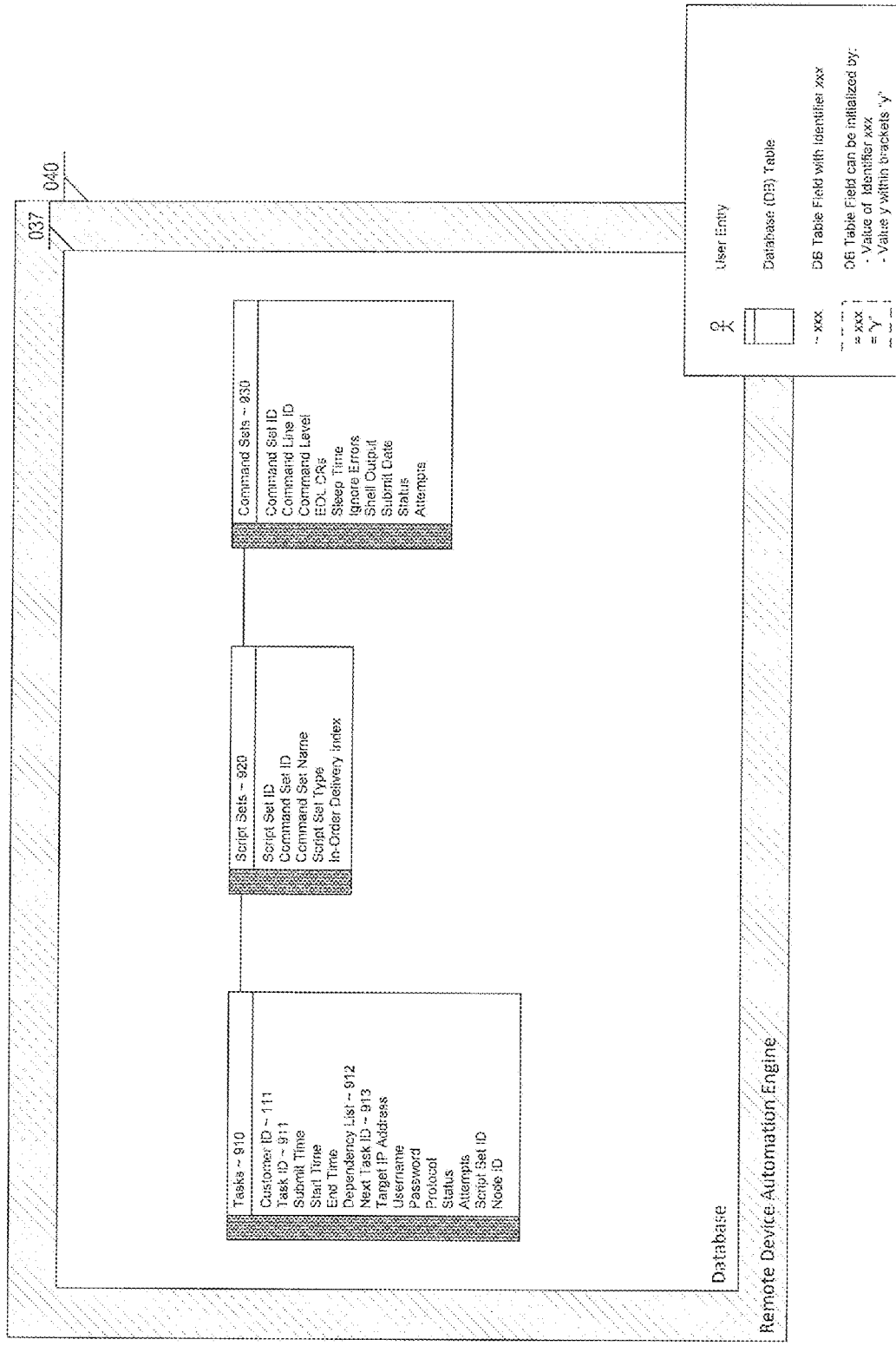

FIG. 28 sets forth a flow chart illustrating the example delivery engine database. The database can comprise, but is not limited to, three tables: the tasks table (910), the script sets table (920) and the command sets table (930). The two-field dependency list (912) and next task ID (913) can be used to check the task dependency as described in FIG. 27. A task can be dependent with other tasks (912) or can follow up new tasks (913) upon successful completion.

Example Orchestrator Phases

Figure 29:
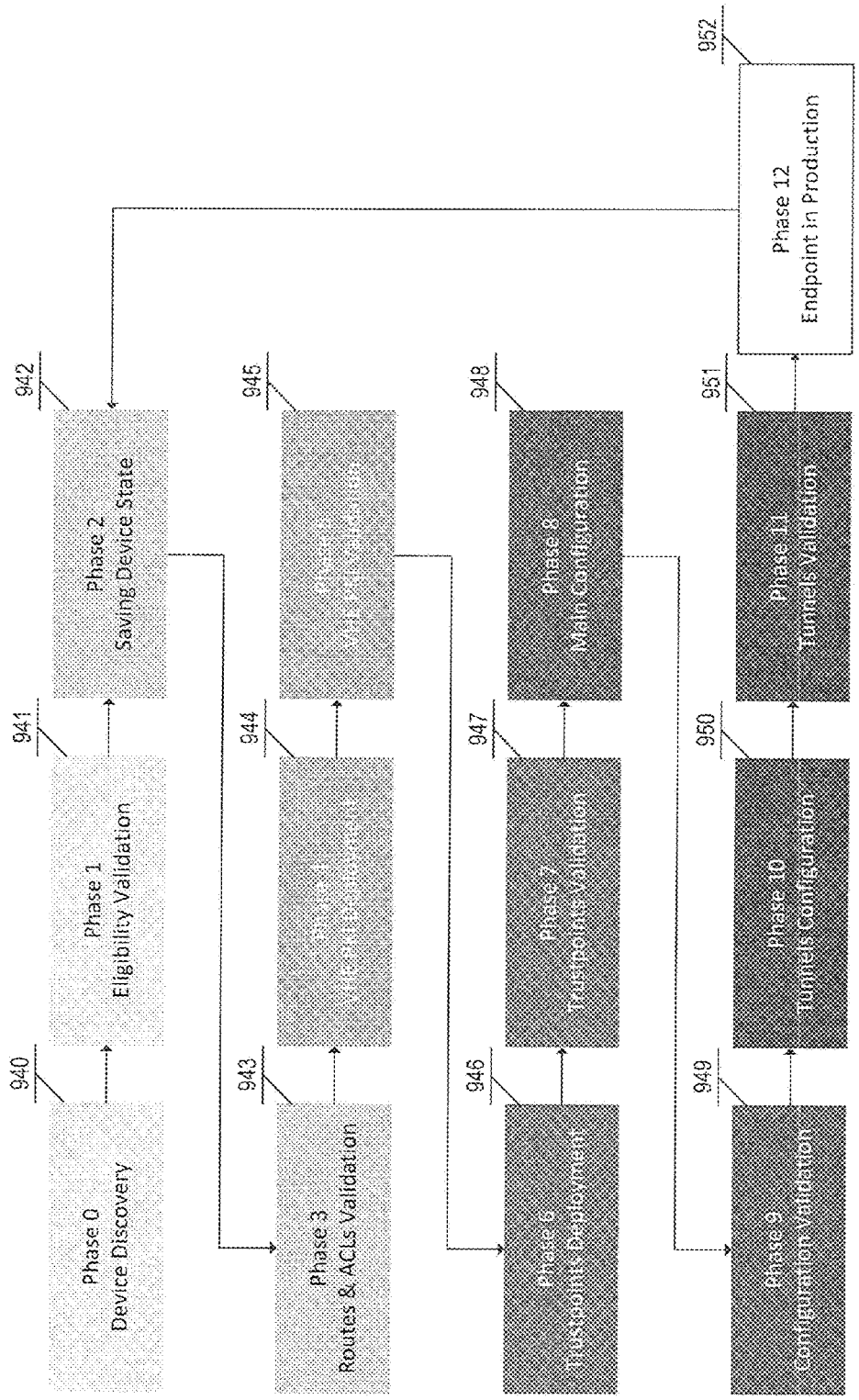

FIG. 29 sets forth a flow chart illustrating the example orchestrator phases. The example orchestrator phases can comprises, but are not limited to, twelve phases:

Phase 0: Device Discovery Phase (940). In the device discovery phase, the example remote device automation engine can submit a discovery task to the example delivery engine. The latter will only perform commands to retrieve logical and hardware configurations of the remote endpoint. All the outputs can be stored in the database. The orchestrator can invoke the scheduler to schedule the discovery task.

Phase 1: Eligibility Validation Phase (941). The orchestrator can retrieve the output of the device discovery phase stored in the database and parses the output with advanced pattern matching functions to discover key parameters of the endpoint. In this particular phase, the example orchestrator can analyze the technical details retrieved from the endpoint in order to determine a configuration. This can allow the example orchestrator to determine if the outside interface is bound to a dialer interface for a given endpoint and what encapsulation is used, if any. As a result, the example orchestrator may be able to configure the endpoint interfaces accordingly. Those skilled in the art will remember that, in the case of an ATM interface in a DSL-based connection, the QoS policy is enforced on the ATM interface itself, while the context-based access control (CBAC) policy is applied on the dialer interface. Thanks to this in-depth analysis of the endpoint, the example orchestrator can be capable to self-adapt to the target endpoint for a successful remote configuration.

Phase 2: Saving Device State Phase (942). The example orchestrator can submit a task to the delivery engine to perform the following actions: saving the current configuration of the device prior any modifications (to facilitate any requirement for a rollback), deploying host-based IP routes in the case of Route Zero Preservation, and amending the ACLs of all the VHEs in production when new CPEs are being registered (to allow give access to the certificate enrollment URL for instance). The orchestrator can invoke the scheduler to schedule this task. Three scripts can be created in this task: one for saving the endpoint current configuration, one for updating the other in-production endpoints routing tables, and one for updating the VHE ads.

Phase 3: Routes & ACLs Validation Phase (943). The example orchestrator can parse the output of the endpoint to check if the previous phase 2 has been successfully completed.

Phase 4: VHE PKI Root CA Deployment Phase (944). This phase can be reserved for a VHE hosting the PKI Root CA. The example orchestrator can configure a local PKI server on the target VHE. The orchestrator can invoke the scheduler to schedule the PKI Root CA configuration task.

Phase 5: VHE PKI Root CA Validation Phase (945). The example orchestrator can parse the output of the VHE hosting of the local PM server to check to see if the local. PKI server is properly configured. If that is the case, the PM Root CA certificate can be retrieved and stored in the database. It can require configuration of all the trustpoints of the participating endpoints within the DMVPN network.

Phase 6: Trustpoints Deployments Phase (946). The example orchestrator can deploy all the necessary trustpoints on the endpoint. The deployment of the trustpoints also can include delivering the PM Root CA certificate to the endpoint to avoid the authentication phase of the PM Root CA. The orchestrator can invoke the scheduler to schedule the endpoint trustpoints configuration task. On the VHE running the local PM Root CA, an additional task can be scheduled to grant the pending certificate as part of the X.509 certificate enrollment process. That additional task can be a process called Fingerprint Matching. This process can be a security process ensuring that certificates are only generated and delivered to legitimate endpoints. When an enrollment request is triggered on an endpoint, it can have a unique fingerprint. Those skilled in the art will understand that this is a normal part of the enrollment process. On the PKI Root CA, there can be a pending enrollment request pending to be approved. Before the certificate is granted, the example orchestrator can verify if the fingerprint of the pending request in the PKI Root CA is the same as the fingerprint of the enrollment request in the endpoint and if the serial number of the requesting endpoint is a known serial number (enrollments are only permitted to known endpoints). If that is the case, the certificate can be granted and delivered. If that is not the case, the request can be considered rogue and discarded.

Phase 7: Trustpoints Validation Phase (947). The example orchestrator can parse the output of the endpoint to check if the previous phase 6 has been successfully completed.

Phase 8: Main Configuration Phase (948). The example orchestrator can deploy all the aspects of the target configuration of the endpoint. The general settings can include, but are not limited to: Authentication/Authorization/Accounting (AAA), the local firewall (Context-based Access Control or CBAC or the Zone Firewall) and intrusion detection engine (IDS), the Network Time Protocol (NTP) settings, the QoS engine, the Access Control Lists (ACLs) on the outside interface, the internal interfaces and associated switch, wireless bridges and ACLs, the Network Address Translations (NAT), the routing table, the dynamic routing protocols, the customer views (to restrict the access to the router), the Null interface, the loopback interfaces, the SNMP settings, or the local DHCP server settings, or any combination thereof. The orchestrator can invoke the scheduler to schedule the main configuration task.

Phase 9: Main Configuration Validation Phase (949). The example orchestrator can parse the output of the endpoint to check if the previous phase B has been successfully completed.

Phase 10: GRE Tunnel Interfaces Configuration Phase (950). The example orchestrator can deploy all the GRE interface of the target endpoint. This can include all the IPSec-based configuration details such as the certificate maps, the encryption and hashing algorithms (transform-sets), the Internet Security Association Key Management Protocol (ISAKMP or IPSec Phase I) settings and profiles, the IPSec settings and profiles, and the dynamic routing protocol invoked in the DMVPN routing. The orchestrator can invoke the scheduler to schedule the GRE interface configuration task.

Phase 11: DMVPN Validation Phase (951). The example orchestrator can parses the DMVPN output messages of the endpoint to check if the previous phase 10 has been successfully completed.

Phase 12 Endpoint In Production Phase (952). The endpoint is in production. The Status (303) field in the VHE nodes table (300) in FIG. 18 and the Status (503) field in the CPE nodes table (500) in FIG. 22 represent the current phases of the endpoints. When an endpoint is in production, it can be moved to another status to update or amend the current configurations. Incremental updates can be performed by the example delivery engine.

As explained earlier, the example remote device automation engine can be built around separate modules. Each of them is capable of self-healing in terms of reliability. Each module is able to self restart if any abnormal behavior is detected, including, but not limited to: a killed process, a hanging process, or process overwhelming the resources (CPU, memory. I/O ports), or any combination thereof.

Example Synchronization Process

As soon as the endpoint is in production, the ongoing maintenance can start. The ongoing maintenance can help make certain that the endpoint remains in sync with all the requirements and settings defined in the network. For instance, as an endpoint is derived from the Template, if that Template changes, the Synchronization Process updates the endpoint accordingly. That can include, but is not limited to, ACLs, routing information, interfaces settings and Tunnel interfaces settings. As previously explained, the example remote device automation engine (040) can determine:

. . . on which VHEs a CPE will peer (in the case of Daisy-Chained VHEs available in the same Network ID) using the deterministic algorithm (described earlier). For instance, if there are five Daisy-Chained VHEs, the network load coming from the CPEs can be spread across all the five VHEs. Adding a sixth VHE can require all the CPEs to be spread again among all the VHEs to get an even repartition of the network load among all available VHEs (now to the number of six).

. . . with which other VHEs a Daisy-Chained VHE can peer within the Daisy-Chained VHE group (Daisy-Chained HA Groups). For instance, if there are five Daisy-Chained VHEs, the NHRP map chain can be 0⇨1⇨2⇨3⇨4⇨0 (as previously described). Adding a sixth VHE can change the NHRP map chain. Indeed, the updated NHRP map chain can be 0⇨1⇨2⇨3⇨4⇨5⇨0.

In both cases, adding or removing a VHE to the pool of VHEs can influence the NHRP maps and NHS entries defined in every endpoint before the topology change occurs. Hence, the Synchronization Process can reuse all the algorithms previously described to determine which endpoint needs to peer with which other endpoint. If the outcome of that calculation process comes up with a different result, the configuration of the endpoint can be updated. For instance, if a CPE was peered with VHE 4 and VHE 0 and the result of the calculation comes up that it should instead be peeing with VHE 4 and VHE 5, the endpoint configuration can be updated accordingly to reflect that topology change. If the outcome of that calculation process comes up with no different result, the configuration of the endpoint can remain the same.

In the foregoing specification, specific embodiments of the present invention have been described. However, one of the ordinary skills in the art appreciates that various modifications and changes can be made without departing from the scope of the present invention asset forth In the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage or solution to occur or become more pronounced are not to b construed as a critical, required, or essential features or elements of any or all the claims. The invention is defined solely by the appended claims including any amendments made during the pendency of this application and all equivalents of those claims as issues.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for automatically determining complete customized endpoint configurations for each of a plurality of endpoints of at least one virtual private network (VPN) and deploying the configurations to the endpoints, comprising:

accepting, using at least one user interface, parameters required for building the configurations from at least one user, the configurations enabling the endpoints to process a mixture of time sensitive and non-time sensitive data, and the parameters comprising: endpoint IP addressing scheme information, network design information, and templates used to define profiles of the endpoints;

automatically generating, using at least one configuration engine, the configurations for the parameters wherein the parameters comprise endpoint authentication information, and setting the configurations based on endpoint hardware-specific information with no further input required from the user;

querying each endpoint to verify that the endpoint hardware-specific information is consistent with the configurations for the endpoint; and deploying, using at least one scheduler, the configurations to the endpoints of the VPN, wherein the VPN is a multipoint Generic Routing Encapsulation (mGRE) VPN using Next HOP Resolution Protocol (NHRP);

wherein the computerized method prevents misconfigurations and overlapping IP address spaces;

wherein the computerized method: automatically assigns endpoint Internet Protocol (IP) addressing, automatically selects a currently unused IP Subnet from a Master IP Subnet, and automatically determines the currently unused IP Subnet from the Master IP Subnet using IP Subnetting.

2. The method of claim 1, further comprising:
validating the parameters utilizing the at least one configuration engine.

3. The method of claim 1, wherein the deploying is distributed into time slots so that resource starvation and connection bottlenecks are avoided.

4. The method of claim 1, wherein a consistent network addressing plan is utilized.

5. The method of claim 1, wherein all hardware platforms with all possible combinations of field upgradable parts are managed.

6. The method of claim 1, wherein a contemporaneous inventory is maintained of all VPN hardware to which the configurations are automatically deployed.

7. The method of claim 1, wherein the parameters further comprise network resiliency information.

8. The method of claim 1, wherein the parameters further comprise: security rules, routing policies, or licensing information, or any combination thereof.

9. The method of claim 1, wherein the parameters are used to create endpoint specific settings and hardware-specific configuration settings.

10. The method of claim 1, wherein at least one orchestrator generates a proper endpoint configuration code.

11. The method of claim 10, wherein customer-level objects are utilized.

12. The method of claim 11, wherein the customer-level objects comprise: networks, Public Key Infrastructure (PKI) Root Certificate Authorities (CAs), endpoint templates, High Availability (HA) groups, or IP address pools, or any combination thereof.

13. The method of claim 12, wherein the IP address pools comprise: Master IP Subnet (MIS) groups, Master IP Subnets (MIS), and IP Subnets, or any combination thereof.

14. The method of claim 1, wherein the endpoint addressing scheme information comprises at least one mGRE IP subnet prefix.

15. The method of claim 1, wherein the network design information comprises at least one network ID.

16. The method of claim 1, wherein the endpoints are capable of belonging to the same network.

17. The method of claim 1, wherein the endpoints are capable of belonging to the same customer.

18. The method of claim 1, wherein the endpoints are capable of belonging to many networks.

19. The method of claim 1, wherein the endpoints are capable of belonging to many customers.

20. The method of claim 1, wherein activity logs are created and maintained.

21. The method of claim 20, wherein the activity logs comprise: output of the configuration engine, scheduler, or delivery engine, or any combination thereof.

22. The method of claim 1, wherein the mGRE VPN using NHRP is using at least one Master IP Subnet.

23. The method of claim 1, wherein the mGRE VPN using NHRP protocol is resilient due to the use of high availability (HA) groups, which allows VPN headends (VHEs) to fail without affecting the user experience.

24. The method of claim 23, wherein all VHEs that are part of the same mGRE VPN using NHRP use at least one daisy chaining High Availability (HA) Group.

25. The method of claim 24, wherein all VPN headends (VHEs) that are part of the same mGRE VPN using NHRP have all their internal interfaces connected on the same local area network (LAN) segment.

26. The method of claim 25, wherein all VHE internal interfaces are automatically numbered by the at least one configuration engine.

27. The method of claim 26, wherein all the VHEs are daisy chained together.

28. The method of claim 23, wherein NHRP maps and Next Hop Server (NHS) server entries are configured for each VPN headend (VHE).

29. The method of claim 28, wherein if there are greater than two VHEs, two NHRP maps are created and two NHS server entries are created for each VHE.

30. The method of claim 29, wherein one NHRP map is a primary map, and the other NHRP map is a secondary map; and wherein one NHS server entry is a primary entry, and the other NHS server entry is a secondary entry.

31. The method of claim 1, wherein a Customer Premises Equipment (CPE) is attached to at least one mGRE VPN using NHRP.

32. The method of claim 31, wherein a deterministic algorithm is used to select which VHEs a CPE will peer with.

33. The method of claim 31, wherein a CPE that is part of at least two mGRE VPNs using NHRP uses at least one bundling High Availability (HA) Group.

34. The method of claim 1, wherein endpoints that are part of the same VPN authenticate themselves to each other.

35. The method of claim 34, wherein there is at least one public key infrastructure (PKI) server.

36. The method of claim 35, wherein at least one orchestrator creates and manages at least one PKI server.

37. The method of claim 36, wherein the at least one orchestrator manages at least one associated Certificate Lifecycle.

38. The method of claim 37, wherein the at least one orchestrator synchronizes all the endpoints according to the templates.

39. The method of claim 1, wherein the templates comprise: VPN headend (VHE) templates and/or Customer Premises Equipment (CPE) templates.

40. The method of claim 1, wherein the parameters further comprise customer specifications.

41. The method of claim 1, wherein the parameters further comprise network specifications.

42. The method of claim 40, wherein at least one orchestrator synchronizes all the endpoints according to customer specifications.

43. The method of claim 41, wherein at least one orchestrator synchronizes all the endpoints according to network specifications.

44. The method of claim 1, wherein at least one entity's network is extended to at least one remote location.

45. The method of claim 44, wherein at least one user of at least one endpoint self-provisions at least one remote device to the at least one entity's network.

46. The method of claim 45, wherein the at least one user self-provisions access to the at least one entity's network by:

providing personal information, credential information, and entity information; and receiving an endpoint.

47. The method of claim 46, wherein the received endpoint is configured by a remote device automation engine using the personal information, the credential information, and the entity information.

48. The method of claim 47, wherein certificates are generated and delivered to at least one legitimate endpoint.

49. The method of claim 48, wherein at least one fingerprint of the at least one endpoint is taken when the at least one endpoint is enrolled in the entity's network.

50. The method of claim 49, wherein at least one orchestrator verifies that at least one fingerprint of a certificate request from at least one entity matches the at least one fingerprint of the at least one endpoint taken when the at least one endpoint was enrolled in the entity's network.

51. The method of claim 1, wherein the at least one endpoint remains in sync with the settings defined in the network.

52. A computerized system for automatically determining complete customized endpoint configurations for each of a plurality of endpoints of at least one virtual private network (VPN) and deploying the configurations to the endpoints, comprising:
at least one processor, wherein the at least one processor is configured for:
accepting, using at least one user interface, parameters required for building the configurations from at least one user, the configurations enabling the endpoints to process a mixture of time sensitive and non-time sensitive data, and the parameters comprising: endpoint IP addressing scheme information, network design information, and templates used to define profiles of the endpoints;
automatically generating, using at least one configuration engine, the configurations for the parameters wherein the parameters comprise endpoint authentication information, and setting the configurations based on endpoint hardware-specific information, with no further input required from the user;
querying each endpoint to verify that the endpoint hardware-specific information is consistent with the configurations for the endpoint; and
deploying, using at least one scheduler, the configurations to the endpoints of the VPN, wherein the VPN is a multipoint Generic Routing Encapsulation (mGRE) VPN using Next HOP Resolution Protocol (NHRP);
wherein the computerized method prevents misconfigurations and overlapping IP address spaces;
wherein the computerized method: automatically assigns endpoint Internet Protocol (IP) addressing, automatically selects a currently unused IP Subnet from a Master IP Subnet, and automatically determines the currently unused IP Subnet from the Master IP Subnet using IP Subnetting.

53. The system of claim 52, further comprising:
validating the parameters utilizing the at least one configuration engine.

54. The system of claim 52, wherein the deploying is distributed into time slots so that resource starvation and connection bottlenecks are avoided.

55. The system of claim 52, wherein a consistent network addressing plan is utilized.

56. The system of claim 52, wherein all hardware platforms with all possible combinations of field upgradable parts are managed.

57. The system of claim 52, wherein a contemporaneous inventory is maintained of all VPN hardware to which the configurations are automatically deployed.

58. The system of claim 52, wherein the parameters further comprise network resiliency information.

59. The system of claim 52, wherein the parameters further comprise: security rules, routing policies, or licensing information, or any combination thereof.

60. The system of claim 52, wherein the parameters are used to create endpoint specific settings and hardware-specific configuration settings.

61. The system of claim 52, wherein at least one orchestrator generates a proper endpoint configuration code.

62. The system of claim 61, wherein customer-level objects are utilized.

63. The system of claim 62, wherein the customer-level objects comprise: networks, Public Key Infrastructure (PKI) Root Certificate Authorities (CAs), endpoint templates, High Availability (HA) groups, or IP address pools, or any combination thereof.

64. The system of claim 63, wherein the IP address pools comprise: Master IP Subnet (MIS) groups, Master IP Subnets (MIS), and IP Subnets, or any combination thereof.

65. The system of claim 52, wherein the endpoint addressing scheme information comprises at least one mGRE IP subnet prefix.

66. The system of claim 52, wherein the network design information comprises at least one network ID.

67. The system of claim 52, wherein the endpoints are capable of belonging to the same network.

68. The system of claim 52, wherein the endpoints are capable of belonging to the same customer.

69. The system of claim 52, wherein the endpoints are capable of belonging to many networks.

70. The system of claim 52, wherein the endpoints are capable of belonging to many customers.

71. The system of claim 52, wherein activity logs are created and maintained.

72. The system of claim 71, wherein the activity logs comprise: output of the configuration engine, scheduler, or delivery engine, or any combination thereof.

73. The system of claim 52, wherein the mGRE VPN using NHRP is using at least one Master IP Subnet.

74. The system of claim 52, wherein the mGRE VPN using NHRP is resilient due to the use of high availability (HA) groups, which allows VPN headends (VHEs) to fail without affecting the user experience.

75. The system of claim 74, wherein all VPN headends (VHEs) that are part of the same mGRE VPN using NHRP use at least one daisy chaining High Availability (HA) Group.

76. The system of claim 75, wherein all VPN headends (VHEs) that are part of the same mGRE VPN using NHRP have all their internal interfaces connected on the same local area network (LAN) segment.

77. The system of claim 76, wherein all VHE internal interfaces are automatically numbered by the at least one configuration engine.

78. The system of claim 77, wherein all the VHEs are daisy chained together.

79. The system of claim 74, wherein NHRP maps and Next Hop Server (NHS) server entries are configured for each VPN headends (VHE).

80. The system of claim 79, wherein if there are greater than two VHEs, two NHRP maps are created and two NHS server entries are created for each VHE.

81. The system of claim 80, wherein one NHRP map is a primary map, and the other NHRP map is a secondary map;

and wherein one NHS server entry is a primary entry, and the other NHS server entry is a secondary entry.

82. The system of claim 52, wherein a Customer Premises Equipment (CPE) is attached to at least one mGRE VPN using NHRP.

83. The system of claim 82, wherein a deterministic algorithm is used to select which VPN headends (VHEs) a CPE will peer with.

84. The system of claim 82, wherein a CPE that is part of at least two mGRE VPNs using NHRP uses at least one bundling High Availability (HA) Group.

85. The system of claim 52, wherein endpoints that are part of the same VPN authenticate themselves to each other.

86. The system of claim 85, wherein there is at least one public key infrastructure (PKI) server.

87. The system of claim 86, wherein at least one orchestrator creates and manages at least one PKI server.

88. The system of claim 87, wherein the at least one orchestrator manages at least one associated Certificate Lifecycle.

89. The system of claim 88, wherein the at least one orchestrator synchronizes all the endpoints according to the templates.

90. The system of claim 52, wherein the templates comprise: VHE templates and/or CPE templates.

91. The system of claim 52, wherein the parameters further comprise customer specifications.

92. The system of claim 91, wherein at least one orchestrator synchronizes all the endpoints according to customer specifications.

93. The system of claim 52, wherein the parameters further comprise network specifications.

94. The system of claim 93, wherein at least one orchestrator synchronizes all the endpoints according to network specifications.

95. The system of claim 52, wherein at least one entity's network is extended to at least one remote location.

96. The system of claim 95, wherein at least one user of at least one endpoint self-provisions at least one remote device to the at least one entity's network.

97. The system of claim 96, wherein the at least one user self-provisions access to the at least one entity's network by: providing personal information, credential information, and entity information; and receiving an endpoint.

98. The system of claim 97, wherein the received endpoint is configured by a remote device automation engine using the personal information, the credential information, and the entity information.

99. The system of claim 98, wherein certificates are generated and delivered to at least one legitimate endpoint.

100. The system of claim 99, wherein at least one fingerprint of the at least one endpoint is taken when the at least one endpoint is enrolled in the entity's network.

101. The system of claim 100, wherein at least one orchestrator verifies that at least one fingerprint of a certificate request from at least one entity matches the at least one fingerprint of the at least one endpoint taken when the at least one endpoint was enrolled in the entity's network.

102. The system of claim 52, wherein the at least one endpoint remains in sync with the settings defined in the network.

\* \* \* \* \*